United States Patent
Vaziri et al.

(10) Patent No.: US 7,715,413 B2
(45) Date of Patent: May 11, 2010

(54) MULTI-NETWORK EXCHANGE SYSTEM FOR TELEPHONY APPLICATIONS

(75) Inventors: Faramarz Vaziri, Port Ewen, NY (US); Herbert R. Graefe, Patterson, NY (US); Xin Wang, New Paltz, NY (US); Andrew Pletch, Gardiner, NY (US); Jeffrey H. Paige, Wallkill, NY (US)

(73) Assignee: eMerj, Inc., Edgewater, NJ (US)

( * ) Notice: Subject to any disclaimer, the term of this patent is extended or adjusted under 35 U.S.C. 154(b) by 1474 days.

(21) Appl. No.: 10/972,886

(22) Filed: Oct. 25, 2004

(65) Prior Publication Data

US 2005/0091407 A1    Apr. 28, 2005

Related U.S. Application Data

(60) Provisional application No. 60/513,814, filed on Oct. 23, 2003.

(51) Int. Cl.
*H04L 12/56* (2006.01)
(52) U.S. Cl. ............... 370/401; 370/353; 370/466; 370/230
(58) Field of Classification Search ............ 370/352, 370/353, 395.5, 401, 466, 230, 389, 392
See application file for complete search history.

(56) References Cited

U.S. PATENT DOCUMENTS

| | | | |
|---|---|---|---|
| 6,278,707 B1 | 10/1998 | MacMillan et al. | |
| 5,991,292 A * | 11/1999 | Focsaneanu et al. | 370/352 |
| 6,134,235 A | 10/2000 | Goldman et al. | |
| 6,141,341 A | 10/2000 | Jones et al. | |
| 6,141,345 A | 10/2000 | Goeddel et al. | |
| 6,304,565 B1 | 10/2001 | Ramamurthy | |
| 6,339,593 B1 * | 1/2002 | Kikinis | 370/352 |
| 6,347,085 B2 | 2/2002 | Kelly | |
| 6,353,660 B1 | 3/2002 | Burger et al. | |

(Continued)

OTHER PUBLICATIONS

"A Flexible, Module-Based Soc-Approach for Low-Power VOIP Applications" Fugger, et al., 15th Annual IEEE International ASIC/SOC Conference, 2002, pp. 256-260, Sep. 2002.

(Continued)

*Primary Examiner*—Kwang B Yao
*Assistant Examiner*—Nguyen Ngo
(74) *Attorney, Agent, or Firm*—Billy J. Knowles; BK Patents, Inc.

(57) ABSTRACT

A multi-network exchange system has a first type network (PSTN) and a second type network (Internet) and a multi-network exchange bridge in communication with the first and second type networks for the transfer of electronic information signals (telephone calls) between the first and second type networks. The multi-network exchange bridge apparatus facilitates transfer of electronic information signals to a portable access device or a gateway portal in communication with a node of one of second type networks from the first network. The multi-network exchange bridge has at least one multi-network instantiation device that enables the portable access device to function as a remote extension of the multi-network exchange bridge. A fixed address translation device provides conversion of a first address fixedly describing a node of the first type network to a second address or third address virtually describing nodes of the second type network.

76 Claims, 27 Drawing Sheets

U.S. PATENT DOCUMENTS

| | | | |
|---|---|---|---|
| 6,377,570 | B1 | 4/2002 | Vaziri et al. |
| 6,404,764 | B1 | 6/2002 | Jones et al. |
| 6,411,704 | B1 | 6/2002 | Pelletier et al. |
| 6,446,127 | B1 | 9/2002 | Schuster et al. |
| 6,560,457 | B1 | 5/2003 | Silver et al. |
| 6,628,617 | B1 | 9/2003 | Karol et al. |
| 6,650,901 | B1 | 11/2003 | Schuster et al. |
| 6,665,293 | B2 | 12/2003 | Thornton et al. |
| 6,714,536 | B1 | 3/2004 | Dowling |
| 6,735,621 | B1 | 5/2004 | Yoakum et al. |
| 6,741,695 | B1 | 5/2004 | McConnell et al. |
| 6,744,759 | B1 | 6/2004 | Sidhu et al. |
| 7,092,379 | B1 * | 8/2006 | Singh et al. ............... 370/352 |
| 7,099,301 | B1 * | 8/2006 | Sheu ....................... 370/352 |
| 2002/0107923 | A1 | 8/2002 | Chu et al. |
| 2002/0118671 | A1 | 8/2002 | Staples et al. |
| 2003/0039238 | A1 * | 2/2003 | Ollis et al. ............... 370/352 |
| 2003/0210663 | A1 * | 11/2003 | Everson et al. ............ 370/329 |
| 2004/0068648 | A1 * | 4/2004 | Lewis et al. ............... 713/153 |
| 2004/0174864 | A1 | 9/2004 | Klaghofer |
| 2004/0190498 | A1 | 9/2004 | Kallio et al. |
| 2005/0068938 | A1 * | 3/2005 | Wang et al. ............... 370/352 |

OTHER PUBLICATIONS

"Supplementary Services in the H.323 IP Telephony Network", Korpi, et al., IEEE Communications Magazine, vol. 37, Jul. 1999, pp. 118-125.

"Windows Netmeeting Advanced Calling Feature", found www.microsoft.com/windows/NetMeeting, Oct. 2004.

"JFFS: The Journaling Flash File System", Woodhouse, Proc. of Ottawa Linux Symposium, 2001, found:http://sources.redhat.com/jffs2/jffs2-html/jffs2-html.html, Oct. 2004.

"SIP: Session Initiation Protocol", RFC2543, Handley, et al., The Internet Society, Mar. 1999, found: www.ietf.org/rfc/rfc2543.txt?number=2543, Oct. 2004.

"GZIP file format specification version 4.3", RFC1952, Deutsch, The Internet Society, May 1996, found: http://www.ietf.org/rfc/rfc1952.txt?number=1952, Oct. 2004.

"Dynamic Host Configuration Protocol", RFC1541, DROMS, The Internet Society, Oct. 1993, found: http://www.ietf.org/rfc/rfc1541.txt?number=1541, Oct. 2004.

"Domain Names—Concepts and Facilities", RFC1034, Mockapetris, The Internet Society, Nov. 1987, found: http://www.ietf.org/rfc/rfc1034.txt?number=1034, Oct. 2004.

"Simple Network Time Protocol (SNTP) Version 4 or IPv4, IPv6 and OSI", RFC2030, Mills, Oct. 1996, The Internet Society, found: http://www.ietf.org/rfc/rfc2030.txt?number=20.

"File Transfer Protocol (FTP)", RFC959, Postel, et al., The Internet Society, Oct. 1985, found: http://www.ietf.org/rfc/rfc0959.txt?number=959, Oct. 2004.

"RTP: A Transport Protocol for Real-Time Applications", RFC1889, Schulzrinne, et al., Audio-Video Transport Working Group, The Internet Society, Jan. 1996, found: http://www.ietf.org/rfc/rfc1889.txt?number=1889, Oct. 2004.

"SIP: Session Initiation Protocol", RFC 3261, Rosenberg, et al., The Internet Society, Jun. 2002, found: http://www.ietf.org/rfc/rfc3261.txt?number=3261, Oct. 2004.

"Multifrequency push-button signal reception", Specification: ITU-T Q.24, International Telecommunications Union, Nov. 1998.

"Dual rate speech coder for multimedia communications transmitting at 5.3 and 6.3 kbit/s", Specification ITU.T G.723.1, International Telecommunications Union, Nov. 1996.

"Pulse code modulation (PCM) of voice frequencies", ITU-T Recommendation G.711, International Telecommunications Union, Nov. 1988.

Practical VoIP Using Vocal, Dang, et. al., O'Reilly Associates, Inc., Sebastopol, CA 95472, Jul. 2002.

* cited by examiner

MULTI-NETWORK EXCHANGE SYSTEM FOR TELEPHONY APPLICATIONS

BACKGROUND OF THE INVENTION

This application claims priority to U.S. Provisional Patent Application Ser. No. 60/513,814, Filing Date Oct. 23, 2003, which is herein incorporated by reference.

1. Field of the Invention

This invention relates generally to a communications systems and methods. More particularly, this invention relates to systems and methods for bridging between types of communications networks. Even more particularly, this invention relates to systems and methods for bridging between a public switched telephone network and a packet switched digital communications network such as the Internet.

2. Description of Related Art

Referring to FIG. 1, the Public Switched Telephone Network (PSTN) 5, as is known in the art, provides an extremely reliable system that has been available for more than a century. It is simple to operate and is used at home and office where telephone sets 10 are connected directly to the PSTN network for communication. It offers a universally understandable telephone numbering plan i.e. Country Code, City or Area Code and the phone number. The standard PSTN offers several useful calling features such as Caller Identification Messages, Voice Mail and conferencing. The PSTN system, however, is not cost effective and does not offer the kind of features that are available when using a digital communication network such as the Internet.

The wireless telephone system 15 is not considered as reliable, but rather it offers mobility to the user through a cellular telephone 20. Alternately, the wireless telephone system maybe a satellite telephone system where the telephone 20 is not a cellular telephone but a satellite telephone. As structured today, the wireless system 15 is an integrated part of the PSTN 5 and consequently suffers from the same symptoms, i.e. lack of cost-effectiveness and accessibility features as those of the wired telephone system.

The digital communication network (Internet) 25 is a network of computer servers 30a, . . . , 30d that are interconnected with networking hardware and software. A computer 35 is connected through a single telephone connection commonly referred to as dial-up service or Digital Subscriber Lines (DSL) from the PSTN network 5 through a gateway 50 to a computer server 30b. An alternate connection service for a computer 35 to a computer server 30b is through a Synchronous Optical Network (SONET) network as marketed by cable television providers. Other network connections may be through networks such as a local area network such Ethernet, Fiber Distributed Data Interface (FDDI), Cable Modems, etc.

Computer telephony is a multi-media computer 35 running an Internet telephony software solution commonly referred to as Voice Over IP (VoIP) that takes advantage of the personal computer 30 as the hardware platform. NetMeeting (developed by Microsoft, Inc., Redmond, Wash.) and similar software packages are examples of computer telephony. The conversation typically takes place by using discrete speakers and microphone (not shown). Calling from one computer 35 to the other requires knowing static Internet protocol (IP) address of the other party. Otherwise, the parties need to register their dynamic IP address with a global computer server 30b.

In an alternate configuration, the personal computer 35 is still required but an external device is a handset 40 connected via a network connection such as the universal serial bus (USB). Another configuration employs specially designed plug-in boards that support regular telephones are added to the computer 35. Some of these solutions continue to use software packages such as NetMeeting as their main engine. Even though this is a more attractive solution compared to the software only solution but it still suffers from the fact that the user requires a computer 35 to place a telephone call.

Another Internet appliance includes an embedded computer within a system and employs a telephone set. The embedded computer communicates with an Internet Service Provider (ISP) through the server 30b to communicate with a global computer server 30a, . . . , 30d executing and managing VoIP protocols. The attached telephone set functions essentially as the telephone 10 of the PSTN network 5, but communicates only with the global computer server 30a, . . . , 30d that manage and execute the VoIP protocols.

A similar appliance is referred to as a dial-up appliance. In this is a solution the embedded computer uses a modem and an ISP account to connect to the Internet 25 each time a telephone call is made. The main problem in this type of approach is the relatively long connection time, the inability to receive calls (the unit is not online at all times) and the undesirable extra modem delay.

Another development of the Internet appliance is the broadband appliance. In this instance, the Internet connection is broadband and thus the problems with the dial-up solution are resolved. The main issue here is the addressing scheme. Since there is no connection between the regular telephone number and the new appliance, a new number needs to be issued for incoming calls. The other problem stems from the fact that VoIP capability is only available for the telephone set, but not the landline. In fact there is no connection between the PSTN 5 connection and the broadband appliance.

The future of telephone appears at the present time to be Internet protocol telephones 45. The Internet protocol telephone 45 has an embedded computer similar to the above described appliances. The Internet protocol telephone 45 includes a built in handset and feature buttons. The embedded computer is structured to contain all the required hardware and software to appear to the user as a regular telephone, with the exception that the Internet protocol telephone 45 communicates through a computer server 30d to a global computer server 30a, . . . , 30d managing and executing the VoIP protocols. The Internet protocol 45 and the regular telephone 10 are totally independent, suggesting that the user should own both telephone sets to take advantage of both networks 5 and 25.

Gateways 50 are industrial networking equipment that bridge between the computer servers 30a, . . . , 30d and the PSTN 5 to provide access between the Internet 25 and the PSTN 5. For those computer servers 30a, . . . , 30d that provide the management and execution of the VoIP protocols, the Gateways are capable of handling many simultaneous VoIP calls. The Gateways 50 allow users to take advantage of the Internet telephony while being totally transparent to the user. This structure allows the VoIP communications to appear to the user as another long distance carrier.

Prepaid calling cards provide a user access to discounted providers of long-distance or toll calls services from home telephones 10 or public telephones by use of a toll-free number and password. The prepaid calling card reduces the long distance cost at home or when traveling. This method may or may not take advantage of VoIP. The main benefit of using calling card is to free the user from paying for long distance when the long distance tolls are high (making long-distance calls via cell phones, from hotels, airports, etc.).

Callback Systems are a means to pass a telephone number to a callback center to be called back on that number. The callback system is a popular device where the user commands a callback center to call a particular phone. Once the addressed phone starts ringing and the user picks up the phone, a special dial tone is heard and dialing can get started. Callback systems are useful when the user prefers to avoid any toll cost between the originating telephone and the long distance service provider. In other words the cost of the incoming call is less than the cost of the outgoing call.

Certain cellular telephone and personal digital assistant manufacturers are providing the ability for a wireless telephone 20 to communicate wirelessly with a computer server 30d as well as the wireless telephone network 15. The wireless telephone 20, operating in the wireless mode (WiFi) to communicate with the computer server 30d, uses a VoIP protocol for placing telephone calls through the digital communications network (Internet) 25. If there is no wireless connection, the wireless telephone 20 employs the wireless network 15 for placing telephone calls.

In summary, all of the above mentioned solutions can be categorized into three different groups:

PSTN only Solutions, such as regular telephones, wireless phones, prepaid cards, callback systems, etc. These solutions do not take advantage of the features provided by digital networks such as the Internet.

VoIP only solutions, such as IP phones, P.C.-based software packages, etc. These solutions assign virtual PSTN numbers in order to route the incoming calls. Therefore, the attributes of PSTN calls to real numbers (not virtual) are not transported to the Internet and vice versa.

Telephony Gateways. These devices function based on knowing the static IP address of the source and destination and subsequently no PSTN to IP address translation takes place.

It should be emphasized that none of the above solutions instantiates a PSTN-based telephone with other devices on the Internet. This inability originates from the fact that the existing IP solutions do not translate the PSTN attributes to the digital network and vice versa.

U.S. Pat. Nos. 6,141,341 and 6,404,764 (Jones, et al.) describe an Internet Protocol telephone system and method that uses a telephone to place and receive voice over Internet Protocol (VoIP)-based telephone calls and public switched telephone network-based telephone calls. An off-hook condition with the telephone is detected and a sequence of signals generated by the telephone is received. At least a first signal generated by the telephone is buffered while the system attempts to detect a predetermined signal that signifies a VoIP-based call. Upon detection of the predetermined signal, the system intercepts subsequent signals in the sequence, absent the at least first signal that was buffered, and places the VoIP-based call via an Internet. Otherwise, the system places the PSTN-based call via a PSTN.

U.S. Pat. No. 6,141,345 (Goeddel, et al.) teaches a signal processing resource allocation for Internet-based telephony. An access platform pools different signal processing resources such as different types of speech-coding algorithms. The access platform is coupled to the Internet, a local-exchange-carrier (LEC), and other communications facilities such as long-distance facilities. For each call through the access platform, one of the plurality of signal processing resources is allocated as a function of signal type either through signal detection or out-of-band signaling. For example, the access platform first determines if the call is an audio call or data call by detecting the type of signal. If the call is an audio call, the access platform switches in echo canceling resources. On the other hand, if the call is a data call, the access platform determines if a speech-coding algorithm is being used and, if necessary, switches in a compatible speech-coding resource.

U.S. Pat. No. 6,353,660 (Burger, et al.) describes a call screening method allows a subscriber to screen calls made to the subscriber from callers using the PSTN while the subscriber uses another communications medium. An enhanced services platform (ESP) receives a first call from a caller using a particular public telephone number for the particular subscriber. The ESP identifies the particular public telephone number for the particular subscriber. The ESP accesses a database storing a public telephone number and a private packet-based address for subscribers to retrieve a private packet-based address of the particular subscriber on the basis of the particular public telephone number. An introductory message is provided to the caller and prompts the caller to leave a message. The ESP accesses the particular subscriber based on the particular subscriber private packet-based address to establish an audio connection via the communication medium. The subscriber is notified of the first call. If the subscriber answers the call, a communication path is provided between the caller and the subscriber via the communication medium so that the subscriber may hear the caller leave the message but the caller does not hear or know that the particular subscriber is listening. The ESP connects the caller and the subscriber for two-way communication upon the authorization of the subscriber. In another embodiment, both the caller and the subscriber use a packet-based network. In another aspect of the invention, the ESP records the caller's voice in response to the prompt, and plays the recording to the subscriber if the subscriber answers the call. The ESP provides a method for anonymously connecting an accessing caller to a subscriber using a packet-based network.

U.S. Pat. No. 6,560,457 (Silver, et al.) describes an enhanced call delivery system for interoperability between circuit switched and packet switched networks. The system expedites the delivery of a call originating in a circuit-switched network to a mobile terminal camped on a packet-switched network. Information representing the location of the mobile terminal in the packet-switched network is provided to the circuit switched network. A call setup with the mobile terminal is initiated with reference to the previously received location information. Location-based services are also provided by the circuit-switched network with access to such mobile terminal location information.

U.S. Patent Application 2002/0118671 (Staples, et al.) Aug. 29, 2002 illustrates a communication system that extends office telephony and network data services to remote clients through the Internet. The system has a telephony server, a local area network, a server system, and a user communication device. The telephony server (e.g. a Private Branch Exchange) provides telephony services for a plurality of office lines. The local area network couples to the Internet. The telephony server and local area network may reside within an office environment. The server system couples to the telephony server and to the local area network. The user communication device establishes a first connection to the server system through the Internet. In response to the first connection, the server system automatically provides access for the user communication device to the telephony server. Also, the server system automatically invokes a call forwarding operation in response to the first connection, so that subsequent telephone calls, intended to reach the user's office line, are forwarded to the server system. When the server system receives a first telephone call, which has been redirected by the telephony server from the user's office line, the server system forwards the first telephone call to the user communication device through the first connection. The user communication device may also establish a secure data connection to the server system through the Internet. The secure data connection provides the remote user with access to the local area network in a manner which protects the data security of the local area network.

"A Flexible, Module-Based Soc-Approach for Low-Power VoIP-Applications" Fugger, et al., 15th Annual IEEE International ASIC/SOC Conference, 2002, pp.: 256-260, September 2002 describes a system on chip (SoC) that is suitable for both conventional telephony via the public switched telephone network (PSTN) and voice over Internet protocol (VoIP). A highly flexible approach offers the possibility to integrate several interface types, customizable by software download. Additional download capabilities facilitate the integration of voice-codecs for voice compression, algorithms for silent noise injection, far end line echo cancellation, and fax/modem termination.

"Supplementary Services in the H.323 IP Telephony Network", Korpi, et al., IEEE Communications Magazine, Vol.: 37, July 1999, pp.: 118-125 provides the H.323 architecture for supplementary services, the differences in deployment of these services between the circuit-switched and packet-switched networks, and inter-working of these services across hybrid networks.

U.S. Pat. No. 6,411,704 (Pelletier, et al.) describes a system and method for providing telephony services, such as caller ID, voice mail, selective call forwarding, etc. to a remote subscriber, typically located outside the provider's regional territory. The system can include customer premise equipment (CPE) selectively connectable to a remote central office (CO), a packet-switched network gateway, such as an Internet telephony gateway (ITG), for remotely communicating service requests to a local service node. The local service node can be located within the service provider's territory and returns telephony service responses via the packet-switched network gateway to the remote CO, and ultimately the remote CPE.

U.S. Pat. No. 6,377,570 (Vaziri, et al.) illustrates an Internet switch box that connects between a telephone set and a public switched telephone network (PSTN) line, the latter of which is used both for PSTN telephone conversations and for connection to an Internet service provider (ISP). The switch box contains hardware and embedded software for establishing a connection to an ISP and for Internet telephone. When two users, each having an Internet switch box connected to the telephone set, wish to have an Internet telephone conversation, one calls the other over the PSTN. When they agree to an Internet telephone conversation, they signal their Internet switch boxes, by pressing either buttons on the switch boxes or certain keys on the telephone keypads, to switch to Internet telephone. The switch boxes disconnect the PSTN call and connect to their ISPs. Once the switch boxes are on the Internet, they contact each other through a server which supplies Internet protocol (IP) addresses of switch boxes, and the users continue their conversation by Internet telephone. The users can also prearrange to call each other solely by Internet telephone, in which case they do not need to talk to each other over the PSTN.

U.S. Pat. No. 6,347,085 (Kelly) provides a method and apparatus for enabling communication between packet-switched data networks and circuit-switched communication networks utilizes the existing domain name system infrastructure of the Internet to resolve traditional PSTN telephone numbers into domain names, and, using one or more domain name servers, locate the network protocol address of a gateway capable of connecting an executing task on the packet-switched data network to the desired terminating apparatus on the circuit switched communication network. Also disclosed is a gateway architecture capable of performing the cross network connections as well as domain name server architecture that stores the segments of a telephone number, such as country code, area code and exchange, in a hierarchical tree configuration.

U.S. Pat. No. 6,304,565 (Ramamurthy) teaches a method for completing long distance pots calls with IP telephony endpoints. When a calling party calls a called party on the public-switched telephone network (PSTN), a database common to both the PSTN and an Internet Protocol (IP) network, is accessed to determine whether the called telephone line is currently active on the IP network. That database maintains a record for each user who is currently active on the IP network through an Internet Service Provider (ISP). In addition, each record contains information identifying the particular user logged into the network on that line, an indication whether the telephone line is IP telephony capable, an indication whether that line is currently active on an IP telephony call on an Internet Telephony network (ITN), and the IP telephony feature set subscribed to by the called party on that line. If the telephone line is active, IP telephony capable, currently active on an IP telephony call on the ITN, and the called party subscribes to a call waiting-on-IP feature, then the incoming call can be forwarded as an IP telephony call to the called telephone line over the ITN. Alternatively, the incoming call can be directed to an alternate destination on either the ITN network or the PSTN, such as a voice mail or message service. If the called party is engaged in a browsing activity and has an IP telephony capability, then the called party is alerted to the incoming telephone call via a message on his terminal.) The incoming call is then completed through the ITN to the called party as an Internet telephony call. If the called party is currently active on the IP network through an ISP, but does not have an IP telephony capability, then the PSTN forwards a message to the ISP, which pushes a message to the called party to inform him or her of the incoming call. The incoming call is then directed onto the IP network to a messaging service, or on the PSTN to a voicemail service, or to an alternate telephone number, such as a cellular phone, for pickup by the called party.

U.S. Pat. No. 6,278,707 (MacMillan, et al.) teaches a communication system that includes an interface between two networks, for example the public telephone system and an IP-based network. The system includes a modem bank which receives bearer channel inputs and provides outputs to the second network. A protocol converter interfaces with a signaling network such as a common channel signaling (CCS) network (e.g., an Signaling System 7 network). The protocol converter communicates signaling information to the modem bank. A resource manager is coupled to the protocol converter and includes a memory which stores status information relating to the system.

U.S. Pat. No. 6,134,235 (Goldman, et al.) illustrates a system and method for bridging the POTS network and a packet network, such as the Internet. The system and method use a set of access objects that provide the interfacing and functionality for exchanging address and payload information with the packet network, and for exchanging payload information with the payload subnetwork and signaling information with the signaling subnetwork of the POTS network. The system includes a communications management object that coordinates the transfer of information between the POTS network and the packet network; a payload object that transfers payload information between the system and the payload subnetwork of the first communications network; a signaling object that transfers signaling information between the system and the signaling subnetwork of the first communications network in accordance with a signaling protocol associated with the signaling subnetwork; and a packet object that transfers payload and address information between the system and the second communications network in accordance with a communications protocol associated with the second communications network.

U.S. Pat. No. 6,744,759 (Sidhu, et al.) details a system and method for providing user-configured telephone service to a user of a data network telephone. The user connects a data network telephone to the data network. The data network telephone registers with a telephone connection server to have basic calling service. The user accesses a service provider server to enter feature selections. The service provider server may use a web page to query the user for feature selections. The service provider server uses the user's selections to update the user's account and to activate the selected features.

U.S. Pat. No. 6,741,695 (McConnell, et al.) describes an interface engine that is communicates with a packet-switched network and to a legacy circuit-switched network. The interface engine uses a call processing protocol, such as the session initiation protocol (SIP), for packet-switched network communications and uses a legacy signaling protocol, such as IS-41, for legacy circuit-switched communications. In response to a registration request initiated by a subscriber device on the packet-switched network, the interface engine obtains a service profile for the subscriber from a call processing system, such as a home location register (HLR), of the legacy circuit-switched network. Service parameters derived from the service profile and stored in a service database may be used to apply services on the packet-switched network for the subscriber device.

U.S. Pat. No. 6,735,621 (Yoakum, et al.) provides a method and apparatus for messaging between disparate networks. A service control gateway (SCG) provides the capability to extend advanced intelligent network (AIN) services transparently between circuit switched and packet networks. Signaling system 7 (SS7) transaction capabilities application part (TCAP) messages are translated into session initiation protocol (SIP) INVITE messages. SIP messages, which may be responses to the translated messages referred to above, are translated back into TCAP messages. Data from messages is stored in an interaction database, a data structure maintained at the SCG. The SCG uses the interaction database to properly format translated messages for each network.

U.S. Pat. No. 6,714,536 (Dowling) teaches methods and apparatus for allowing a packet data connection to be established by sending an indication of a network address through a telephony path. In a first embodiment, a protocol stack initiates the establishment of an Internet connection by sending a data segment through a public switched telephone network (PSTN) telephony path and then operates and maintains the Internet connection on separate packet connection. Dialing digits are used to indicate the address of a remote computer or wireless device via the telephony path. This invention also enables mixed PSTN/Internet multimedia telephone calls. In an exemplary embodiment, when a point-to-point telephone PSTN connection is established, a screen of information automatically appears at one or both ends of the connection via the Internet.

U.S. Pat. No. 6,665,293 (Thornton, et al.) teaches an application for a voice over IP (VoIP) telephony gateway. The application provides a telephony gateway intended for paired use at opposite ends of a data network connection, in conjunction with at each end of a private branch exchange (PBX) for automatically routing telephone calls, e.g., voice, data and facsimile between two peer PBXs over either a public switched telephone network (PSTN) or a data network. The routing is based on aspects such as cost considerations for handling each call and called directory numbers, monitoring quality of service (QoS) then provided through the data network and switching ("auto-switching") such calls back and forth between the PSTN and the data network, as needed, in response to dynamic changes in the QoS such that the call is carried over a connection then providing a sufficient QoS.

U.S. Pat. No. 6,650,901 (Schuster, et al.) describes a system and method for providing user-configured telephone service in a data network telephony system. The system and method provides location information and other information about a calling telephone to the caller during a telephone connection in a data network telephony system. Data network telephones may be provisioned and otherwise configured for operation with an extensive database and other user account information. The user's account may include a location identifier that identifies the physical location of the telephone. The location identifier may provide address information, latitude and longitude configuration, directions, or other information. The location information is communicated in a data communications channel between the caller and the called telephone. Alternately, the location information is communicated to the caller during call setup. The location information is useful in providing emergency dispatch services, such as 911 in a data network telephony system.

U.S. Pat. No. 6,628,617 (Karol, et al.) teaches a technique for Internetworking traffic on connectionless and connection-oriented networks. Traffic on a connectionless (CL) network, such as IP packets, can be routed onto a connection a connection oriented (CO) network, such as an ATM telephony network, when it is advantageous to do so from a user or service provider viewpoint, without affecting the ability of users to continue to use existing applications. Routing is controlled by nodes called CL-CO gateways, with connectivity to both the CL network and the Co network. When CL traffic originating at a source reached these gateway nodes, a decision is made whether to continue carrying the information in the CL mode, or to redirect the traffic to a CO network. Each CL-Co gateway may include hardware and software modules that typically comprise interfaces to the Co network, interfaces to the CL network, a moderately sized packet buffer for temporarily storing packets waiting for CO network setup or turnaround, a database for storing forwarding, flow control header translation and other information, and a processor containing logic for controlling the gateway packet handling operations.

U.S. Pat. No. 6,446,127 (Schuster, et al.) provides a system and method for providing user mobility services on a data network telephony system. User attributes may be transmitted from a portable information device, such as a personal digital assistant, to a voice communication device, such as an Ethernet-based telephone. The voice communication device receives the user attributes from the portable information device and may transmit a registration request to a registration server. The registration request may include the user attributes, and is used by the registration server to register the user to the voice communication device in a registration data base. When a call is placed to the user, the registration server may reference the registration data base to direct the call to the voice communication device.

U.S. Patent Application 2002/0107923 (Chu, et al.) illustrates a system architecture for linking packet-switched and circuit-switched clients. The system allows both phone-based and IP-based clients to participate in a single audio conference. At least two multi-point control units (MCUs) (i.e., conferencing servers) are enabled to connect via a standard data linkage (i.e., full-duplex dial-up or IP link). The system enables the phone-based MCU to handle the phone clients and the IP-based MCU to handle the IP-based clients, while connecting the two to allow each participating client to hear all other participating clients.

U.S. Patent Application 2004/0174864 (Klaghofer) describes a gateway device that is connected between a switched-circuit communication network and at least two VoIP network domains, each domain having a packet-based signaling controller. The gateway device transfers to each of the signaling controllers a registration request message so that the gateway device is simultaneously registered in the at least two VoIP network domains as a VoIP end point.

U.S. Patent Application 2004/0190498 (Kallio, et al.) teaches a method, system and gateway device that enables interworking between an IP-based network and a circuit-switched network. A first address information of a first connection end located in the circuit-switched network is routed in a trigger message from the IP-based network to a gateway control function. The first and second call legs are established in parallel towards the first connection end based on the first address information, and towards a second connection end located in the IP-based network based on a second address information obtained from the trigger message. A single connection between the two connection ends is then established by connecting the first and second call legs. Thereby, IP-based signaling functionality can be used to add capability for subscribers located in the CS domain to be invited into conferences or calls with subscribers located in an IP-based domain, e.g. the IMS domain.

SUMMARY OF THE INVENTION

An object of this invention is to provide a multi-network exchange system that incorporates PSTN telephone calls and Internet telephony calls.

Another object of this invention is to provide a multi-network exchange system that uses a single telephone numbering plan for addressing PSTN telephone calls and Internet telephone calls.

Further, another object of this invention is to provide a multi-network exchange system that does not require a computer and calling from one multi-network exchange system to another is automatic, with Internet telephony calls are carried out in the same way as toll calls on the PSTN.

Even further, an object of this invention is to provide a multi-network exchange system that has an Internet access that is always available and can originate and receive calls immediately.

Another object of this invention is to provide a multi-network exchange system that is accessible from remote accessing through a PSTN telephone call or through a portable access multi-network exchange device.

Further, another object of this invention is to provide a voice messaging system for transfer of recorded voice messages.

To accomplish at least one of these objects, a multi-network exchange system has a first type network and a second type network and a multi-network exchange system in communication with the first and second type networks for the transfer of electronic information signals between the first and second type networks. The multi-network exchange bridge apparatus facilitates transfer of electronic information signals to a portable access device or a gateway portal in communication with a node of one of second type networks from the first network. The multi-network exchange bridge includes a first portal in communication with the first type network and at least one second portal in communication with the second type network. An information retention device is in communication with the first portal and the second portal to retain the electronic information signals, to transfer the electronic information signals between the first type network, and the portable access device in communication with a node of the second type network. A protocol control device is in communication with the first portal, second portal, and the information retention device for interpreting and formatting of the electronic information signals between protocols and command structures of the first type network and protocols and command structures of the second type network for transfer of the electronic information signals between the first type network and the second type network.

At least one multi-network instantiation device is in communication with the protocol control device and in communication with a remote node of the second type network to transfer the electronic information signals to the portable access device on the second type network. The multi-network instantiation device enables the portable access device to function as a remote extension of the multi-network exchange bridge.

A fixed address translation device is in communication with the multi-network exchange bridge. The fixed address translation device provides conversion of a first address describing a node of the first type network through which the multi-network exchange bridge apparatus communicates to the first network to a second address describing a node of the second type network through which the second portal communicates with the second network. The fixed address translation device further provides conversion of the first address to at least one third address describing a node of the second type network through which the multi-network instantiation devices communicate with the second network. The first address is fixedly defined for the first type network and the translation is virtually defined for the second and third addresses.

The multi-network instantiation devices are selected from a group of devices in communication with the second type network consisting of other multi-network exchange bridge apparatuses within the multi-network exchange system, computing devices, personal digital assistants, Internet protocol telephones, and electronic devices capable of communicating with the second type network.

If the portable access device in communication with the second network in communication with the multi-network instantiation device has a third address equivalent to the second address with an extension, it is associated with the multi-network exchange bridge apparatus. If the portable access device transmits through the multi-network instantiation device a request to communicate with the multi-network exchange bridge apparatus, the portable access device may communicate directly with the multi-network exchange bridge apparatus through the multi-network instantiation device.

In a preferred implementation, the first type network is a public switched telephone network and the protocols and command structures of the first type network provide calling features and voice signals of a telephone call. The second type network is a global digital communications network and the protocols and command structures provide packet formatted digital data for transferring the electronic information signals between the second type network and the first type network. The packet formatted digital data is a voice-over-Internetprotocol for the transfer of a telephone call on the global digital communications network.

A global multi-network exchange server is in communication with the multi-network exchange bridge apparatus to facilitate transfer of the electronic information signals between the portable access device.

The portable access device includes a portable access control device is in communication through the multi-network instantiation device with the global multi-network exchange server to acquire access information to facilitate transfer of the electronic information signals between the second type network and the multi-network exchange bridge apparatus. The portable access control device is in communication with the multi-network exchange bridge apparatus to acquire the electronic information signals from the multi-network exchange bridge apparatus. A microphone and speaker are in communication with the portable access control device. The portable access control device converts the electronic information signals to voice signals for reproduction on the speaker and converts voice signals to the electronic information signals for transfer to the multi-network exchange bridge apparatus.

The multi-network exchange bridge apparatus further has at least one third portal in communication with one of a group of communication devices consisting of a computing system, a telephone handset, a facsimile machine and in communication with the protocol control device. The protocol control device provides interpretation and formatting of the electronic information signals between protocols and command structures of the first type network and protocols and command structures of the second type network for transfer of the electronic information signals between the first type network, the second type network and the communication devices.

DETAILED DESCRIPTION OF THE INVENTION

Figure 2:
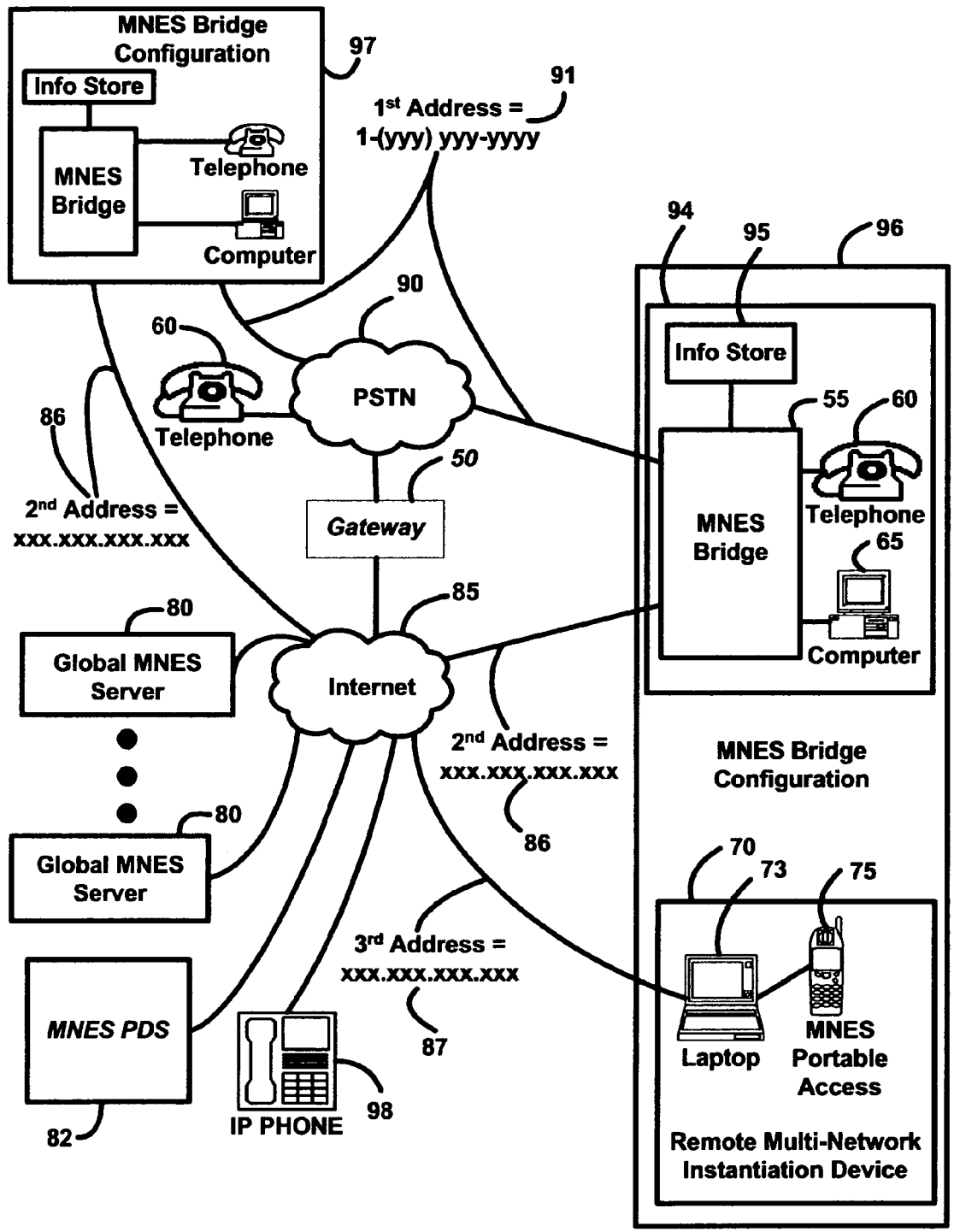
FIG. 2 is a functional diagram of a Public Switched Telephone Network and a global digital communications network (Internet) illustrating a Multi-Network Exchange System of this invention.

Refer now to FIG. 2 for a detailed description of the operation of the Multi-Network Exchange System (MNES) of this invention. The Multi-Network Exchange System includes one or more MNES bridges 55 and 97 that allow information in the form of voice or fax telephone calls to be exchanged between a PSTN network 90 and a digital communications network 85 such as the internet. The MNES bridge 55 has a telephone interface to the PSTN network 90 and a digital network interface for communications the internet 85. At least one telephone set 60 is connected to the MNES bridge 55 and at least one computer system 65 is similarly connected to the MNES bridge 55. Optionally, a facsimile machine (fax) 62 and an answering machine 63 may be connected to the MNES bridge 55 (while not shown the fax machine 62 and answering machine 63 may be connected to the other MNES Bridge 97) During normal operation, the PSTN network 90 communicates telephone calls directly to the telephone set 60 and the internet 85 communicates directly with the computer system 65.

An information storage device 95, such as a Flash random access memory (RAM) or a magnetic disk storage, is connected to the MNES bridge 55 to retain voice messages, faxes, and other information received by the MNES bridge 55.

At least one global MNES server 80 is connected as a node of the internet 85 and provides the necessary information for facilitating the VoIP telephone calls between the MNES bridge 55 and other MNES bridges 55 attached and active on the internet 85. Alternately, the global MNES server 80 directs the VoIP telephone calls to a gateway 99 for transfer to the PSTN network 90 for communication with the telephone handset 60. Another option is for the global MNES server 80 to direct the VoIP telephone call to another server with a standard IP telephone 98.

A MNES portable access device 75 is connected through a computer such as the laptop computer 70 to the internet 85. The MNES portable access device 75 provides access for a user to connect with the global MNES server 80 to provide a location address of the MNES portable access device 75. The global MNES server 80 then informs the MNES bridge 55 of the location address of the MNES portable access device 75 and forwards any incoming telephone calls, stored messages, or faxes directly to the user through the laptop computer 70 to the MNES portable access device 75. It should be noted that, while the MNES portable access device 75 is connected to a laptop computer 70, the MNES portable access device 75 may be connected to any computational device having connectivity to the internet 85.

As described, the system consists of at least (but not limited to) two MNES Bridges 55 that are in communication with a first type network that is assumed to be the PSTN 90, and second type network that is assumed to be the Internet 85, one or more MNES portable devices 75 that are attached to a laptop/desktop computer 70, standard IP phones 98, and one or more MNES global servers 80. In a typical configuration, telephony gateways 50 may co-exist to facilitate termination of MNES calls on PSTN.

MNES Bridge 96 is required to be initially registered with the MNES global server 80. This registration is based on the conventional PSTN numbering associated with the telephone line 91 connected to the MNES Bridge. The MNES portable devices 75 associated with this bridge are also registered as extensions to this number. The standard IP devices that are capable of communicating with the MNES system must be registered with standard ENUM server not shown in FIG. 2.

Once the MNES 96 and its portable devices 75 are registered appropriately, it can be configured in two modes of operations; one is PSTN default mode and two is the VoIP default mode. In the PSTN default mode, the calls originated from the telephone set 60 are PSTN calls. If the user wishes to make a VoIP call the '#' key should be depressed. In this mode, if the destination number is registered with the MNES global server 80 the PSTN call will be disconnected automatically and will be resumed as an VoIP call. In the second mode of operation all calls are VoIP calls unless the user presses the '#' key when the call will be routed on the PSTN.

If a MNES portable device 75 is installed, then the telephone set 60 and the portable device 75 virtually assume the same functionality. The two units can call each other by pressing the '*' key. If the telephone set 60 is rung, then the ringing signal is also transferred to the portable device 75. The portable device 75 is capable of making phone calls in the same way that the telephone set makes phone calls. The MNES portable device 75 is an instantiation of the telephone set 60.

If a PSTN call is placed to PSTN line 91 connecting a MNES 96, the MNES Bridge 55 will check the Caller ID message corresponding to that call and if there is a match between the number and an authorized list in the bridge 55 then a VoIP dial tone is played back to the caller and toll dialing may be initiated by the user. The caller may choose to press the '#' key and hang up when the MNES Bridge 55 will callback the user.

To accomplish this function the global MNES server 80 functions as a fixed address translation device. The global MNES server 80 translates a first address 91 that is the telephone number of an MNES Bridge configuration 96 or 97. If the second MNES Bridge 97 is being requested, the global MNES server 80 translates the first address 91 to a second address 86 that is the internet protocol address of the requested MNES Bridge 97 that describes the node of the internet 85 through which the requested MNES Bridge 97 communicates.

A portable device such as the laptop computer 73 and its MNES portable access device 75 form a multi-network instantiation device 70. The multi-network instantiation device 70 is essentially a remote device or instantiation of the local MNES bridge 94 that has remote access to the local MNES bridge 94 and is included as a component of the MNES Bridge Configuration 96. The global MNES server 80 further provides conversion of the first address 91 that is the telephone number to at least one third address 87 on the internet 85. This internet protocol address describes a node of the internet through which a multi-network instantiation device 70 communicates with the internet 85 to act as a remote access of the main MNES bridge 96. The first address 91 (telephone number) is fixedly defined for the PSTN network 90 and the translation is virtually defined for the second address 86 as the internet address of any of the instantiations of the MNES bridges 96 or 97. The third address 87 is the translation that virtually defines internet address of any of the multi-network instantiation device 70 that is the remote instantiations of the local component MNES bridge 94 in this example.

The MNES Bridge will monitor all the calls, PSTN or VoIP, placed to the bridge 55 and will look for the calls that resemble greeting messages. Those calls are recorded and stored in the storage area associated with the bridge. The stored messages will be available to the user via the Internet.

In a similar manner, the facsimile messages arriving at the bridge are transferred to the facsimile machine connected to the bridge as well as being recorded and stored in the storage area associated with the bridge. The stored messages will be available to the user via the Internet.

The user of the MNES system 96 can login to a registered MNES Bridge 55 by entering the PSTN number of the bridge as user identification and a proper password to examine all the telephony activities of the bridge. The user can specifically perform the following activities:

Examine all the call logs that have been accumulated by the MNES system 96. The call logs include missed calls, received calls and dialed calls. The user can edit the call logs using a Graphical User Interface.

Listen to all the voice messages that have been received and recorded by the MNES system 96. The user can edit the messages using a Graphical User Interface. The user can also initiate sending voice messages to a normal phone on the PSTN or another MNES Bridge.

Retrieve all the facsimile messages that have been received and recorded by the MNES system 96. The user can edit the messages using a Graphical User Interface. The user can also initiate sending facsimile messages to a facsimile on the PSTN (not shown) or another MNES Bridge 55.

Command the MNES Bridge 55 to callback a PSTN number specified by the user.

Figure 3A:
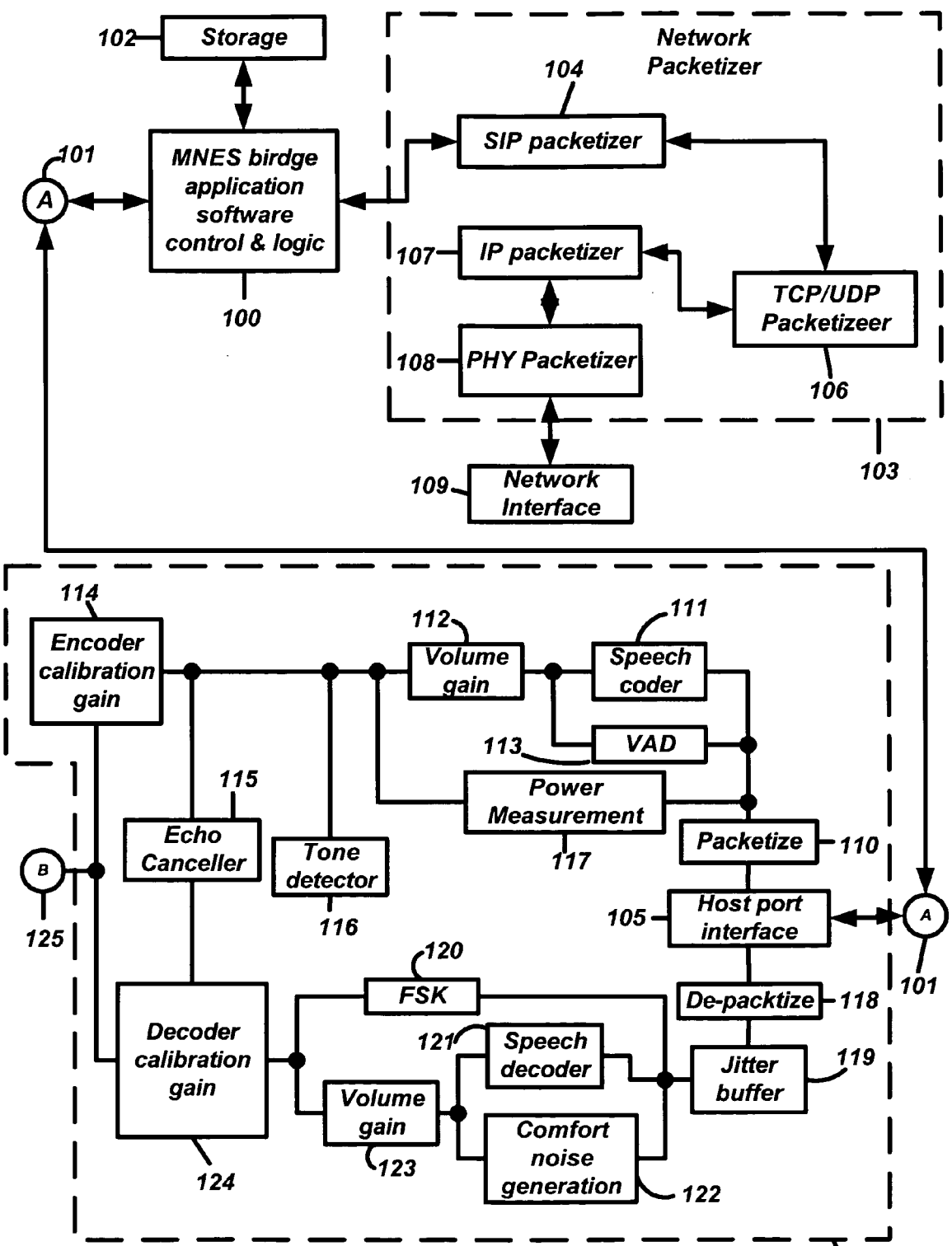
FIG. 3a-3b is functional block diagram of the multi-network exchange bridge of the Multi-Network Exchange System of this invention.
Figure 3B:
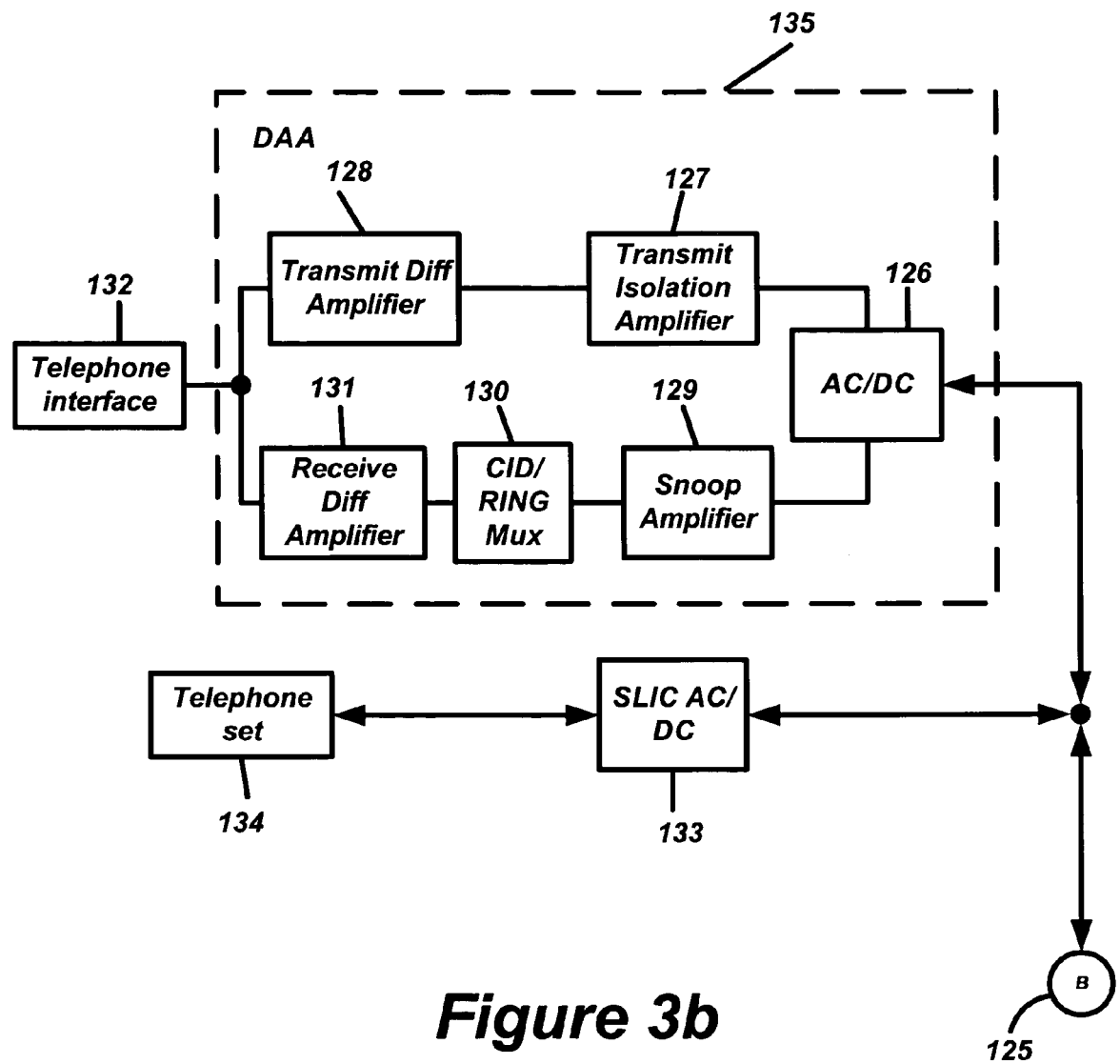

Refer now to FIGS. 3a and 3b for a description of the MNES bridge of this invention. The telephone set 134 is connected to the Subscriber's Line Interface Circuitry (SLIC) and Analog/Digital and Digital/Analog Converters (AC/DC) 133. The telephone line 132 is interfaced with the received differential amplifier 131, Caller ID and Ring Detection 130, Snoop Amplifier 129 and Analog to Digital Converter 126 on the receive side. On the transmit side, it is interfaced with Transmit differential Amplifier 128, Transmit Isolation Amplifier 127 and the Digital to Analog Amplifier 126. The digital data corresponding to the inputs and outputs of these two modules, i.e. telephone set and telephone line interfaces, are multiplexed and connected to the encoder 114 calibration gain and decoder calibration gain 124. The calibration gain control process applies one gain to all the inputs to the encoder loop and a separate gain to all the outputs from the decoder loop.

A tone detector 116, is attached to the encoder path to monitor and detect different types of codes that exist in the call processing scenario. ITU-T Q.24 specifies the requirements for dual-tone multi-frequency detection. Dual tone multi-frequency (DTMF) is an international signaling standard for use in the telephone network. The DTMF detection/generation algorithm can operate in conjunction with most speech compression algorithms to provide tone relay functionality.

The volume gain module 112 controls the volume of the decoded voice signal. The volume gain control process applies a gain between the input and the output PCM ports. It supplies a constant level of amplification.

An echo canceller 115 is positioned between transmit and receive paths of the encoder/decoder module. ITU-T recommendation G.168 specifies the requirements for line echo cancellers. A line echo canceller is an adaptive FIR filter, which operates upon frames of digitized data, and is typically used in telephony applications to cancel the electrical echo caused by 2-to-4 wire conversion hybrids. A line hybrid is a device placed at the point where a 4-wire network connection is converted to a 2-wire analog loop. Impedance mismatches in this device will almost always result in some "talker echo", which is a reflection of the received analog signal back to the far end talker on the transmission path. The longer the delay through the system is, the less amplitude echo can be tolerated before disturbing the talker. Thus, since virtually all VoIP and VoDSL systems add delay to the system, line echo cancellation is almost always required. Line echo cancellers are sometimes suitable for canceling echoes caused by other phenomena as well.

The speech coder 111 and 121 are the main modules for speech coding and decoding. ITU-T G.723.1 describes two "analysis by synthesis" algorithms:

Multi-Pulse Maximum Likelihood Quantization (MP-MLQ), which generates a 6.4 kbps compressed bit-stream, and Algebraic Codebook Excited Linear Prediction (ACELP), which generates a 5.3 kbps compressed bit-stream. G.723.1 is the first vocoder with a net bit rate of less than 16 kbps that was standardized by the ITU-T. It is a dual rate coder that is generally considered toll-quality at the 6.4 kbps rate. Annex A to G.723.1 specifies a Voice Activity Detection (VAD) algorithm that detects the presence or absence of speech. When speech is detected as present in the signal, normal G.723.1 encoding is performed. When speech is determined to not be present in the signal, a Comfort Noise Generation (CNG) algorithm uses a very low bit rate model of the background noise that is transmitted instead of the speech parameters. The G.723.1 speech coder operates upon 30 ms frames of digitized, telephone bandwidth speech signals sampled at 8 KHz. Each frame is divided into four 7.5 ms subframes of 60 samples each. Each frame of 240 input samples is converted into 12 16-bit word of compressed data at the high rate, or 10 16-bit words of compressed data at the low rate. The G.723.1 algorithm also incorporates a 7.5 ms look-ahead resulting in a 37.5 ms delay for the encoder. The complexity is high. It results in good speech quality, with a MOS value of 3.9. However, as with G.729A, the speech quality is better in clean background environments than those with noise. The Voice Activity Detection/Comfort Noise Generation (VAD/CNG) specified in Annex A to ITU-T G.723.1 may be used to further reduce the average bit rate.

The voice activity detection 113 is to reduce bit rates beyond those achieved by the speech coding algorithm itself, silence detection or voice activity detection/comfort noise generation (VAD/CNG) algorithms can be incorporated. Silence detection algorithms simply replace periods when speech is not present with silence, sometimes by not transmitting any packets and allowing the output to mute. While this is very simple and acceptable, and can greatly reduce the average bit-rate, many listeners find it annoying when the background noise is completely muted during periods when they are talking. Furthermore, it can sound as if the line has gone "dead". During periods of non-speech, it is generally preferable to produce some amount of "comfort noise" which sounds similar to the speaker's background noise.

The Signal Power Estimator Module 117 measures the average power level, in dBm, of an input signal over a specified number of frames. The total energy for input signal s(i) for the nth frame is accumulated to estimate the average power for the current frame $e(n) = (\alpha s_2[i])/L$ where $L$ is the frame size.

The dB level in Q8 format in respect to the saturation DC level is calculated as $p(n) = 256*10*\log(e(n))$ The following estimator then estimates the long-term average power:

$P[n] = (1-\alpha)P[n-1] + \alpha p[n]$

Where $\alpha = 1/N$, and N is the number of frames to be taken into the average.

The physical interface between the DSP 151 and the microprocessor 150 is performed via the Host Port Interface (HPI) 105. The HPI allows voiceband data messages to be transferred from the microprocessor to DSP and from DSP to the microprocessor, command/control information messages to be transferred from the microprocessor to DSP, and status information messages to be transferred from the DSP to the microprocessor.

The packetizer modules 110 and 118 are responsible for transferring information between the microprocessor and the DSP is encapsulated into a message. Each message is from 3 to 63 words in length. All 16-bit entities are formatted in big endian (most significant byte first) and describe the action to be performed by the receiving microprocessor and describe the contents of the data. Packetized data is composed of two general classes:

Command/Status Command messages define an operation that the microprocessor directs the DSP to perform. Status messages report an event detected by the DSP to the microprocessor.

Data messages contain information (typically encoded speech or FAX) associated with a stream enabled by a command previously sent from the microprocessor to the DSP.

Voice-over-packet systems require a "jitter" buffer 119 to compensate for delay variation due to packet queuing, network congestion, or other network phenomena. This delay results when a complete voice packet ready for transmission cannot be immediately transmitted. This may be because packets from other eual priority voice channels are also ready to be transmitted or because a lower priority data packet has started transmission and must be allowed to complete. This delay is dependent on a number of factors including the minimum size data packet, the number of other voice channels, which could simultaneously produce a packet, and the willingness to reduce network packet efficiency by transmitting a partially filled packet. The jitter buffer must be designed to prevent data starvation on the packet-receiving end, and may dynamically adjust its buffer depth depending on network performance characteristics.

The FSK 120 is a software module to generate frequency shift keying (FSK) signals used for generating Caller ID signals according to either Bellcore or ETSI requirements for either Type 1 (On-hook) or Type 2 (Off-hook) operation.

Comfort noise generation 122 algorithms are used in conjunction with voice activity detection algorithms (see VAD above) to reduce bit rates beyond those achieved by the speech-coding algorithm itself.

MNES bridge application software 100 is responsible for overall operation of the bridge and is described in FIGS. 7 through 16.

Storage 102 is a hardware module that stores all the voice or facsimile messages that are generated within the NMES Bridge. This hardware module is combination of SDRAM and flash memory. The flash memory is available via the onboard flash module or the flash disk provided by the USB interface.

The network interface 109 consists of the physical layer. The physical layer describes the physical characteristics of the communication, such as conventions about the nature of the medium used for communication, and all related details such as connectors, channel codes and modulation, signal strengths, wavelength, low-level synchronization and timing and maximum distances.

The PHY packetizer 108 constitutes the data link layer. The data link layer specifies how packets are transported over the physical layer, including the framing (i.e. the special bit patterns which mark the start and end of packets). Ethernet, for example, includes fields in the packet header which specify which machine or machines on the network a packet is destined for. Examples of Data-link layer protocols are Ethernet, Wireless Ethernet, SLIP, Token Ring and ATM.

In the preferred embodiment of this invention the physical interface packetizer 108 conforms to the 802.3 protocol.

The IP packetizer 107 forms the Internet Protocol packets. In the Internet protocol suite, IP performs the basic task of getting packets of data from source to destination. IP can carry data for a number of different higher-level protocols; these protocols are each identified by a unique IP Protocol Number. ICMP and IGMP are protocols 1 and 2, respectively.

The TCP/UDP module 107 formats the packets for use by the transport layer. The protocols at the Transport layer can solve problems like reliability ("did the data reach the destination?") and ensure that data arrives in the correct order. In the TCP/IP protocol suite, transport protocols also determine which application any given data is intended for. The dynamic routing protocols that technically fit at this layer in the TCP/IP Protocol Suite (since they run over IP) are generally considered to be part of the Network layer.

TCP (IP protocol number 6) is a "reliable", connection-oriented transport mechanism providing a reliable byte stream, which makes sure data arrives undamaged and in order, is re-transmitted if lost, and eliminates duplicate copies. TCP tries to continuously measure how loaded the network is and throttles its sending rate in order to avoid overloading the network. Furthermore, TCP will attempt to deliver all data correctly in the specified sequence. These are its main differences from UDP and can become disadvantages in real-time streaming or routing applications with high layer 3 loss rates.

UDP (IP protocol number 17) is a connectionless datagram protocol. It is a "best effort" or "unreliable" protocol—not because it is particularly unreliable, but because it does not verify that packets have reached their destination, and gives no guarantee that they will arrive in order. If an Application requires these guarantees, it must provide them itself, or use TCP. UDP is typically used for applications such as streaming media (audio and video, etc) where the time TCP requires for retransmission and re-ordering might not be available, or for simple query/response applications like DNS lookups, where the overhead of setting up a reliable connection is disproportionately large.

RTP is a datagram protocol that is designed for real-time data such as streaming audio and video. Although RTP uses the UDP packet format as a basis, it provides a function that is at the same protocol layer.

The SIP packetizer module 104 is responsible for using the Session Initiation Protocol (SIP) to communicate between different network entities. SIP is a text based control protocol intended for creating, modifying and terminating sessions with one or more participants. These sessions include Internet multimedia conferences, Internet telephone calls and multimedia distribution. Members in a session can communicate via multicast or via a mesh of unicast relations, or a combination of these. The protocol can be compressed by using Signaling Compression.

SIP invitations used to create sessions carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities.

SIP uses the ISO 10646 character set in UTF-8 encoding. Senders MUST terminate lines with a CRLF, but receivers MUST also interpret CR and LF by themselves as line terminators.

Figure 5:
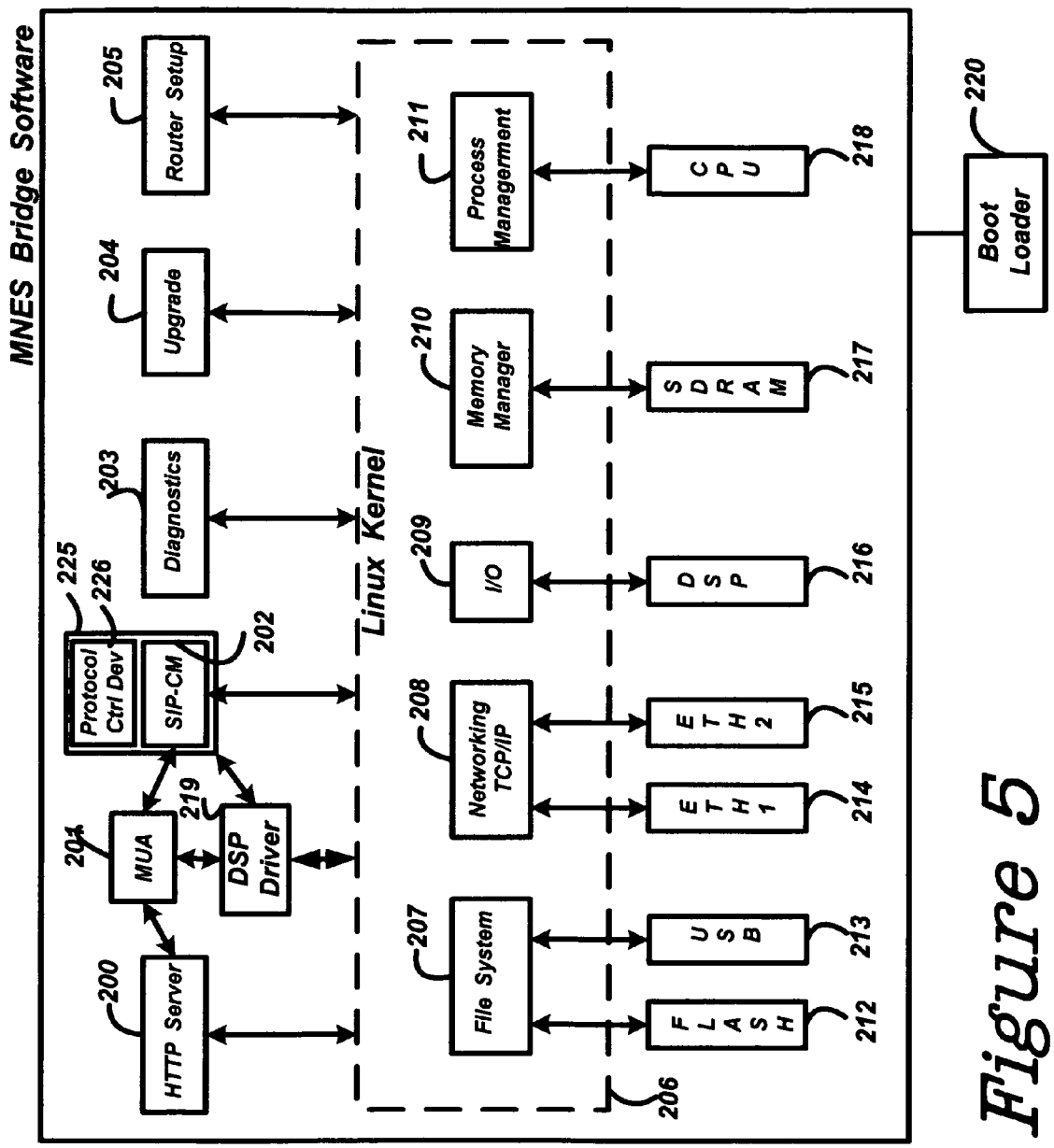
FIG. 5 is a block diagram of the programming architecture of the Multi-Network Exchange System of this invention.

Refer now to FIG. 5 for a description of the MNES Bridge software architecture. The software executed on the MNES Bridge consists of an embedded Operating System (OS). In the preferred embodiment of this invention the operating system is a Linux kernel 206. Additionally the MNES Bridge application executes in the user space of the OS 200 . . . 204 and consists of but is not limited to the MNES Bridge application (which is the main MNES Bridge control and logic program) 201, the MNES Bridge Protocol and Session Control device 225 which includes Protocol Control Device 226 and Session Initiation Protocol (SIP) manager 202, reset manager (which controls MNES Bridge hardware configuration) 203, kernel LED driver (to access 10 ports from within the kernel) 207, and various shell scripts (for file management and other configuration issues) 200, 217.

The protocol control device 226 is in communication with the PSTN network 90 of FIG. 2 and Internet 85. It receives the Data messages (encoded speech or FAX). The protocol control device 226 interprets and formats of the electronic information signals (data signals) between protocols and command structures of the PSTN network 90 and protocols and command structures of the internet 85 for transfer of the electronic information signals (data signals) between the PSTN network 90 and the internet 85.

The Session Initiation Protocol (SIP) [RFC2543] is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these.

In the preferred embodiment of this invention all of the above program code is stored on non-volatile memory 210 such as flash read only memory, in compressed form. The program code is uncompressed and loaded into a temporary memory 215, such as synchronous dynamic memory (SDRAM)—on an as needed basis. In the preferred embodiment of this invention the boot loader 220 and the linux kernel are stored using gzip compression, which conforms to RFC1952. The gzip specification defines a lossless compressed data format that is compatible with the widely used GZIP utility. The format includes a cyclic redundancy check value for detecting data corruption. The format presently uses the DEFLATE method of compression but can be easily extended to use other compression methods.

The root file system is stored using the Journaling Flash File System (JFFS) [http://sources.redhat.com/jffs2/jffs2-html/jffs2-html.html]. JFFS is a log-structured file system designed by Axis Communications AB in Sweden, and released under the GNU General Public License, specifically for use on flash devices in embedded systems, which is aware of the restrictions imposed by flash technology and which operates directly on the flash chips, thereby avoiding the inefficiency of having two journaling file systems on top of each other.

Figure 4:
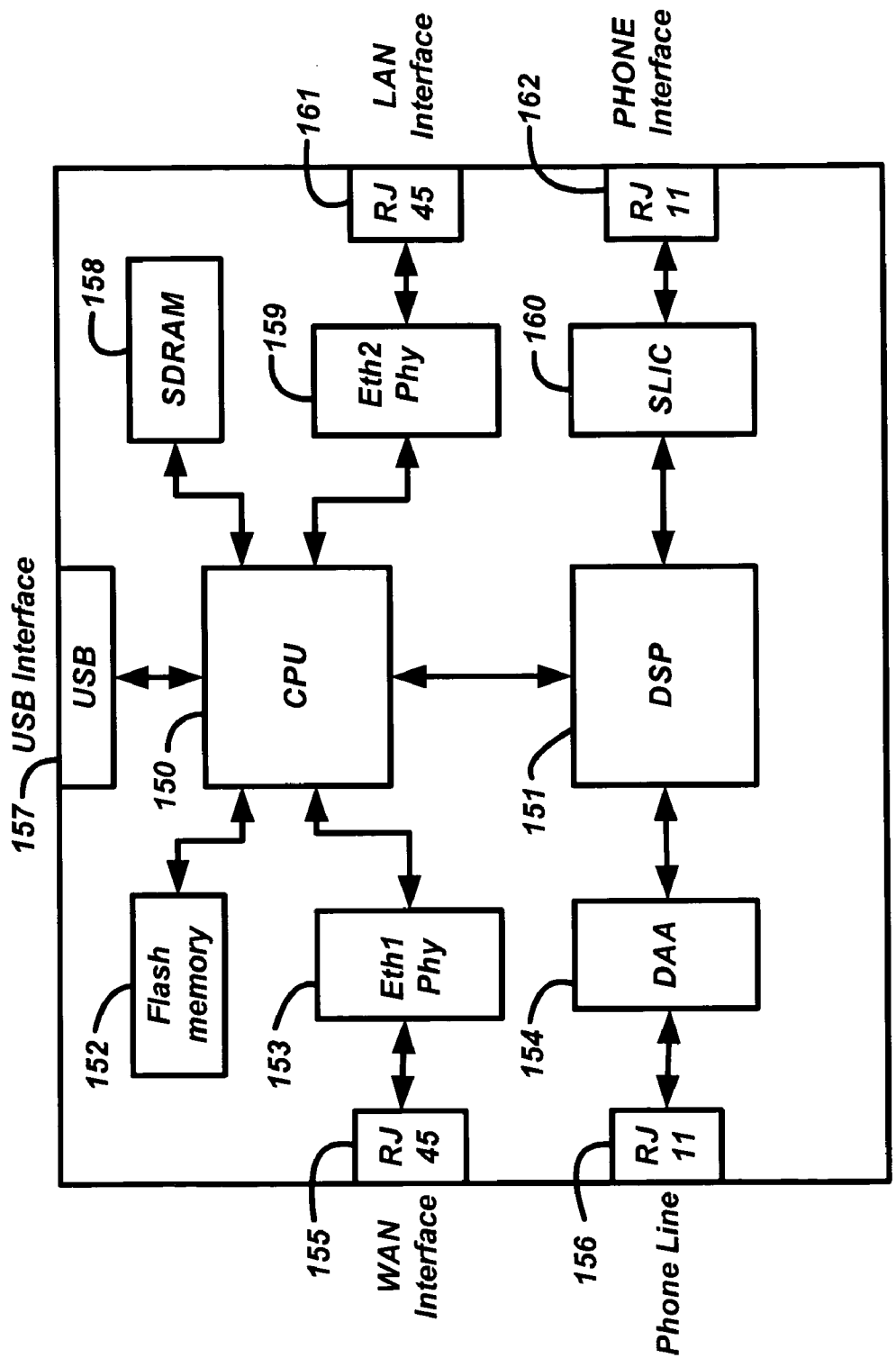
FIG. 4 is a function block diagram of an embodiment of the Multi-Network Exchange System Bridge of this invention.

The method for encoding voice in the preferred embodiment of this invention is complies with the specification G.723.1 [ITU-T recommendation G.723.1] but may be configured via a change in the MNES Bridge application software to use various other voice compression protocols as supported by the DSP processor 151 of FIG. 4. The G.723.1 coder is designed to operate with a digital signal obtained by first performing telephone bandwidth filtering of an analogue input, then sampling at 8000 Hz and then converting to 16-bit linear PCM for the input to the encoder. The output of the decoder should be converted back to analogue by similar means. Other input/output characteristics, such as those specified by ITU-T Recommendation G.711 for 64 kbit/s PCM data, should be converted to 16-bit linear PCM before encoding or from 16-bit linear PCM to the appropriate format after decoding.

The initiation or boot procedure for the MNES Bridge is controlled by the boot loader 220. The boot loader 220 in the preferred embodiment of this invention is provided by ATMEL [2325 Orchard Parkway, San Jose, Calif. 95131] and is designed specifically for the MNES Bridge microprocessor 150 of FIG. 4 which in the preferred embodiment of this invention is an ATMEL AT75C220 150 of FIG. 4. It is based upon the standard Armboot boot loader [http://armboot.sourceforge.net]. The boot loader 220 provides of setup various registers within the microprocessor 150 of FIG. 4. The initiation of the various registers allows the microprocessor to communicate and control various external components 212 . . . 218. The boot loader 220 further initiates various boot time parameters such as ethernet interface Media Access Control (MAC) addresses 214 and 215 and the memory location of the linux kernel 216 within the flash and SDRAM memory 212 and 217. The boot loader 220 further decompresses the linux kernel 216 and launches its execution. The boot loader also allows access to the board during development to allow low level changes to various parameters.

Upon power up the microprocessor 150 of FIG. 4 is designed to start executing code from a specific location in its memory map. The MNES Bridge is designed such that this location is pointing to a specific area of flash memory 212 that is the storage location of the boot loader 220. The microprocessor provides self-decompressing and the boot loader 220. Upon decompression the boot loader 220 is loader into SDRAM memory 217.

After the microprocessor 150 of FIG. 4 register configuration and MAC address initialization, the boot loader 220 decompresses the linux kernel 206 into the memory SDRAM 217 and passes control to the linux kernel 206, which begins the kernel initialization process.

During the kernel initialization process of the linux kernel 206 a root JFFS file system is mounted in the SDRAM memory 217. A RAM file system is mounted in the SDRAM memory 217 to allow for scratch space and other file system needs. The led driver kernel module 209 is attached to the linux kernel, the httpd server provides the Internet http protocol 200 is started, and the MNES reset manager 201 is started.

Figure 19:
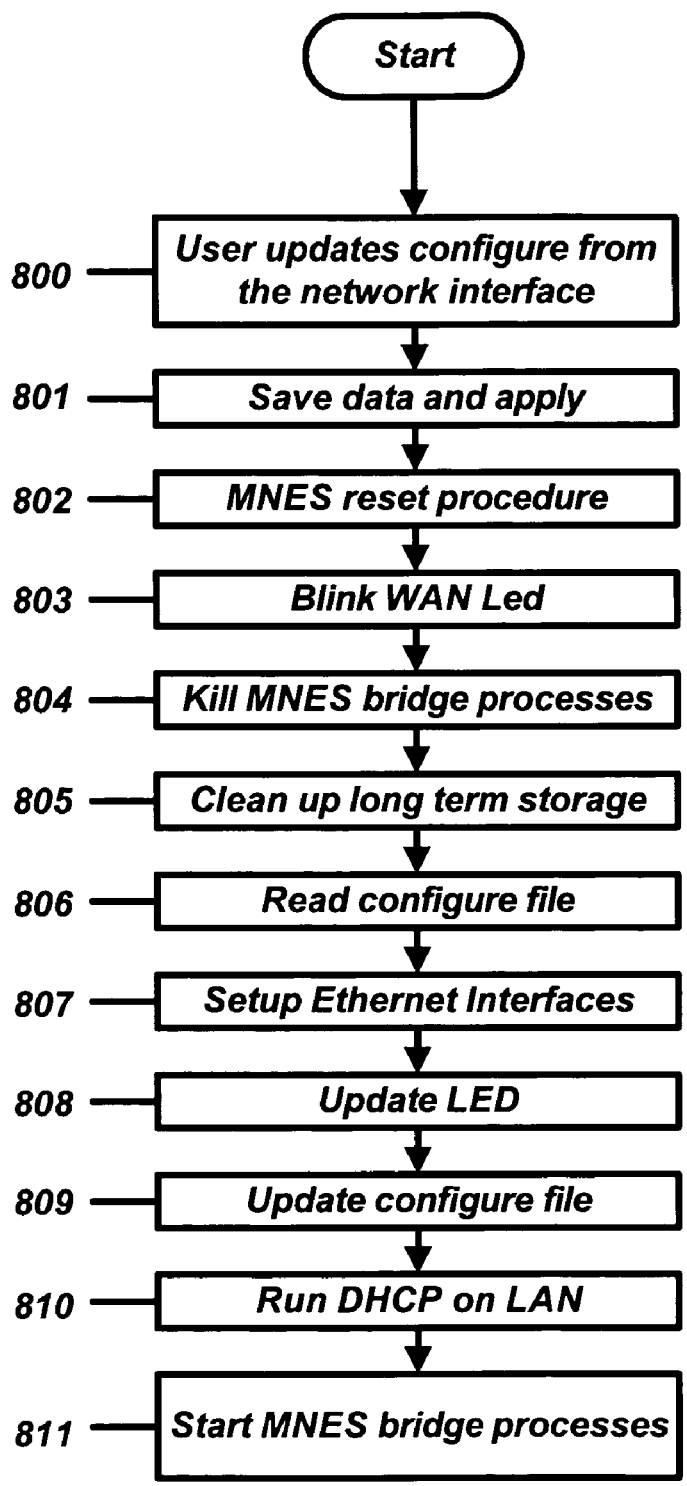
FIG. 19 is process diagram for the operation of the Graphical User's Interface Client of the Multi-Network Exchange System of this invention.

Refer now to FIG. 19 for a description of the MNES reset manager. During the MNES Bridge reset manager execution any currently executing MNES Bridge processes 200 . . . 205 of FIG. 5 are stopped 804. The Dynamic Host Configuration Protocol (DHCP) [RFC1541] server configuration file is removed 805 from flash memory 212 of FIG. 5. A MNES Bridge configuration file is opened 806 from flash memory 212 of FIG. 5 and parsed for easier manipulation. The Internet Protocol (IP) address configuration assigned to each ethernet interface 153 and 159 of FIG. 4 of the MNES Bridge is configured using values obtained from the configuration file 807. Domain Name Server (DNS) [RFC1034] configuration and default Internet routing are initialized using values obtained from the configuration file 807. If the WAN obtained a valid IP address then the led of the MNES Bridge is updated appropriately for user indication 808. If required by the configuration file routing between the Wide Area Network (WAN) ethernet interface 153 of FIG. 4 and Local Area Network (LAN) ethernet interface 159 of FIG. 4 is instantiated 807. The MNES Bridge application software determines if the WAN ethernet interface has been assigned a proper IP address either manually or through DHCP protocol. Because DHCP may have changed the values of the IP address for the WAN ethernet interface the current values for the configuration file are stored 809 to flash memory. If the configuration file indicates that a DHCP server is required to be running on the LAN ethernet interface 159 then the DHCP server daemon is executed 810. The current date and time are obtained from a Global MNES server 80. In the preferred embodiment of this invention the current date and time are obtained using the SNTP protocol [RFC2030].

Figure 6:
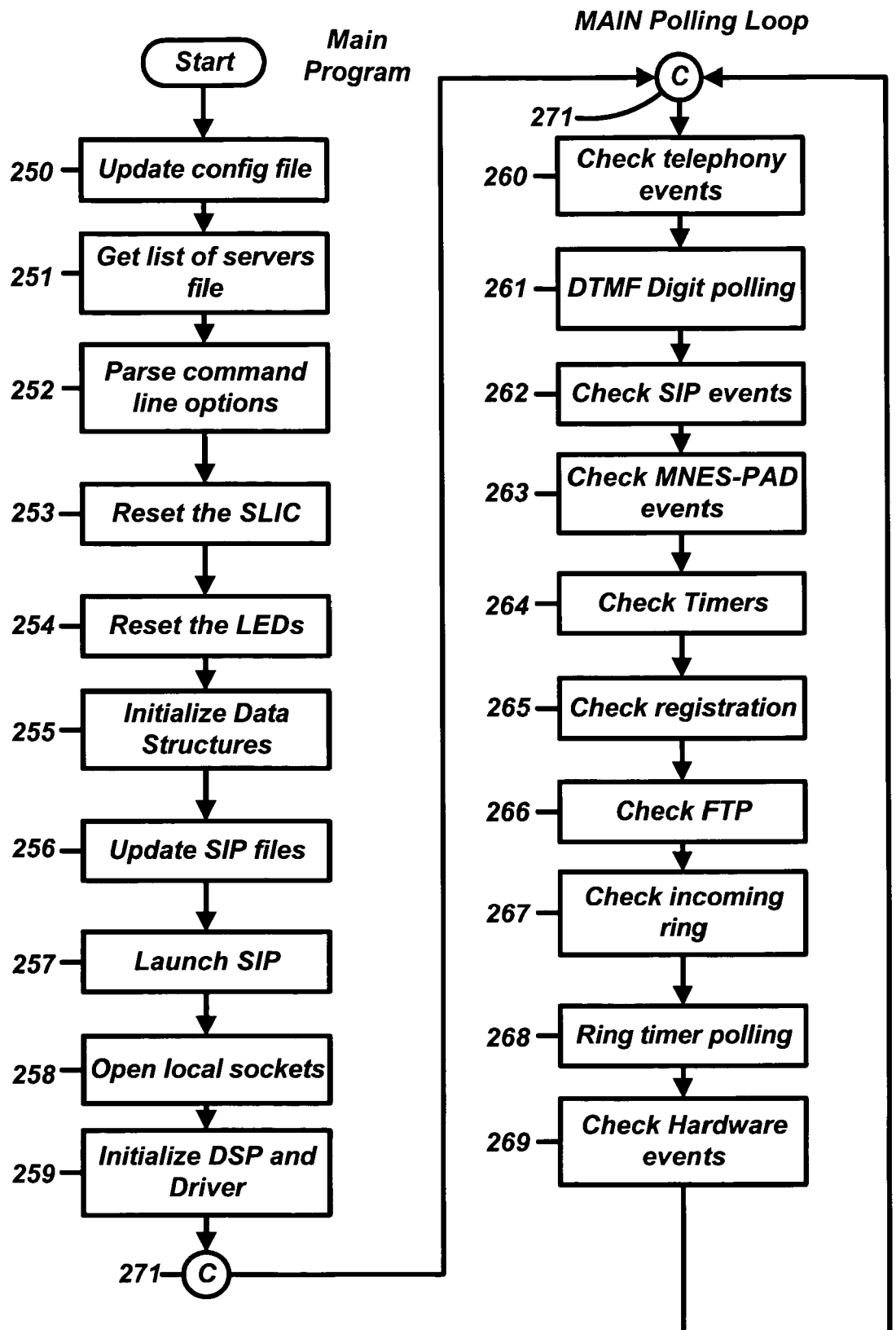
FIG. 6 is a process diagram of the operation of the Multi-Network Exchange System of this invention.

Refer now to FIG. 6 for the operational description of the MNES Bridge. Upon completion of the MNES reset manager routines, the MNES Bridge application software 201 of FIG. 5 is started 811 of FIG. 19. Upon initiation of the MNES Bridge application software the current software version information is updated and stored 250 to flash memory 212 of FIG. 5. In addition to the hardware configuration that occurred during the linux kernel 206 of FIG. 5 boot procedure further MNES Bridge hardware 150.162 of FIG. 4 configuration is performed 251 . . . 254. The "phone data structures" and are initialized 255. The "phone data structures" are stored in SDRAM memory 217 of FIG. 5 and contain state machine information, network socket addresses, digit buffers, file pointers, active inactive flags, IP addresses, MNES Bridge phone number, MNES Bridge password, global state machine state, and other variables that is apparent to those familiar with the art. Communication with the MNES SIP manager 202 of FIG. 5 is achieved through a local TCP/IP communication socket where the data packets never leave the MNES Bridge. The MNES SIP manager performs the underlying network signaling control protocol used to establish and maintain SIP connections through the Global MNES server 80 of FIG. 2. During the initialization of the MNES Bridge application software the MNES SIP manager communication channels are opened 258 and the MNES SIP manager code is started 257.

In the preferred embodiment of this invention the DSP driver code 219 of FIG. 5 is included within the MNES base application software. The DSP processor 151 of FIG. 4 is initialized 259 by sending appropriate commands to the DSP driver code.

The main polling loop 271 is started, which processes any and all events including network events, telephony events, voice processing for the MNES Bridge. The main polling loop polls for the following event types; phone telephony events (e.g. off hook, key press) 260, Dual Tone Multi Frequency (DTMF) event processing 261, SIP network events 262, MNES portable access device events 263, various timers polling 264, SIP registration timer 265, network File Transfer Protocol (FTP) [RFC959] for "real-time" voice packet network send events 266, incoming ring events 267 and 268 from the DAA 154 of FIG. 4, and polling 269 of events from the DSP driver code 219 of FIG. 5.

Figure 7A:
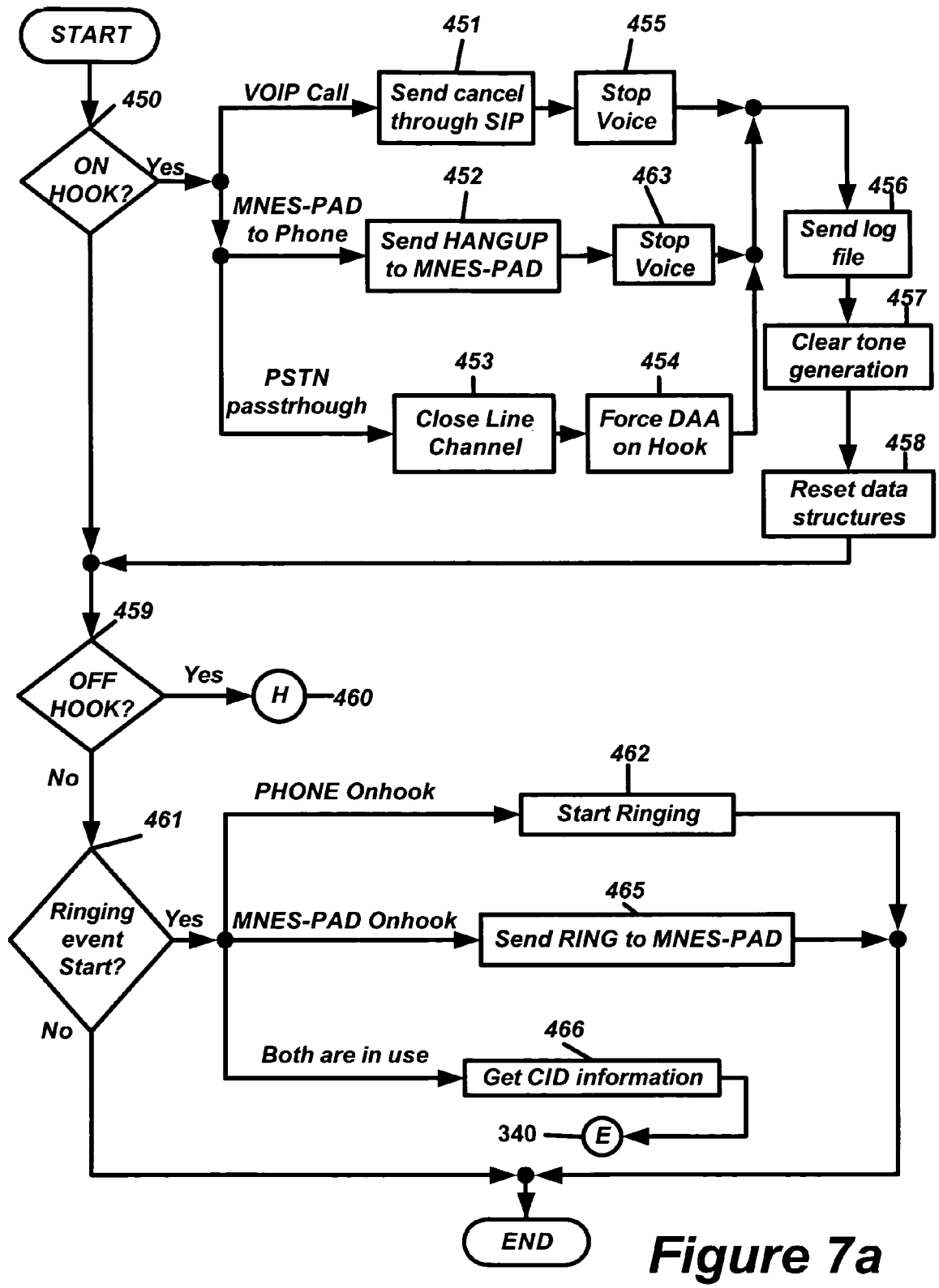
FIGS. 7a-7c are flow diagrams detailing telephony event processing of a Multi-Network Exchange System of this invention.
Figure 7B:
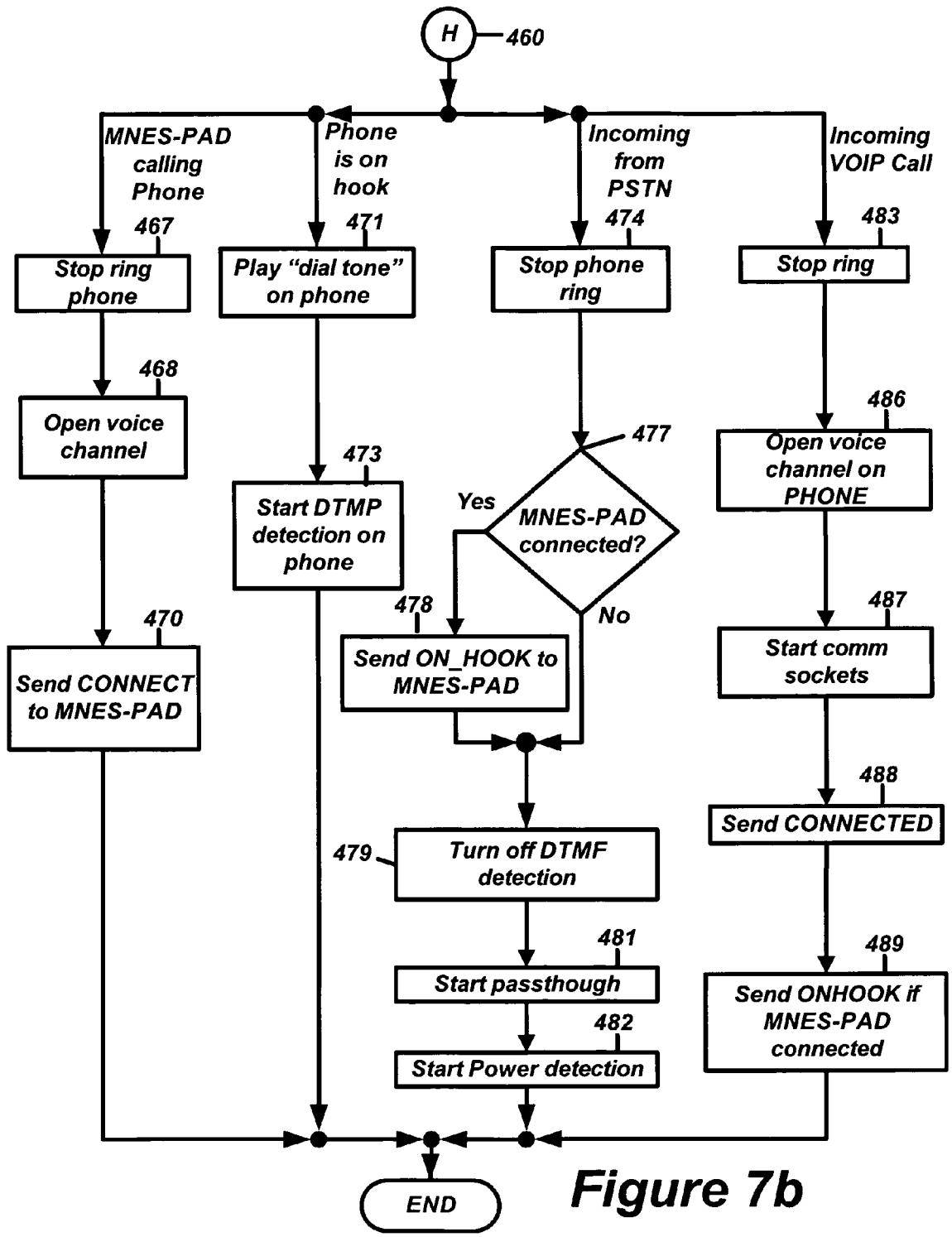

Refer now to FIG. 2 and FIG. 7 for the description of Telephony Event processing of the MNES Bridge. Events which are generated by user interaction through the DAA 154 of FIG. 4 and the SLIC 160 of FIG. 4 are processed through the telephony events procedure. An event occurs when the phone 60 is taken off hook, placed on hook, or the DAA 154 of FIG. 4 detects an incoming ring. The event type and associated information is accessible to the MNES Bridge application software 201 of FIG. 5 through polling the DSP driver software 219 of FIG. 5.

When the MNES Bridge application software receives 450 an on hook 10 event and there is currently a VOIP call in progress from the phone 60 to a remote network VOIP device 97 . . . 99, then a SIP HANGUP signal is sent 451 to the MNES SIP manager program 202 of FIG. 5 which transmits a SIP message over the data network 85 to the remote network VoIP device 98 indicating that the MNES Bridge phone 60 has hung up.

When the MNES Bridge application software receives an on hook event 450 and there is currently a MNES Bridge to MNES portable access device call in progress then the MNES Bridge 55 transmits 452 a HANGUP signal over the data network 85 to the MNES portable access device 75 and stops 463 voice processing on the DSP processor 151 of FIG. 4 channel that is connected to the SLIC 160 of FIG. 4.

In the preferred embodiment of this invention a pstn pass through (PSTN-PT) call is defined as processing voice from the phone 60 of the MNES Bridge to the line 156 of the MNES Bridge. In the preferred embodiment of this invention PSTN-PT is achieved by bridging the phone channel and the line channel within the DSP processor 151 of FIG. 4. When the MNES Bridge application software receives an on hook event 450 and there is currently a PSTN-PT call active then the DAA 154 of FIG. 4 is placed on hook and voice processing is stopped by sending 453 and 454 appropriate commands to the DSP driver code 219 of FIG. 5.

If a call is in progress when the MNES Bridge application software receives an on hook event 450 a call log is generated and transmitted 456 over the data network 85 to a Global MNES server 80. If there was a tone playing on the active channel when the MNES Bridge application software received the hang up signal from the DSP driver software code then playback of the tone is stopped 457 and data structures for the channel that received the on hook signal are re-initialized 458.

The MNES Bridge application software receives an off hook event 459, when the MNES Bridge phone 60 is removed from the receiver. When the MNES Bridge application software 201 of FIG. 5 receives an off hook event 459, and there is a MNES portable access device 75 attempting to call the MNES Bridge phone 60 then the phone ringing is stopped 467. Voice processing is initiated on the DSP processor 151 of FIG. 4 channel that is connected to the SLIC 160 by signaling 468 the DSP driver level code 219. The "phone data structures" for the phone channel of the MNES Bridge 55 and the phone channel of the MNES portable access device 75 are updated 469. A CONNECT signal is transmitted 470 to the MNES portable access device 75 indicating to the MNES portable access device that the MNES portable access device can begin voice processing. As digital voice data is received by the MNES application software from the DSP driver code 219 the digital voice data is packetized and sent through the data network 85 to the MNES portable access device 75. As packetized voice data is received from the data network 85 as sent by the MNES portable access device 75 the voice data is sent to the DSP driver for playback on the MNES Bridge phone 60.

When the MNES Bridge application software receives an off hook event 459, and the MNES Bridge phone 60 is on hook and there are no incoming events occurring then a special VoIP dial tone is played back 471 on the MNES phone 60 and DTMF detection is started 473 on the phone channel. When the MNES Bridge application software receives an off hook event 459, and there is an incoming PSTN call then the MNES Bridge phone 60 is stopped 474 from further ringing. If there is a MNES portable access device 75 connected 477 and ringing for the same incoming PSTN call as the MNES Bridge phone 60 then an ONHOOK command signal is transmitted 478 to the MNES portable access device 75 indicating that the incoming PSTN call is no longer available to the MNES portable access device. PSTN-PT mode is initiated 479 . . . 481 on the DSP processor 151 of FIG. 4, and power detection is started 482 on the DSP processor input channel attached to the DAA 154 such that the automatic answering machine detection algorithm will function.

When the MNES Bridge application software 201 of FIG. 5 receives 461 a ring event generated by the DAA 154 of FIG. 4 and the MNES Bridge phone 60 is on hook then ringing is started 462 on the MNES Bridge phone. When the MNES Bridge application software 201 of FIG. 5 receives 465 a ring event generated by the DAA 154 of FIG. 4 and the MNES portable access device is connected and in an on hook state then a RING signal is transmitted 465 through the data network 85 to the to the MNES portable access device 75 indicating an incoming call is available. If both the MNES Bridge phone 60 and the MNES portable access device 75 are in use then the incoming call may be automatically answered 466 by the MNES.

Figure 7C:
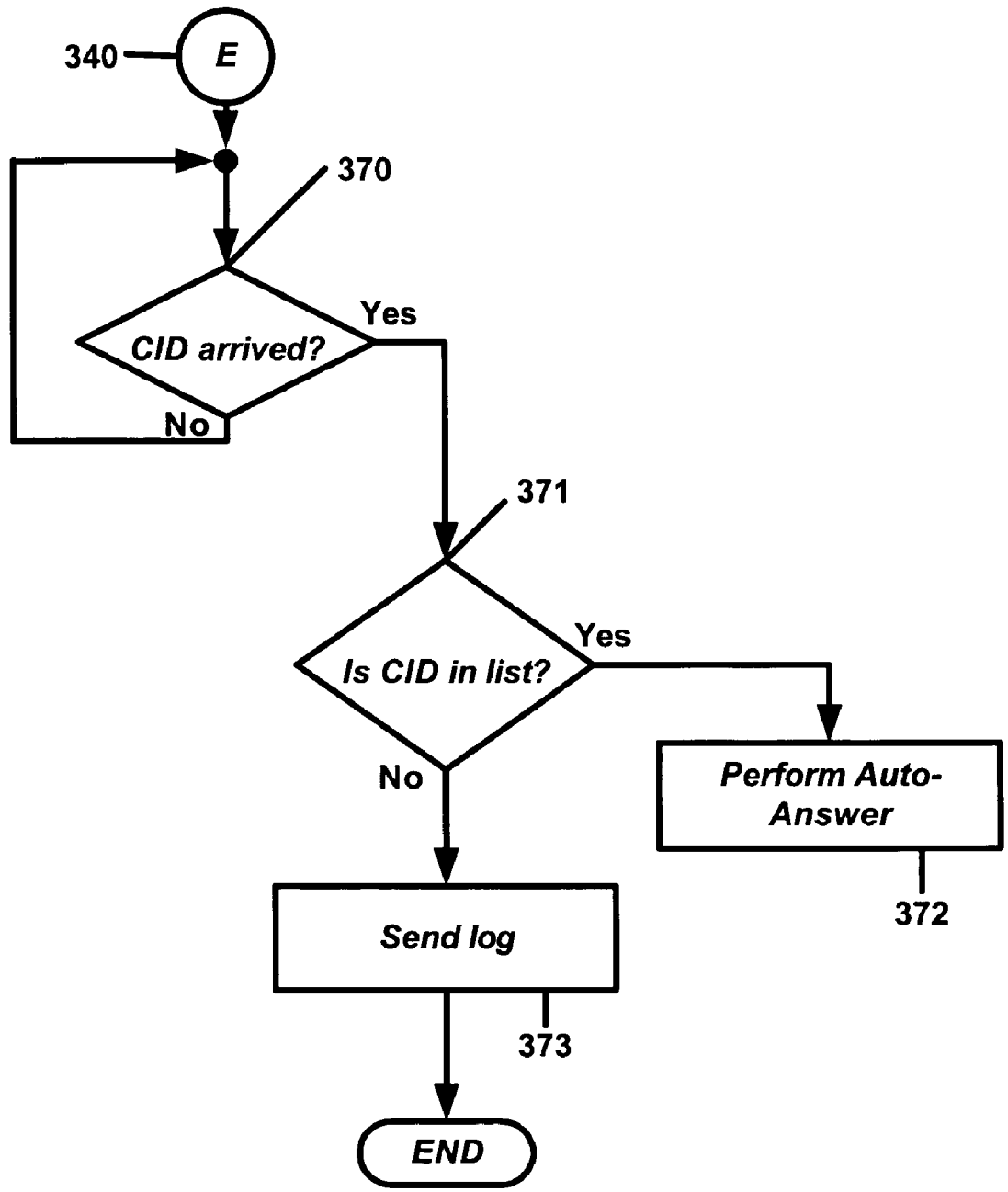

Refer now to FIG. 2 and FIG. 7c for a description of Caller ID (CID) based automatic line answering authentication. When the MNES Bridge 55 receives an incoming ring signal from the PSTN and no devices 60 and 75 are available to answer the call then the incoming call may be automatically answered by the MNES Bridge. The MNES Bridge will wait 370 for a CID signal from the PSTN and upon receiving a PSTN will check the incoming caller's telephone number against a list of known phone numbers. If the telephone numbers match then the incoming user is unconditionally granted access 372 to the MNES Bridge and presented with a VoIP dial tone. If the telephone numbers do not match a log file is transmitted 373 to a Global MNES server 80 and the incoming call is ended.

Figure 8:
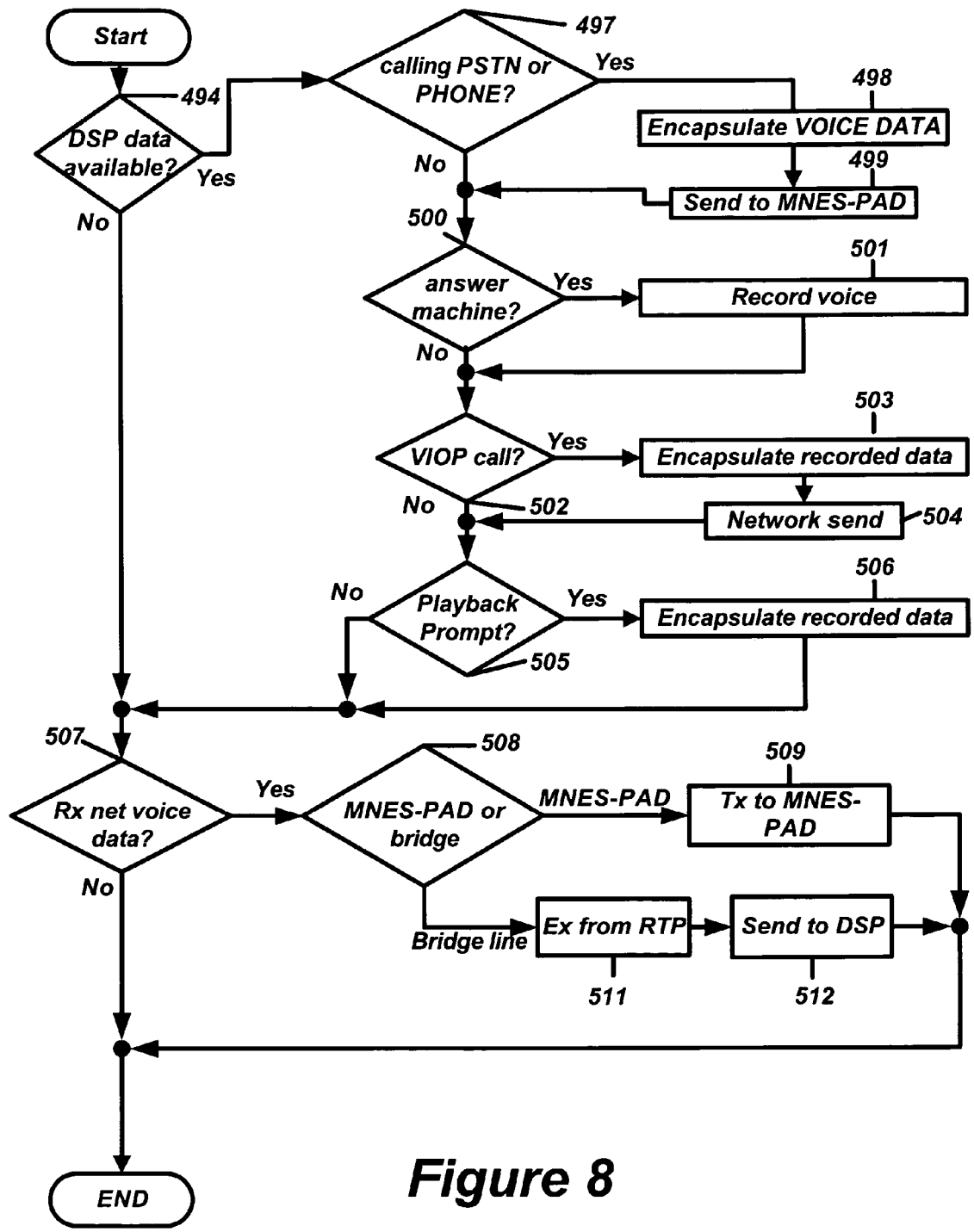
FIG. 8 is a flow diagram detailing digital voice processing of a Multi-Network Exchange System of this invention.

Refer now to FIG. 2 and FIG. 8 for a description of Digital Voice data processing. In the preferred implementation of this invention digital voice data complies with ITU.T G.723.1 specification. Digital voice data received by the MNES application software 201 of FIG. 5 from the DSP processor 151 of FIG. 4 is encapsulated in RTP packets and sent over the data network 85 to a receiving device 75 and 97 . . . 99. Digital voice data received over the data network 85 is extracted from the RTP packet and sent to the DSP processor 151 of FIG. 4 for playback on the proper channel 60 or 90.

When the MNES application software receives 494 voice data from the DSP processor 151 of FIG. 4 and the MNES portable access device 75 is processing an active call to either the MNES Bridge PSTN line 91 or the MNES brdige phone 60 then the voice data from the DSP processor is encapsulated 498 in an RTP packet and transmitted 499 to the MNES portable access device.

When the MNES application software 201 of FIG. 5 receives 494 voice data from the DSP processor 151 of FIG. 4 and the MNES Bridge is recording 500 either a FAX transmission or an answering machine call then the digital data from the DSP processor is either recorded 501 on flash memory 212 of FIG. 5 or transmitted 212 of FIG. 5 to an appropriate Global MNES server 80.

When the MNES application software 201 of FIG. 5 receives 494 voice data from the DSP processor 151 of FIG. 4 and either the MNES Bridge phone 60 or the MNES Bridge PSTN line 91 is processing an active VoIP call then the data received from the DSP processor is encapsulated 503 in an RTP packet and transmitted 504 to the appropriate remote network VoIP device 97 . . . 99.

The G723.1 protocol specifies a 6.3 kHz sampling rate which receives and generates samples of voice data every 30 milliseconds. In the preferred embodiment of this invention, when a recorded voice file is being played back 505 over either the MNES Bridge phone 60 or the MNES Bridge PSTN line 91 or being transmitted over the data network 85 then the receipt of packets 494 from the DSP processor 151 of FIG. 4, which occurs every 30 ms., is used timing for the transmission 506 of recorded data packets to either a remote network device 97 . . . 99 or to the DSP processor for playback.

When the MNES Bridge 55 receives 507 a voice packet from the data network 85 and the packet's destination 508 is for an active call on the MNES portable access device 75 then the packet is transmitted from the MNES Bridge to the MNES portable access device.

When the MNES Bridge 55 receives 507 a voice packet from the data network 85 and the packet's destination 508 is for an active call on either the MNES Bridge phone 60 or the MNES Bridge PSTN line 91 then the voice data is extracted 511 from the RTP packet and sent 512 to the DSP processor 151 of FIG. 4 for playback on the appropriate channel 60 or 90.

Figure 9A:
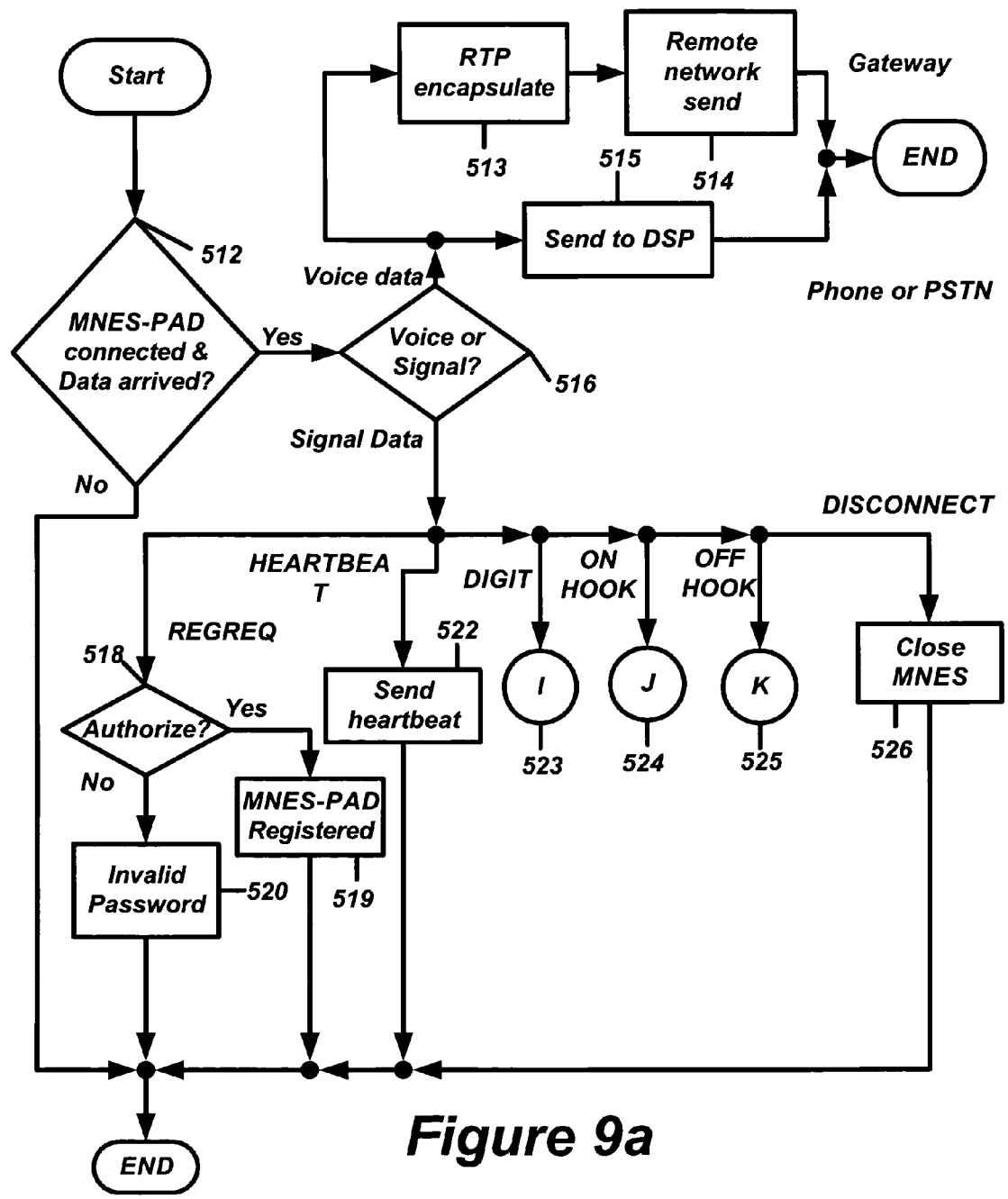
FIGS. 9a-9d are flow diagrams describing Multi-Network Exchange System Portable Access Device signal processing of the Multi-Network Exchange System of this invention.

Refer now to FIG. 9a and FIG. 2 for a description MNES portable access device 75 signal processing. All command data exchanged between the MNES portable access device 75 and the MNES Bridge 55 are binary arrays. It is ascertained if a packet is signal data or voice data from the first byte of the packet, where the first byte=1 means voice data and where first byte=0 means signal data.

When a connection is established between a MNES portable access device 75 and a MNES Bridge 55 and a message is received 512 from the MNES portable access device it is determined 516 if this message is voice data or is signaling data.

When the MNES Bridge 55 receives a message from the MNES portable access device 75 which contains voice data 516 and there is an active VoIP call between the MNES portable access device and a remote network VoIP device 97 . . . 99 then the voice data is encapsulated 513 in a Real Time Protocol (RTP) packet and transmitted 514 to the appropriate network IP address of the remote network VoIP device 97 . . . 99. When the MNES Bridge receives a message from the MNES portable access device which contains voice data 516 and there is an active VoIP call between the MNES portable access device to either the MNES Bridge phone 60 or the MNES Bridge PSTN line 91 then the voice data is transmitted 515 to the proper DSP 151 of FIG. 4 channel for playback.

The MNES portable access device 75 registers with the MNES Bridge 55 by transmitting a REGREQ data signal data to the MNES Bridge. In the preferred embodiment of this invention the REGREQ data message contains an encrypted password. If a valid password is received 518 from the MNES portable access device then a REGACK signal is sent to the MNES portable access device indicating that the MNES portable access device connection with the MNES Bridge is established 519, otherwise an INVALID_PASSWORD message is transmitted 520 to the MNES portable access device.

In the preferred embodiment of this invention the network data communication protocol between the MNES Bridge 55 and the MNES portable access device 75 is UDP. To assure an "open" communication channel between a MNES Bridge and a MNES portable access device a HEARTBEAT message is transmitted between both devices every 30 m seconds to maintain the connection. When the MNES Bridge 55 receives a HEARTBEAT data signal from the MNES portable access device 75 then the MNES Bridge transmits 522 a new HEARTBEAT message to the MNES portable access device.

Figure 9B:
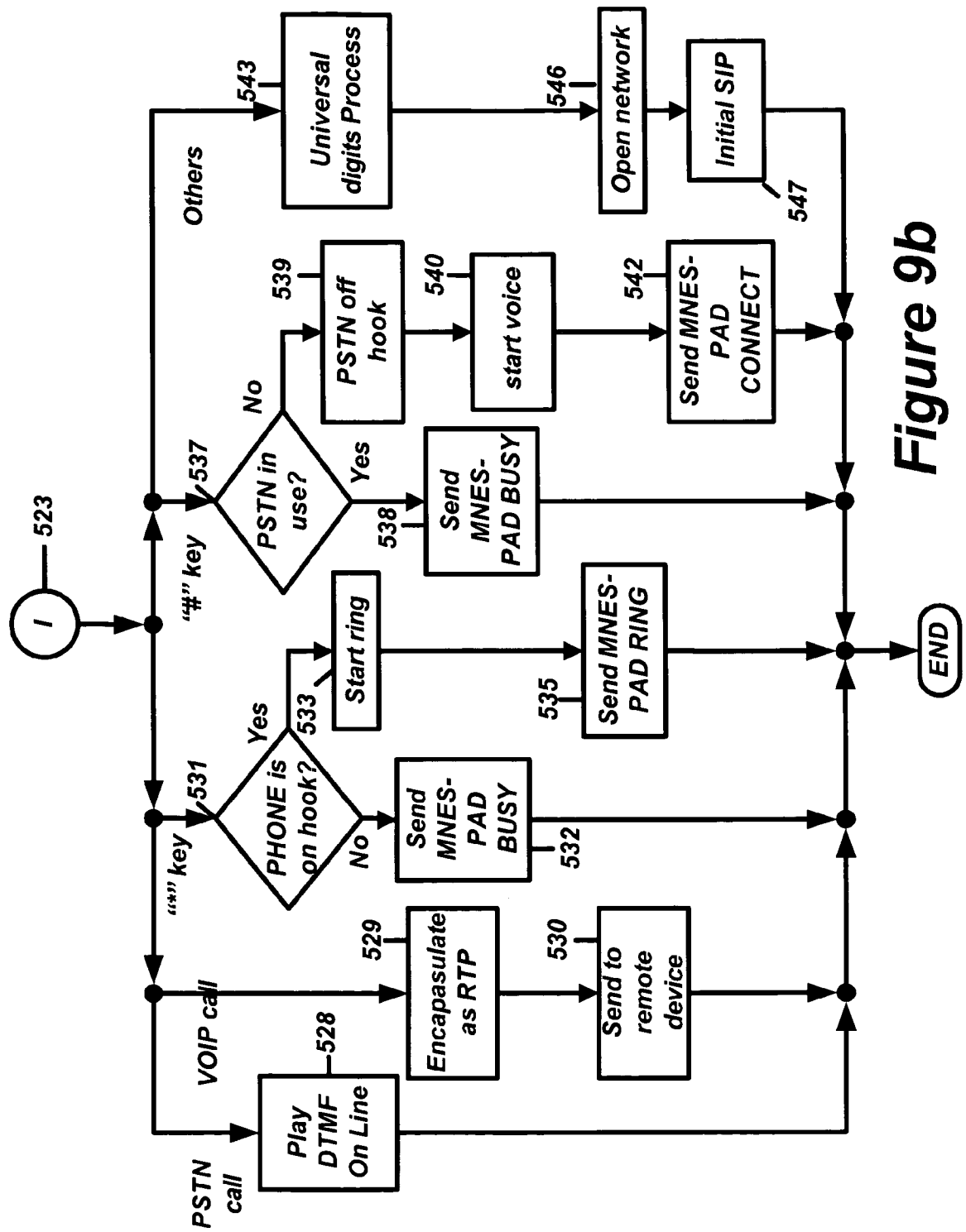

Refer now to FIG. 9b for a description of the processing 523 of MNES portable access device 75 signaling data received by the MNES Bridge 55 containing a DIGIT message appended with either a single digit or as a sequence of digits.

When the MNES Bridge 55 receives 523 a DIGIT message and the MNES portable access device 75 is currently performing a MNES portable access device to MNES Bridge PSTN line 91 call then the MNES Bridge will inject a 100 millisecond multi-frequency DTMF tone on the DAA 154 of FIG. 4, as specified by ITU-T Q.24; The output multi-frequency tone corresponds to the digit value received from the MNES portable access device.

In the preferred implementation of this invention, when the MNES Bridge 55 receives 523 a DIGIT message and the MNES portable access device 75 is currently performing a MNES portable access device to remote network VoIP device 97 . . . 99 call then the value of the digit received from the MNES portable access device is encapsulated 529 in an Out Of Band (OOB) packet as specified in the Real Time Protocol (RTP) [RFC1889] and the OOB RTP packet is transmitted 530 to the remote network VoIP device 97 . . . 99.

When the MNES Bridge 55 receives 523 a DIGIT message from a registered MNES portable access device 75 containing a single "star" key (DTMF digit 0×10) and the MNES Bridge phone 60 is on hook, the MNES Bridge phone is started 533 ringing and a RING signal is transmitted 535 to the MNES portable access device. When the MNES Bridge 55 receives 523 a DIGIT message from a registered MNES portable access device 75 containing a single "star" key (DTMF digit 0×10) and the MNES Bridge phone 60 is off hook then a BUSY signal is transmitted 532 to the MNES portable access.

When the MNES portable access device 75 user wishes to make a call though the MNES Bridge PSTN line 91 a DIGIT message containing a single "pound" key (DTMF digit 0×11) is transmitted to the MNES Bridge 55. If the MNES Bridge PSTN line is in use 537 upon receipt of a "pound" DIGIT message from the MNES portable access device then a BUSY signal is transmitted 538 to the MNES portable access device. Whereas if the MNES Bridge PSTN line 91 is available 537 upon receipt of a "pound" DIGIT message from the MNES portable access device 75 then the MNES PSTN line is taken 539 off hook and voice processing is started 540 on the DAA 154 of FIG. 4 output channel of the DSP 151 of FIG. 4 and a CONNECT signal is transmitted 542 to the MNES portable access device.

When the MNES Bridge 55 receives a DIGIT message from a registered MNES portable access device 75 and the MNES portable access device is not currently processing any events and the first digit of the DIGIT message received by the MNES Bridge is neither a "Star" key nor a "pound" key then a MNES portable access device 75 to data network VoIP device 97 . . . 99 call is initiated 543 and 546 and 547.

Figure 9C:
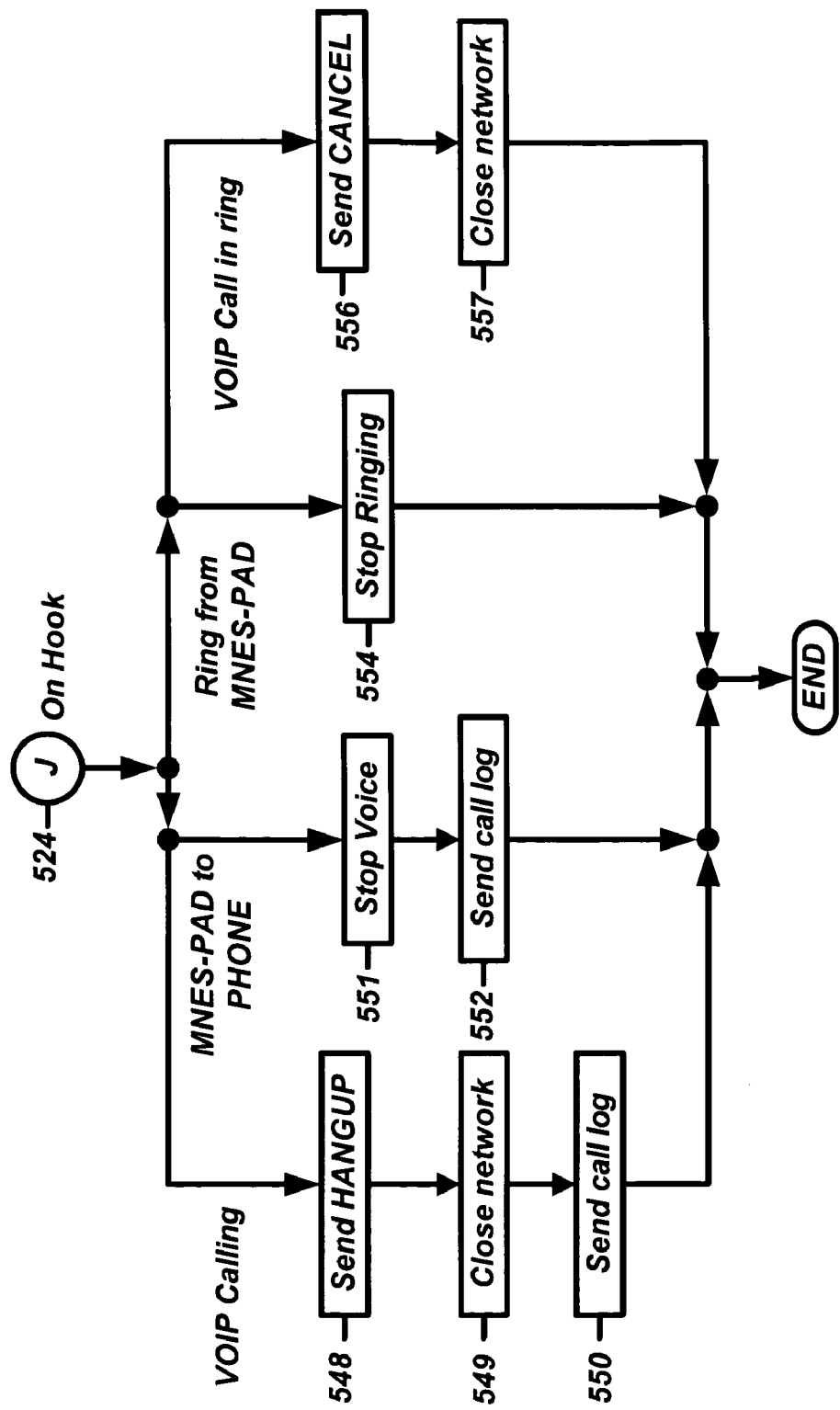

Refer now to FIG. 9c for a description of the processing 524 of MNES portable access device 75 signaling data received by the MNES Bridge 55 containing an ONHOOK message.

When the MNES Bridge receives 524 an ONHOOK signal from the MNES portable access device 75 and the MNES portable access device is processing a remote network device 97 . . . 99 VoIP call then a SIP HANGUP message is transmitted 548 to the remote network VoIP device 97 . . . 99 indicating that this call is finished from the MNES portable access device endpoint after which network voice communication socket(s) are closed 549 and a call log is transmitted 550 to the appropriate Global MNES server 80.

When the MNES Bridge receives 524 an ONHOOK signal from the MNES portable access device 75 and the MNES portable access device is processing an active MNES portable access device 75 to MNES Bridge unit phone 60 call then voice processing on the MNES Bridge phone channel is stopped 551 and a call log is transmitted 552 to the appropriate Global MNES server 80.

When the MNES Bridge receives 524 an ONHOOK signal from the MNES portable access device 75 and the MNES Bridge phone 60 is ringing for a call from the MNES portable access device then the MNES Bridge phone ringing is halted 554.

When the MNES Bridge receives 524 an ONHOOK signal from the MNES portable access device 75 and the MNES portable access device has initiated a MNES portable access device 75 to remote data network VoIP device 97 . . . 99 call then a SIP CANCEL message is transmitted 556 to the remote network VoIP device and any open network data communication sockets on the MNES Bridge for this call are closed 557.

Figure 9D:
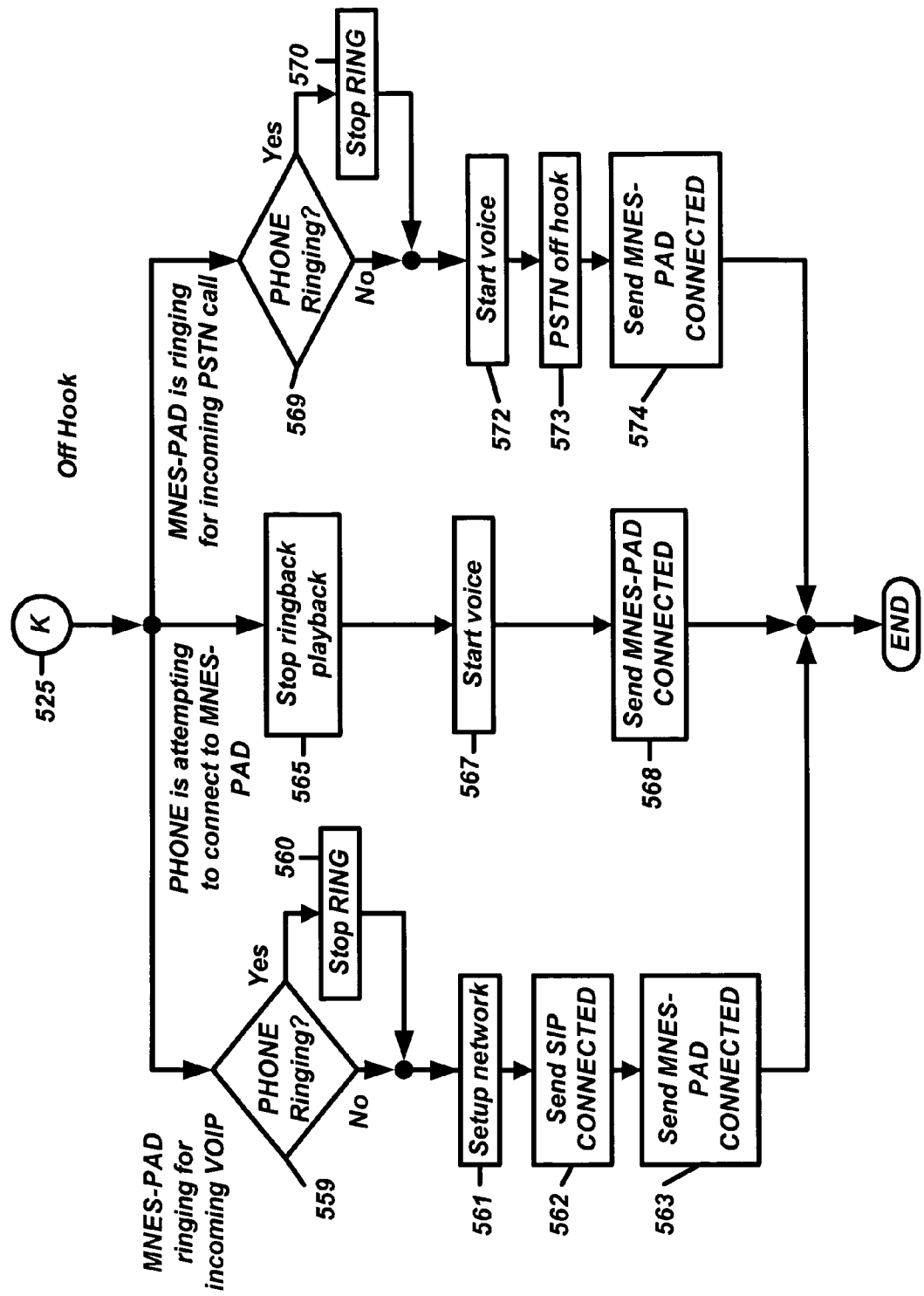

Refer now to FIG. 9d for a description of the processing 524 of MNES portable access device 75 signaling data received by the MNES Bridge 55 containing an OFFHOOK message.

When the MNES Bridge 55 receives 525 an OFFHOOK message and the MNES portable access device 75 is currently ringing for an incoming VoIP call from a remote network VoIP device 97 . . . 99 if the MNES Bridge phone 60 is ringing for the same call 559 then the MNES Bridge phone 60 ringing is stopped 560. Network communications sockets are opened 561 for full-duplex voice with the remote data network VoIP device 97 . . . 99, and a SIP CONNECTED signal is transmitted 562 to the remote data network VoIP device from the MNES Bridge 55 and then a CONNECTED message is transmitted 563 to the MNES portable access device 75.

When the MNES Bridge 55 receives 525 an OFFHOOK message and the MNES Bridge phone 60 is attempting to contact the the MNES portable access device 75 then ringback tone playback on the DSP processor 151 of FIG. 4 phone channel is stopped 565 voice G723.1 data processing on the MNES Bridge phone 60 is started 567, and a CONNECTED signal is transmitted 568 to the MNES portable access device 75.

When the MNES Bridge 55 receives 525 an OFFHOOK message and the MNES portable access device 75 is currently ringing for an incoming PSTN call. If the MNES Bridge phone 60 is also ringing for this incoming PSTN call then stop 570 ringing the MNES Bridge unit phone 60, start 572 voice processing on MNES Bridge PSTN line, place the DAA 154 of FIG. 4 in an off hook state, and transmit 574 a CONNECTED signal to the MNES portable access device 75.

Figure 10:
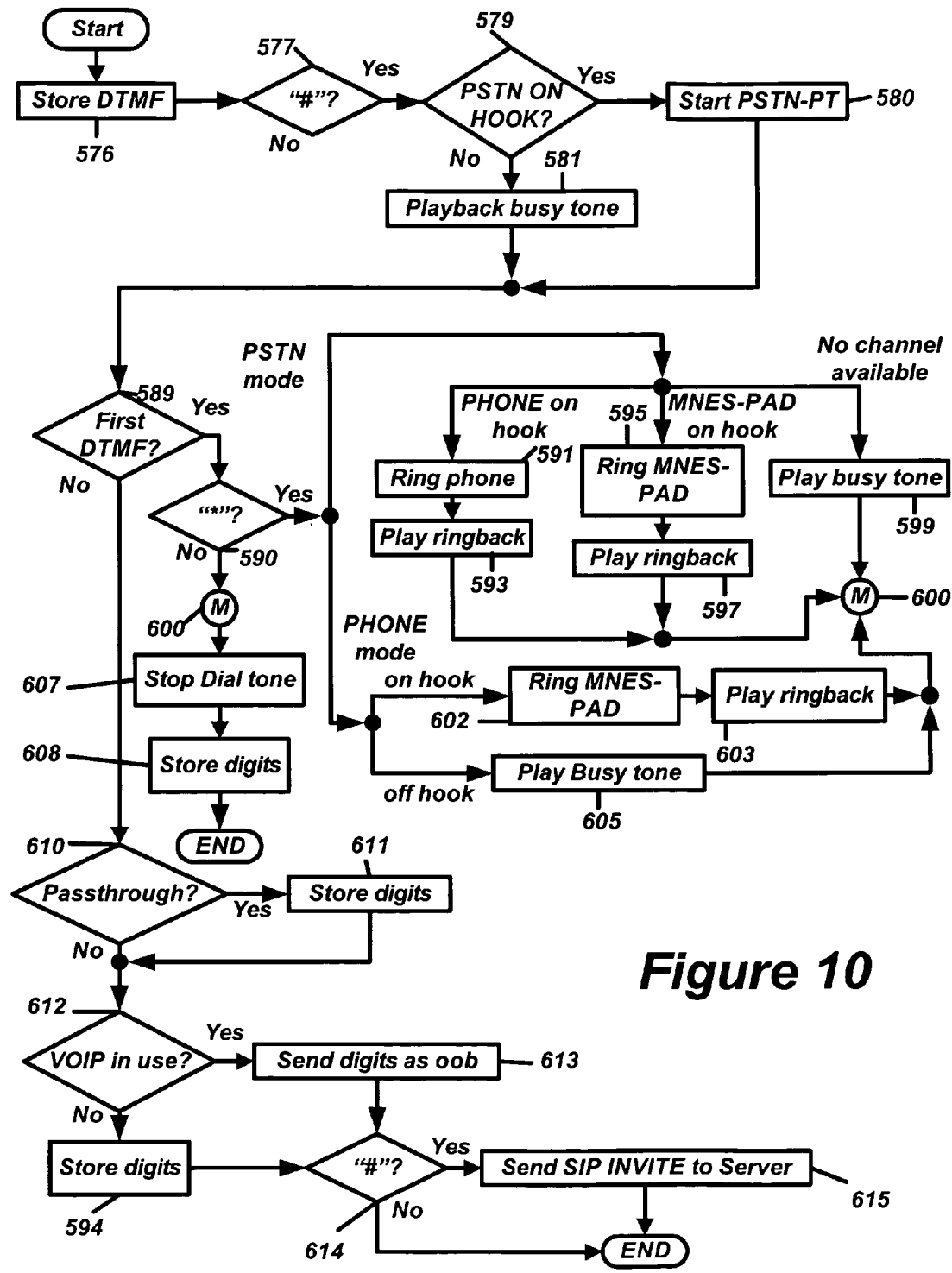
FIGS. 10a-10b are flow diagrams illustrating Multi-Network Exchange System Telephone DTMF processing of a Multi-Network Exchange System of this invention.

Refer now to FIG. 2 and FIG. 10 for a description of MNES Bridge DTMF digit processing which occurs when either the MNES Bridge phone 60 or the MNES PSTN line 90 is off hook and the DSP 151 of FIG. 4 has been setup to decode DTMF digits. When a DTMF digit is interpreted by the DSP 151 of FIG. 4 the digit data is transmitted from the DSP driver code 219 of FIG. 5 to the MNES application software 201 of FIG. 5 as a hexadecimal value where 0×0-0×09 is equal to digits 0-9, 0×10 for the STAR key, and 0×11 for the pound key, and 0xff for a DTMF release. When MNES Bridge application software receives 576 a DTMF digit the MNES application software first determines if this event is occurring on either the line 90 or the phone 60 and any further processing is applied to the data structures for this channel.

When the first digit received 577 from the DSP driver code 219 of FIG. 5 is a pound key and the DAA 154 of FIG. 2 is unavailable then a busy tone is played 581 back through the MNES Bridge phone 60. If the DAA is available upon receipt of the first DTMF digit then a PSTN-PT call is initiated 580.

When the MNES application software 201 of FIG. 5 receives 589 the first DTMF digit from a MNES Bridge channel and the digit value is neither 0×10 or 0×11 590 then dial tone playback is stopped 607 on the channel sending the DTMF digit and the digit is stored in a digit buffer in SDRAM memory 217 of FIG. 5.

When the MNES application software 201 of FIG. 5 receives 589 the first DTMF digit from the MNES Bridge phone 60 and and the digit value is 0×10 "star" 590 then a connection attempt with an MNES portable access device is attempted 602 and 603 and 605.

When the MNES application software 201 of FIG. 5 receives 589 the first DTMF digit from the MNES Bridge PSTN line 91 then a connection with either the MNES Bridge phone or the MNES portable access device 75 is attempted 591 and 593 and 595 and 597 and 599.

When the MNES application software 201 of FIG. 5 receives 589 a DTMF digit that is not the first digit press on a channel currently in PSTN-PT mode then the digit value is stored in a digit buffer in SDRAM memory 217 of FIG. 5.

When the MNES application software 201 of FIG. 5 receives 589 a DTMF digit that is not the first digit press on a channel currently involved in a voip call then the DTMF digit value is encapsulated in an OOB RTP packet and transmitted 613 to the network destination device 75 and 97 . . . 99.

Figure 11A:
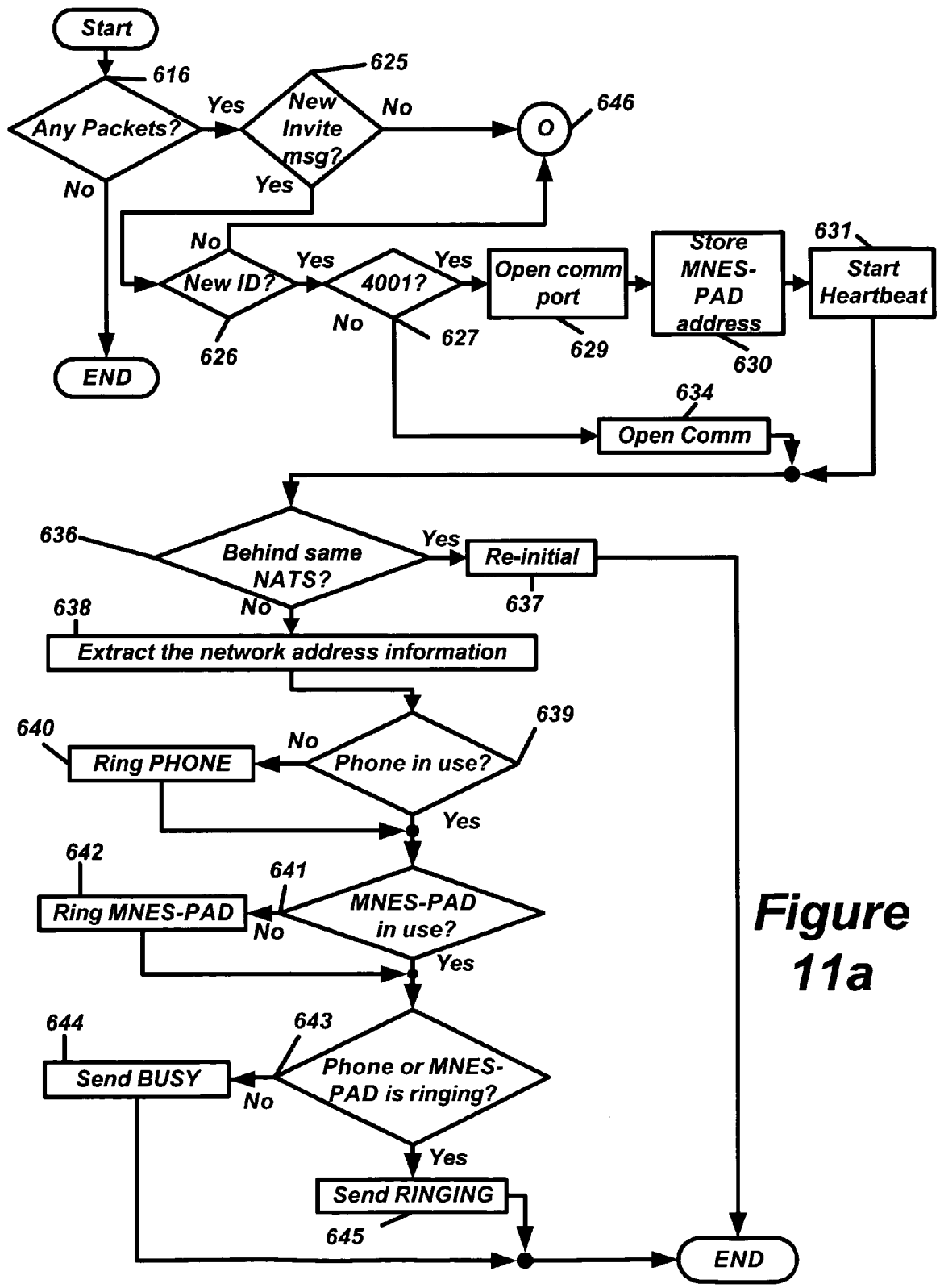
FIGS. 11a-11b are flow diagrams describing Multi-Network Exchange System Bridge SIP Signal Processing of a Multi-Network Exchange System of this invention.
Figure 11B:
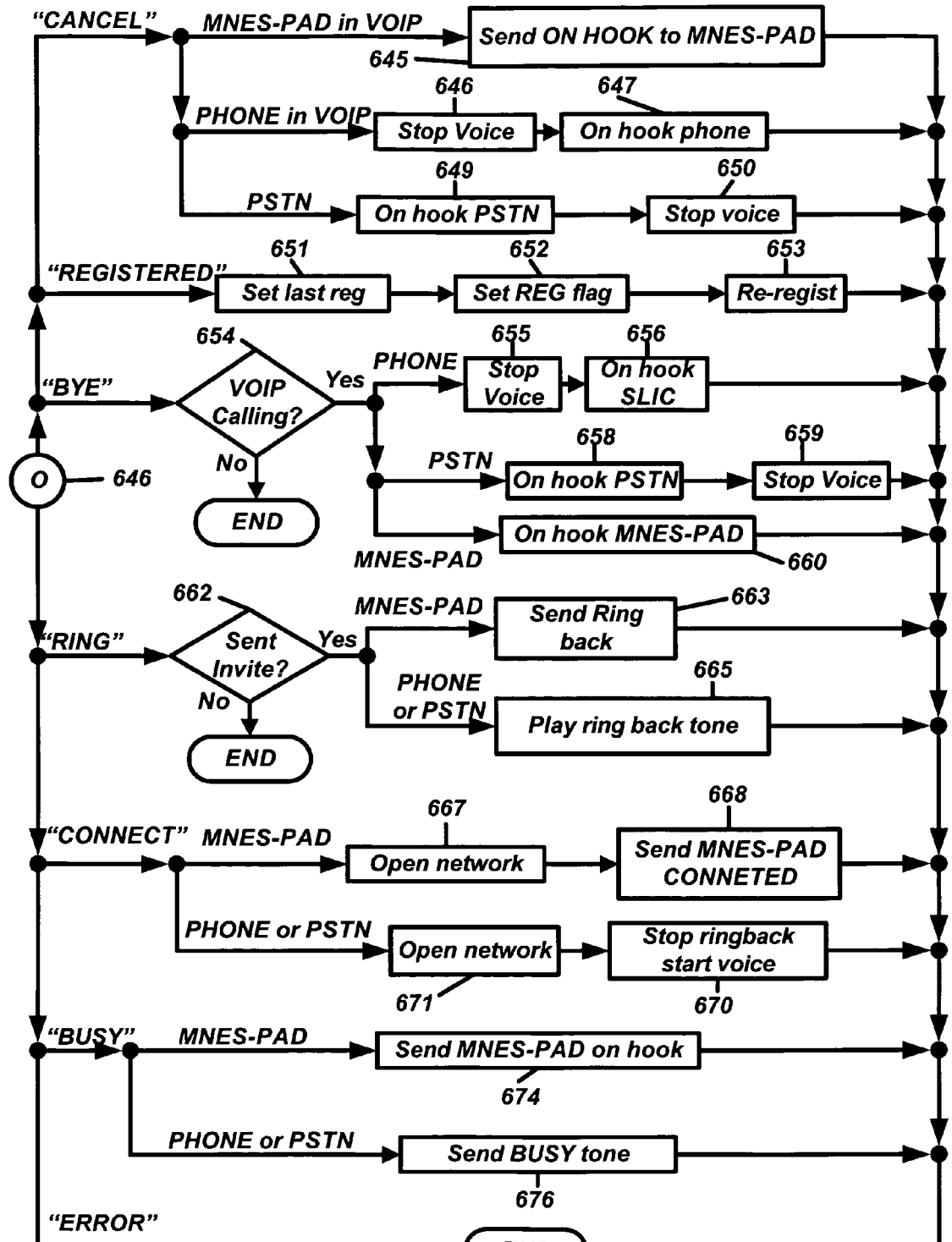

Refer now to FIG. 2 and FIG. 11 for a description of the MNES Bridge procedure for processing received SIP signals.

The MNES Bridge 55 attempts to register with the Global MNES server 80 every one minute by sending a signal to the MNES SIP manager 219 of FIG. 5 which in turn transmits a SIP REGISTER message to the Global MNES server. Upon successful registration the Global MNES server will return a SIP OK acknowledgment message and a registration variable is updated indicating that the MNES Bridge 55 is successfully registered with the Global MNES server. If the MNES Bridge failed to successfully register via the preceding procedure then re-registration attempts occur 653 every fifteen seconds until successful registration is established.

When the MNES Bridge 55 receives 625 a SIP INVITE message from a remote network VoIP device 97 . . . 99 and 75 then the ID number of the INVITE message is checked 626 to determine if this message is new or if it corresponds to a previous call. If the INVITE message is a new call and the number of the calling remote device is the same as the telephone number of the MNES Bridge 55 with an appended 4001 extension 627 then it is known that this is a MNES portable access device 75 attempting to establish contact with the MNES Bridge 55 through the data network 85. When a MNES portable access device 75 attempts to contact the MNES Bridge 55 local network communication sockets are opened 629 for communication with the MNES portable access device 75 and MNES portable access device network data communication begin 631.

When the MNES Bridge 55 receives 625 a SIP INVITE message from a remote network VoIP device 97 . . . 99 and 75 and the number of the calling remote device is different than the MNES Bridge 55 telephone number it is assumed that this INVITE is a new VoIP call request. A Network Address Translation Port Discovery Server (NAT-PDS) 82 is used to perform network socket port translation services which allow network IP address port mapping to tunnel through any NAT translation devices that are between the MNES Bridge 55 and the remote VoIP device 97 . . . 99 and 75. In the preferred embodiment of this invention the NAT-PDS server 82 is running on the same machine(s) as the Global MNES server(s) 80. Upon receiving a SIP INVITE request a local network communications socket is opened 634 and the NAT-PDS is contacted through the data network 85 which determines the port number of the MNES Bridge 85 as seen from behind any local area NAT translators (such as a router in a home). If the MNES Bridge 55 determines that both the MNES Bridge and the remote network VoIP device 75 and 97 . . . 99 are behind the same NAT translator then a SIP RE-INITIATE signal is transmitted 637 from the MNES Bridge 55 to the remote device 75 and 97 . . . 99.

When a SIP INVITE message is received by the MNES Bridge 55 from a remote network VoIP device 97 . . . 99 and it known that the MNES Bridge 55 and the device requesting the INVITE 97 . . . 99 are not behind the same NAT translator then it is considered a valid INVITE request. Upon receiving a valid INVITE request the network address of the remote device 97 . . . 99 is extracted 638 from the SIP request. If the MNES Bridge phone 55 is available to receive incoming calls 639 then the MNES Bridge phone 60 ringing is started 640. If the MNES portable access device 75 is available 641 then a RING signal is transmitted 642 to the MNES portable access device. If after receiving a valid INVITE either the MNES Bridge phone 60 or the MNES portable access device 75 are ringing 643 then a SIP RINGING signal is sent 645 to the SIP manager software 202 of FIG. 5 which transmits a SIP RINGING signal to the remote network VoIP device 97 . . . 99. If neither the MNES Bridge phone 60 nor the MNES portable access device 75 is ringing then a SIP BUSY 644 signal is sent to the remote network VoIP device 97 . . . 99 through the SIP signaling manager 202 of FIG. 5.

When the MNES Bridge 55 receives a SIP CANCEL message and the SIP ID matches that of a MNES portable access device 75 VoIP call that is currently active then an ONHOOK signal is transmitted 645 to the MNES portable access device 75. When the MNES Bridge 55 receives a SIP CANCEL message and the SIP ID matches that of an active MNES Bridge phone 60 VoIP call that is currently active then stop 646 voice processing on the MNES Bridge phone 60.

Upon receiving a SIP REGISTERED message the MNES Bridge 55 updates 652 the unit variables to reflect that the MNES Bridge 55 is registered with the Global MNES server 80. If this is a first attempt 651 at registration with a Global MNES server 80 then the MNES Bridge 55 performs 653 a second SIP registration with a Global MNES server using the IP address that was returned in the first registration message. This double registration scheme allows the MNES Bridge 55 to register with the Global MNES server with a public network IP address rather than a NAT translated IP address (i.e. in the 192.168.*subnet).

When the MNES Bridge 55 receives a SIP BYE message and the SIP ID corresponds to an active MNES Bridge phone 60 VoIP call 654 then voice processing on the phone channel is stopped 655 and the SLIC 160 of FIG. 4 is placed on hook 656 via the appropriate DSP driver code 219 of FIG. 5 command. When the MNES Bridge 55 receives a SIP BYE message and the SIP ID corresponds to an active 654 MNES Bridge PSTN line 91 to remote network VoIP device 97 . . . 99 call then the DAA 154 of FIG. 4 is placed 658 on hook and voice processing on the MNES PSTN line channel 90 is stopped 659. When the MNES Bridge receives a SIP BYE message and the SIP ID corresponds to an active 654 MNES portable access device VoIP call then an ONHOOK signal is transmitted 660 to the MNES portable access device. 75.

When the MNES Bridge 55 receives a SIP RING message and the MNES Bridge had previously transmitted an INVITE 662 and the call originated from the PSTN channel 90 or the phone channel 60 then a ring back tone is played 665 on the appropriate channel. When the MNES Bridge 55 receives a SIP RING message and the MNES Bridge 55 had previously sent an INVITE 662 and the call originated from MNES portable access device 75 then a RINGBACK signal is transmitted 663 to the MNES portable access device 75.

When the MNES Bridge 55 receives a SIP CONNECT message and the call originated from either MNES Bridge phone 60 or the MNES Bridge line 90 then a network data communication channel is opened 671; such that voice processing between the remote network VoIP device 97 . . . 99 can occur. When the MNES Bridge receives a SIP CONNECT message and the call originated from a MNES portable access device 75 then a network data communication channel is opened 667 and a connected signal is transmitted 668 to the MNES portable When the MNES Bridge 55 receives a SIP BUSY message and the call originated from either MNES Bridge phone 60 or the MNES Bridge line 90 then start 676 playback of a busy tone on the MNES Bridge phone. When the MNES Bridge receives a SIP BUSY message and the call originated from a MNES portable access device 75 then transmit 674 an ONHOOK signal to the MNES portable access device.

Figure 12:
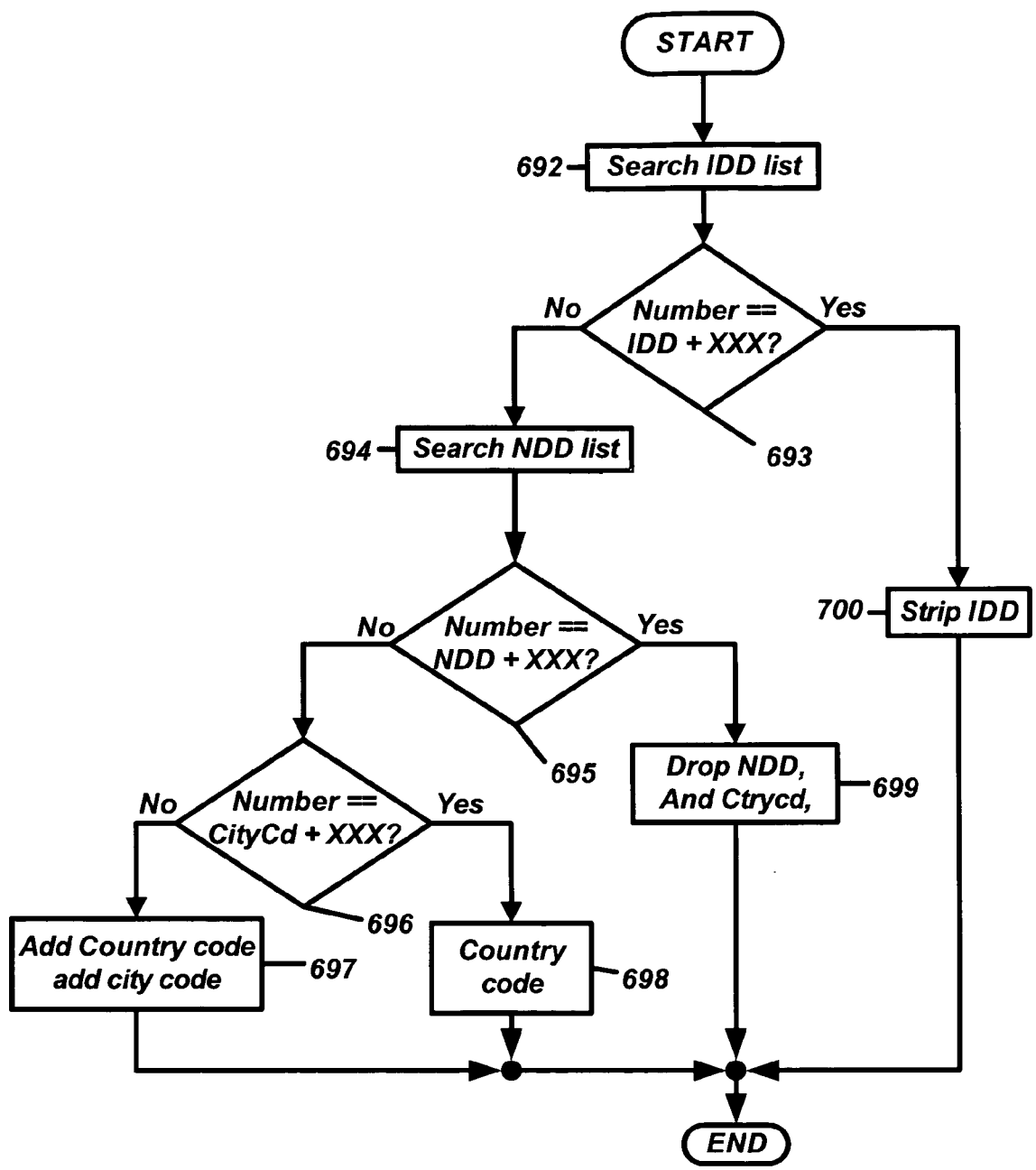
FIG. 12 is a flow diagram detailing a Universal Digit Parsing (PSTN number translator) of a Multi-Network Exchange System of this invention.

Refer now to FIG. 2 and FIG. 12 for a description of Universal Digit Parsing. To make addressing of MNES Bridge 55 and MNES portable access devices 75 consistent and easily usable when connected to multiple Public Switched Telephone Networks a proper addressing scheme is needed. Various definitions are needed:

The country code is the national prefix to be used when dialing TO that particular country FROM another country. In some cases you will also need to dial a city or area code. When a country name appears in the table as a link, there will be additional information regarding city or area codes.

The IDD prefix is the international prefix needed to dial a call FROM the country listed TO another country.

This is followed by the country code for the country you are calling (see above). The IDD situation in many countries has been changing regularly. Some countries have multiple IDDs, with each one used by a different long-distance carrier.

The NDD prefix is the access code used to make a call WITHIN that country from one city to another (when calling another city in the same vicinity, this may not be necessary). The NDD is followed by the city/area code for the place you are calling (city/area codes, where applicable, can be viewed by following the link from the country name on the table below). Phone numbers are often written in this format: +44-(0) 1224-XXXX-XXXX. This expresses the numbers used for both international and national long-distance calls. In the example, +44 indicates the country code, while (0) indicates the NDD. When dialing from outside the country, the NDD would not be used after dialing the country code; when dialing from within that country, the NDD would be used, but the country code would not. NOTE: All city/area codes used on this site are expressed for use in international calling; for national calls, prefix the area/city code with the NDD.

In the preferred embodiment of this invention each MNES Bridge 55 and MNES portable access device 75 is provisioned on the Global MNES server 80 using a specific addressing scheme. The scheme is as follows Country Code+City Code+User Telephone Number. The MNES Bridge will have this information plus the users IDD and NDD and will process all attempted VoIP calls to format 692 . . . 700 the dialed number into Country Code+City Code+Number which allows all units to access other units and make gateway calls as if the user was dialing from within their local PSTN network, regardless of that network's underlying PSTN addressing format.

Figure 13:
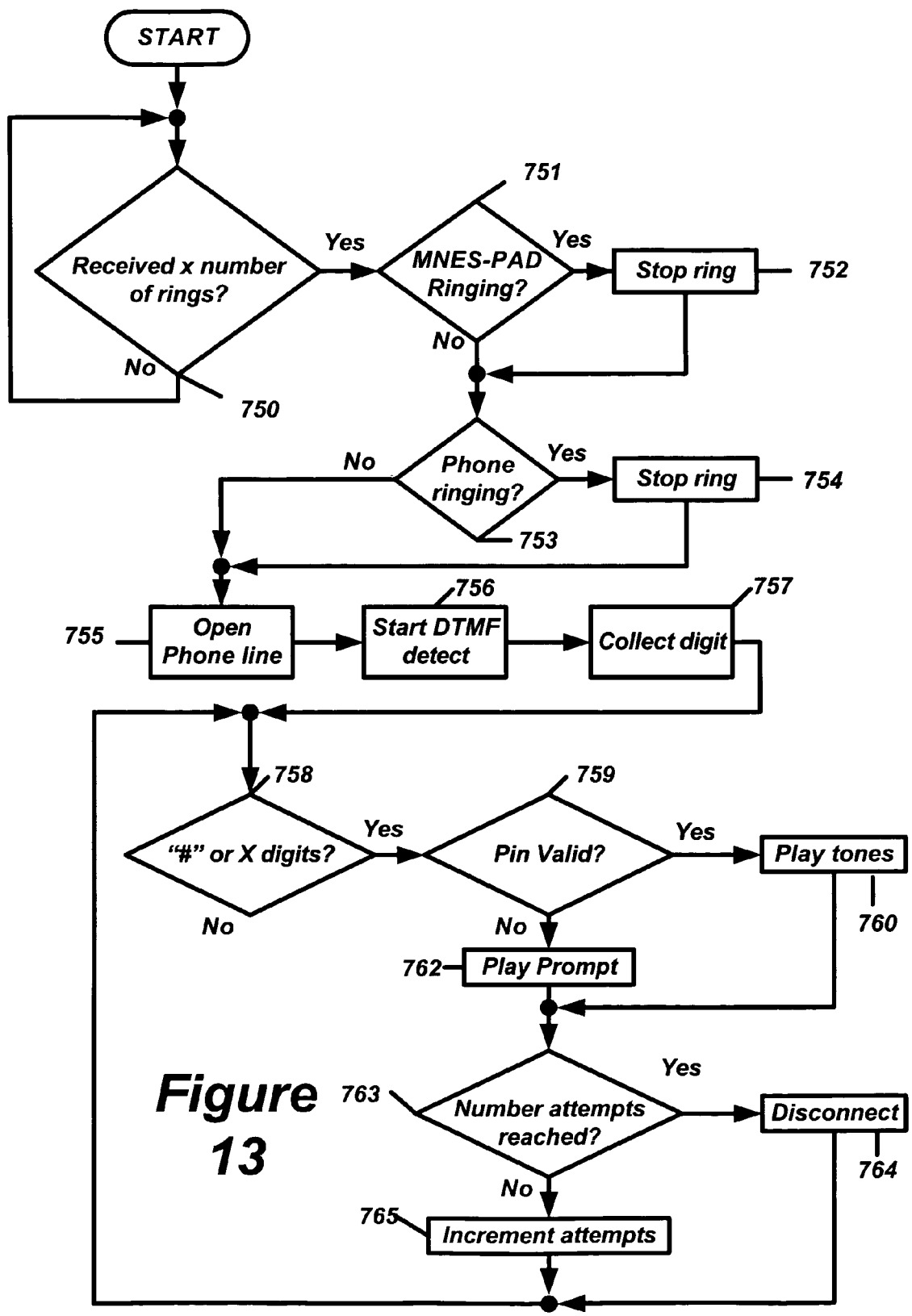
FIG. 13 is a flow diagram describing Multi-Network Exchange System Bridge Automatic Line Answering Processing of a Multi-Network Exchange System of this invention.

Refer now to FIG. 13 for a description of MNES Bridge Automatic Line answering. Automatic line answering allows users calling the MNES Bridge 55 from the PSTN network 90 to access many of the features of the MNES Bridge, most notably the MNES Bridge PSTN line 91 to MNES portable access device 75 call and MNES Bridge PSTN line 91 to remote network VoIP device calls 97 . . . 99.

Automatic line answering is achieved through either CID detection (see FIG. 9e) or by having the MNES Bridge automatically answering the call after a user specified number of rings 750. When automatic line answering occurs if either the MNES portable access device 75 or the MNES Bridge phone 60 are ringing 751 and 753 then the ringing on said phones will be stopped 752 and 754, the DAA 154 of FIG. 4 is taken 755 off hook, DTMF digit detection is started 756 on the DAA channel and whenever a DTMF digit is received from the incoming PSTN call it is stored 757 in a digit buffer in SDRAM memory 217 of FIG. 5.

Digits are collected until the remote user presses the pound key or 5 digits have been entered 758. For security purposes the incoming user must enter a 5 digit Personal Identification Number (PIN). Upon entering 759 a successful PIN the incoming user will hear 760 a VoIP dial tone indicating that they have successfully entered the PIN and can now place either VoIP calls or call the MNES portable device 75.

If the user fails to enter 759 the correct PIN number then a prompt will played 762 to the user requesting they enter their PIN again. In the preferred embodiment of this invention the remote user has three 765 attempts to enter 763 a PIN number before the MNES Bridge 55 will disconnect the call 764.

Figure 14:
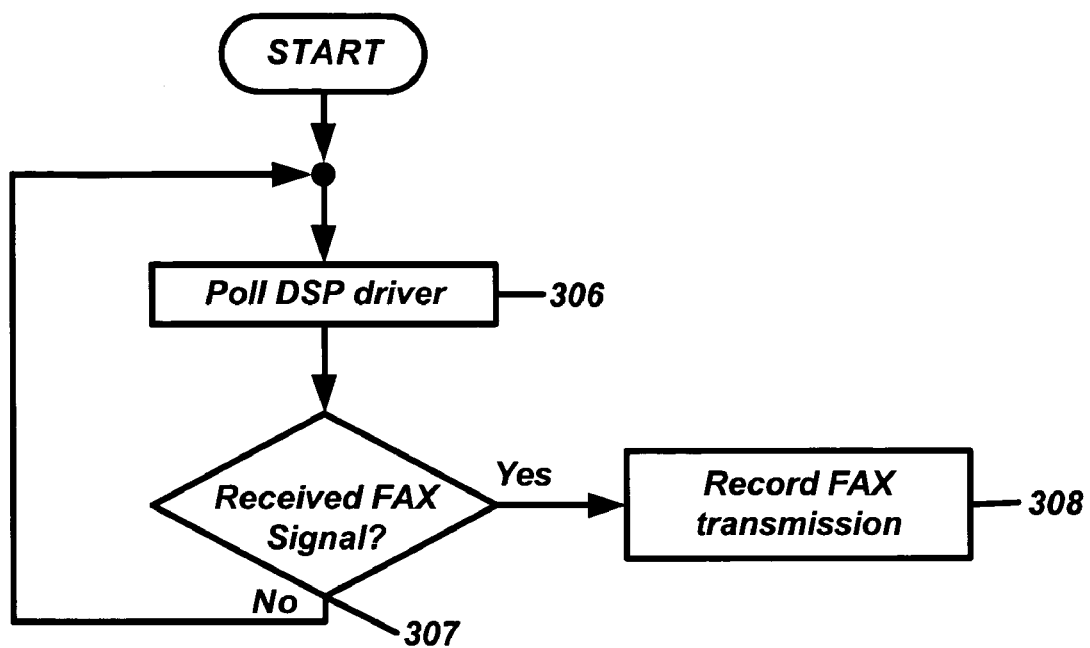
FIG. 14 is a flow diagram detailing Multi-Network Exchange System Fax Processing of a Multi-Network Exchange System of this invention.

Refer now to FIG. 2 and FIG. 14 for a description of Fax processing.

When an incoming MNES Bridge PSTN line 91 call is answered by any device on the system (MNES portable access device 75, MNES Bridge phone 60 or MNES Bridge 55 auto-answer) the MNES Bridge 55 can listen 306 to the call and determine 307 if there is an incoming attempt at fax transmission. If there is an incoming FAX transmission then the MNES Bridge 55 is capable of interrupting the current call and completing the FAX transmission. The FAX data is either transmitted 308 to a network storage location 80 or stored 308 locally on the MNES Bridge 55 flash memory 212 of FIG. 5.

Figure 15:
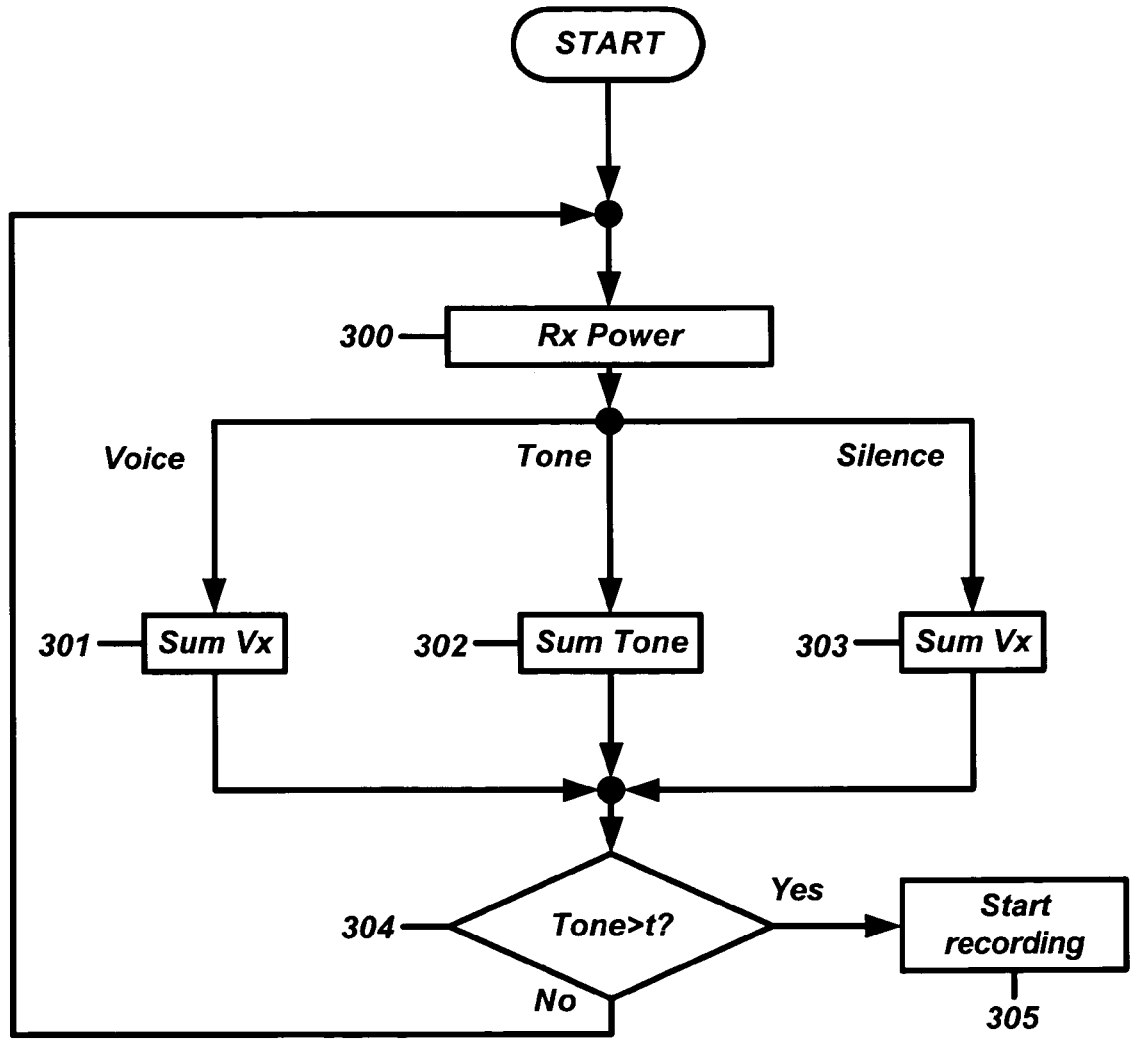
FIG. 15 is a flow diagram illustrating Multi-Network Exchange System Automatic Answering Machine Interception processing of a Multi-Network Exchange System of this invention.
Figure 16:
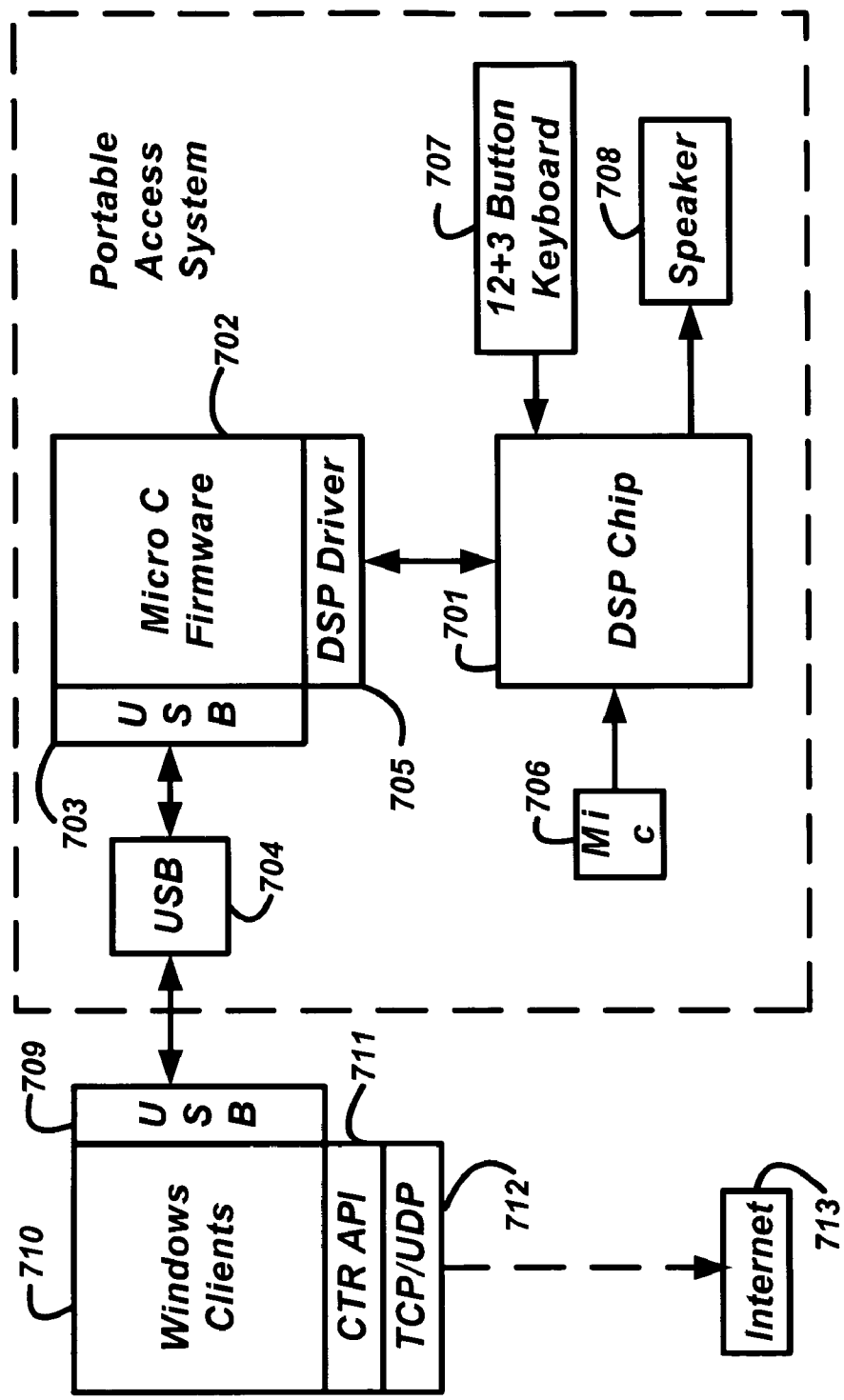
FIG. 16 is a block diagram of the programming architecture of the Portable Access Device of the Multi-Network Exchange System of this invention.
Figure 17:
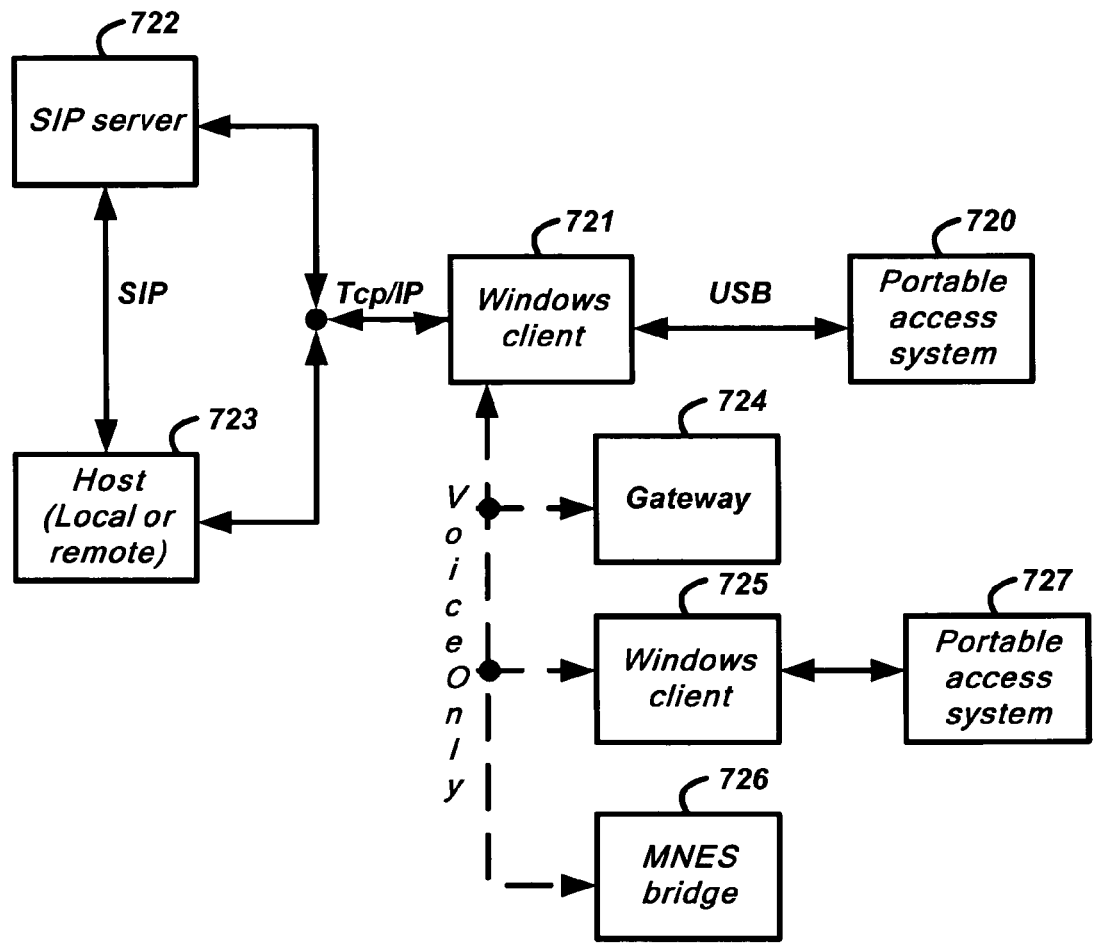
FIG. 17 is a functional block diagram for the Portable Access Device of the Multi-Network Exchange System of this invention.
Figure 18:
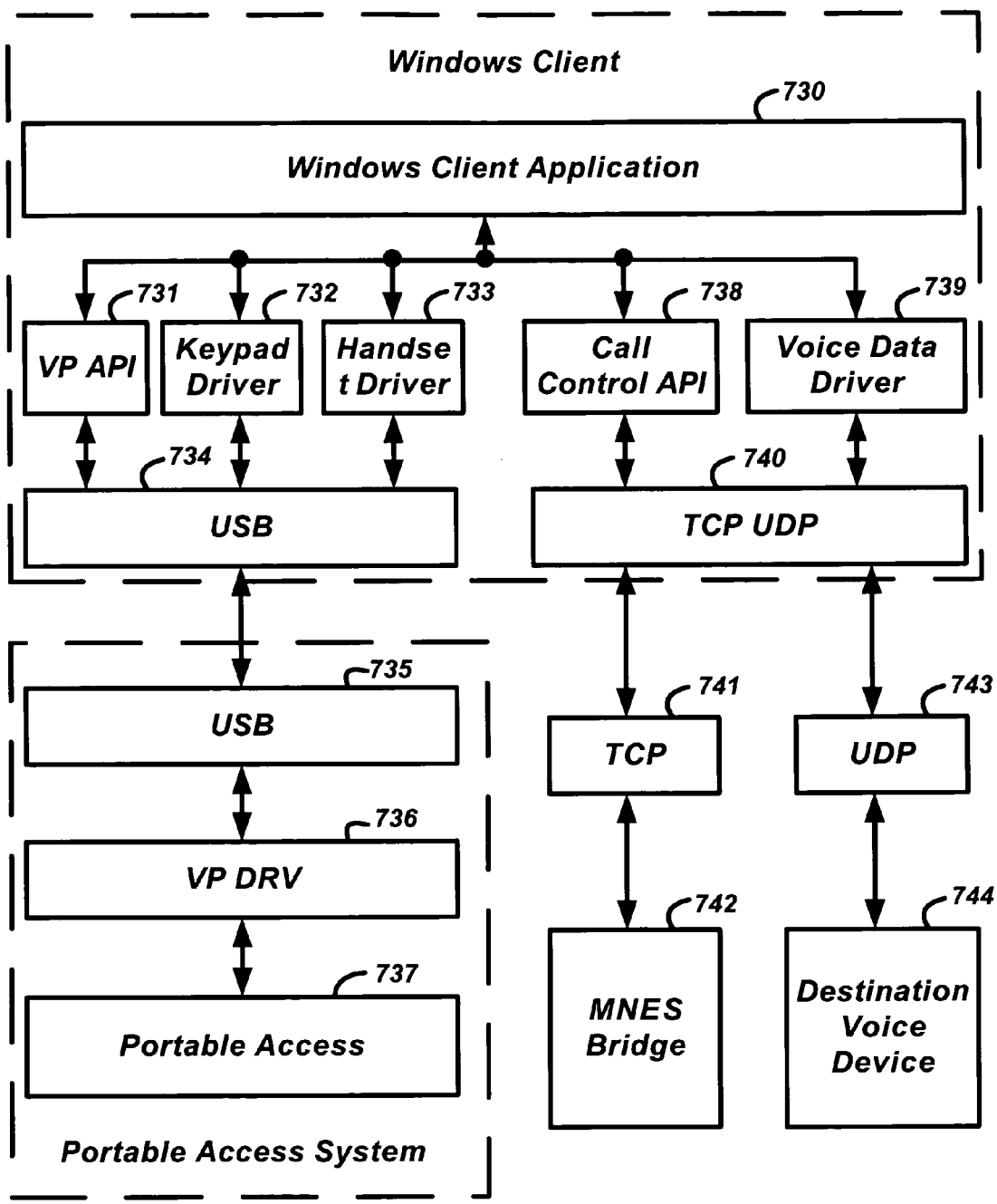
FIG. 18 is a block diagram for the programming architecture for the Graphical User's Interface Client of the Multi-Network Exchange System of this invention.

Refer now to FIG. 2 and FIG. 15 for a description of MNES Automatic Answering Machine Interception. The DSP 151 of FIG. 4 contains a power detection algorithm 117 of FIG. 3 which is used by the MNES Bridge 55 for automatic answering machine detection. When an incoming call from the MNES Bridge PSTN line 91 has been answered by the MNES Bridge phone 60 it is possible that the phone 60 is actually an answering machine. The MNES Bridge will automatically detect 300 . . . 304 that an answering machine has answered the incoming call and will either record 305 the incoming MNES Bridge PSTN line 91 message or send 305 the incoming MNES Bridge PSTN line message to a Global MNES server 80.

Figure 1:
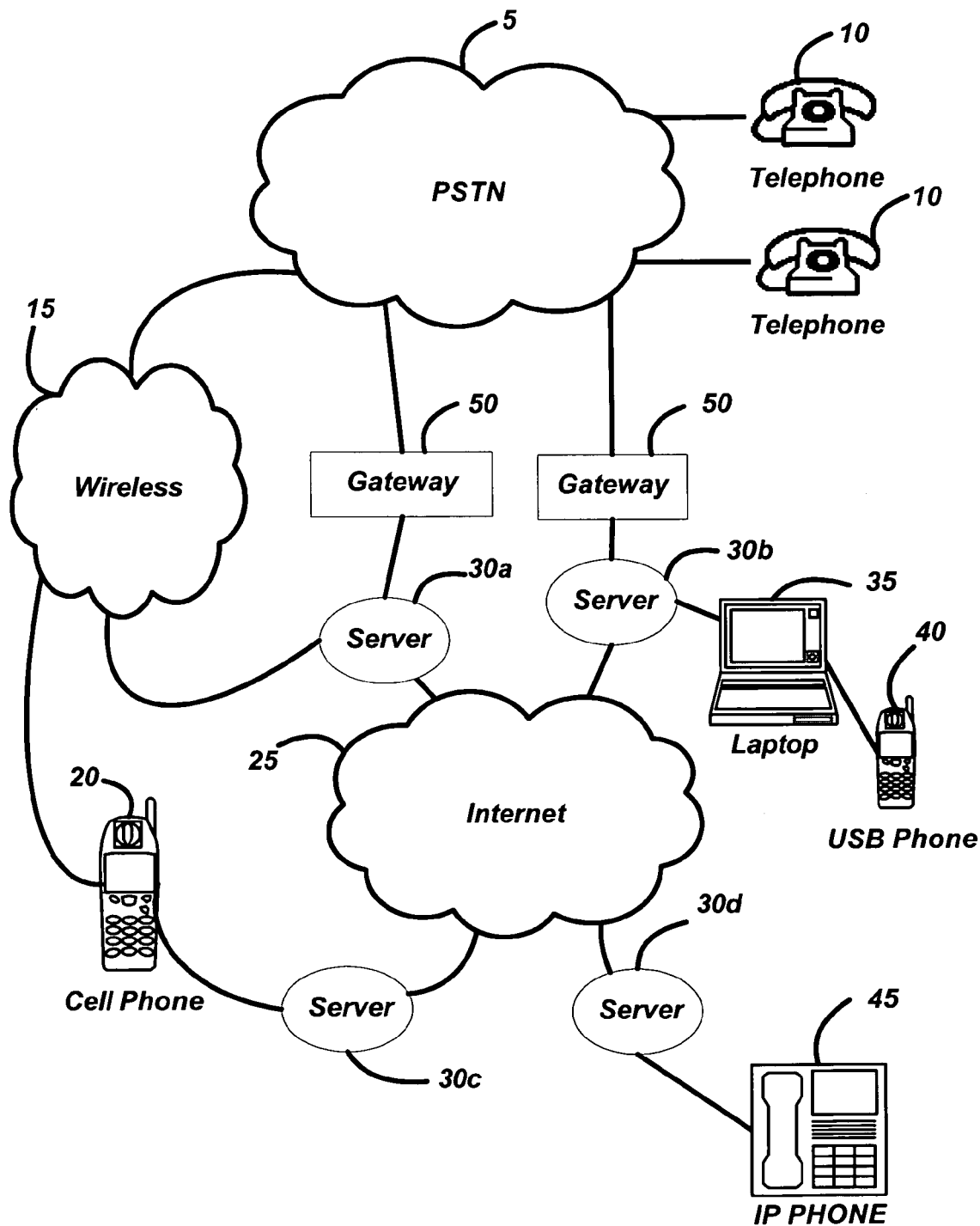
FIG. 1 is a functional diagram of a Public Switched Telephone Network and a global digital communications network (Internet) of the Prior Art.
Figure 20:
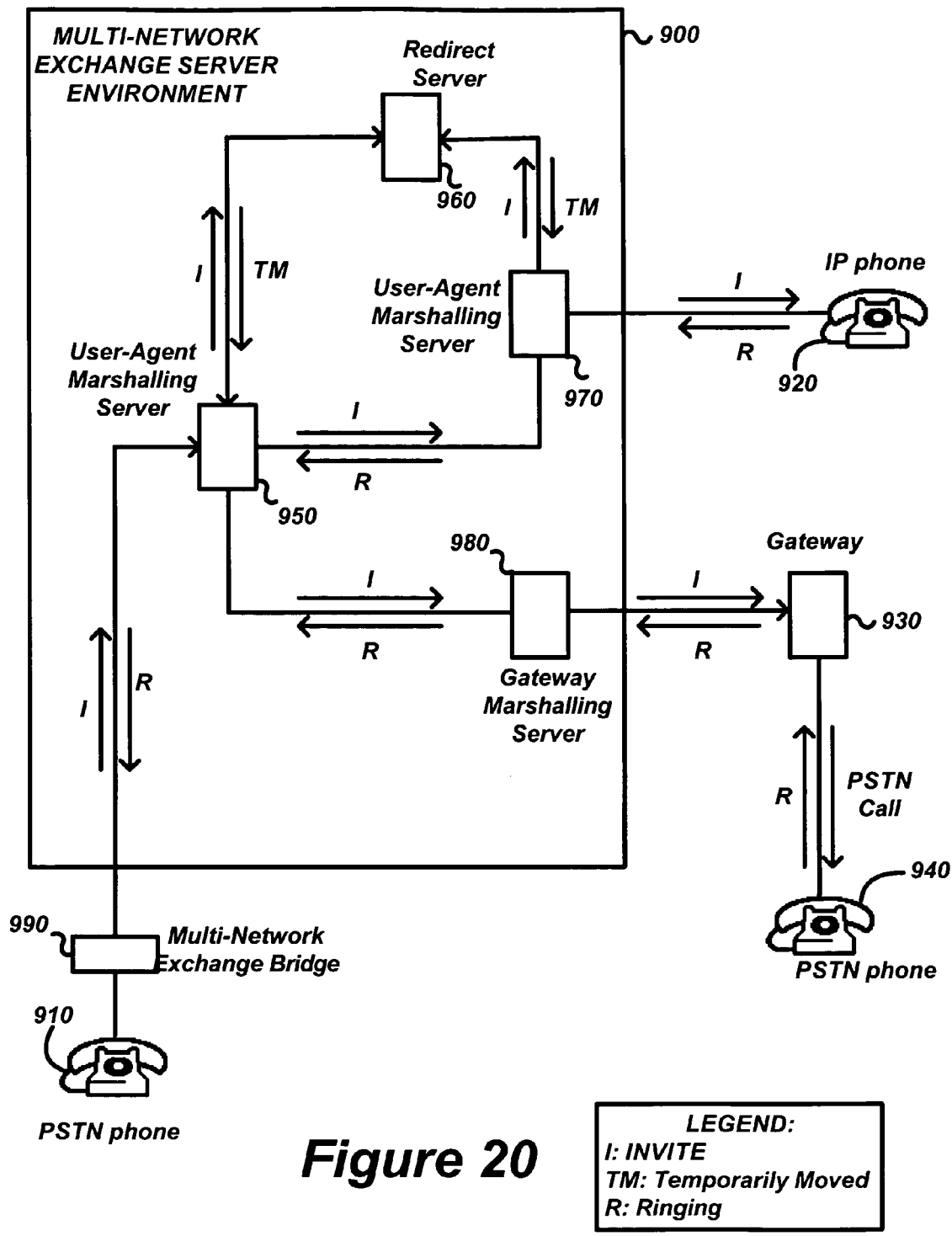
FIG. 20 is functional block diagram of the Multi-Network Exchange System Global Server of this invention.

Refer now to FIG. 20 for a description of the structure and function of the global MNES server 80 of FIG. 1. The global MNES server environment 900 is a scalable, multi-process, multi-service environment offering caller provisioning, authentication and registration, call screening and routing as well as additional services such as billing and policy enforcement and call features such as call blocking, caller id, caller id blocking, call forwarding and voice mail. It is based upon the open source phone system known as VOCAL (Vovida Open Communication Application Library) [Dang, Jennings & Kelly, "Practical VoIP Using VOCAL", O'Reilly Associates, 2002] and [http://www.vovida.org].

VOCAL is a SIP-based system. SIP—Session Initiation Protocol—"an application-layer control (signaling) protocol for creating, modifying, and terminating sessions with one or more participants. These sessions may include Internet telephone calls, multimedia distribution, and multimedia conferences. SIP makes use of elements called proxy servers to help route requests to the user's current location, authenticate and authorize users for services, implement provider call-routing policies, and provide features to users. SIP also provides a registration function that allows users to upload their current locations for use by proxy servers" [RFC 3261].

The current instantiation of VOCAL is configured to maintain an up-to-date list of registered multi-network exchange bridges and portable access devices, route multi-network exchange bridge to multi-network exchange portable access device traffic and Multi-network exchange device to gateway calls through US and international gateway services, record Call Detail Records of all call transactions as well as enforce 900-number call blocking.

Using SIP, calls from a phone 910 attached to a are set up by having a registered MNES Bridge 990 send an INVITE message to "call" another telephone; either IP or PSTN 920 or 940. The VOCAL server determines if the called phone 920 is a registered user and if so, what IP address it is currently using. It then forwards the INVITE to the called phone, passing back to the caller, intermediate stage messages such as "ringing" and "line busy". If the called phone 920 or 940 is not a registered user then the call is forwarded to the gateway proxy server 980 to be forwarded to the appropriate gateway 930.

The global MNES server 900 uses a feature of SIP that records a history of a message's path in the VIA header to determine if the multi-network exchange device is sitting behind an NAT translator and if so, to extract the WAN IP address of the translator to be used and the multi-network exchange device's true CONTACT address. Each MNES Bridge device 990 registers once to retrieve its NAT translator WAN IP address from the ACK reply and then uses the contact information to immediately reregister, this time providing a true CONTACT address.

VOCAL was designed with redundancy in mind. All services can be provided from a single host or with a multi-host configuration. The various VOCAL services can be redundantly replicated on additional hosts. This enables VOCAL to handle successively larger numbers of users and amounts of call traffic as well as provide additional reliability. Multiple redirection servers 960 are synchronized while multiple user-agent marshalling servers 950, 970, and 980 are not. As a consequence of having all user traffic come through a proxy server or multiple user-agent marshalling servers 950, 970, and 980, all SIP messages between the various VOCAL services use a single SIP implementation.

Users are provisioned on the VOCAL system in either a password-protected mode or not. VOCAL also supports TLSv1 encryption.

In summary, the Multi-Network Exchange System (MNES) of this invention offers all the features of the PSTN simply because it incorporates PSTN calls. In fact, the VoIP mechanism maybe overridden before initiating a call if desired. On the other hand it uses the familiar PSTN numbering plan for addressing. The PSTN number is used as a fixed address for the node of the MNES bridge on the Internet. This fixed number is then translated into the Internet protocol address of the MNES bridge portal. Other nodes of the Internet are considered instantiations of the MNES bridge. In this case, the fixed address of the PSTN number is translated to the Internet protocol address of the other instantiations of the MNES bridge. These instantiations are any other multi-network exchange bridge apparatuses within the multi-network exchange system, computing devices, personal digital assistants, Internet protocol telephones, or any electronic devices capable of communicating with the second type network.

The MNES is superior to present computer telephony solutions from two important aspects:

a personal computer or workstation is not required.
        Because of the instantiation of one MNES Bridge, calling from one MNES Bridge to another remote MNES Bridge or to a MNES portable access device is automatic. Moreover, Internet telephony calls are carried out in the same way as normal PSTN calls.

The MNES is different from IP-Phones and Internet appliances because it uses the same numbering plan as the phone at home. In other words, with the IP-Phone, the user needs to apply (register) for a new phone number. Therefore, in the case that the user wishes to maintain his/her reliable PSTN phone, then there will be two numbers and two separate phones for that purpose. With MNES, there is one telephone set and one telephone number. It must be understood that the reliability of the Internet access at this time does not match that of the PSTN.

MNES has a broadband Internet access and therefore is always online and can originate and receive calls immediately. Dial-Up appliances suffer from long connection times. Dial-up connection can only deliver a single VoIP call at one time. A deficiency that MNES has overcome by offering broadband Internet access. It should be noted that, the MNES falls back to a dial-up connection if the broadband access is not available.

The MNES user can call into his/her MNES Bridge by simply calling his/her phone number and then using the system to make a toll free or low rate call. This feature is only found in the prepaid calls that provide the caller with long distance dialing capability. Therefore, in instances that the user wishes not to pay for long distance and at the same time it is possible to make toll free calls to his/her number, this feature will be very useful.

MNES allows for remote access to the MNES bridge and the home or office telephone through the use of MNES portable access device. The MNES portable access device works via the network port (such as a USB port) of an online computer which is registered as a remote instantiation of the MNES Bridge. In this way, the user can use the MNES capabilities remotely, either through broadband or dial-up connection. The MNES portable access device functions are similar to the telephone set that is physically connected to base unit and acts as an extension of this telephone. The MNES portable access device can ring the phone at the MNES Bridge, make either a toll free MNES or low rate call or seize the line to make a PSTN call. At the same time, the MNES portable access device can receive calls from the MNES Bridge. This capability is not found in the prior art.

If an MNES portable access device is not accessible, then a personal computer is used to direct its Internet browser to a website. The MNES bridge is contacted and all the activities available with MNES bridge, such as checking missed calls, received calls or listening to the voice messages, can be monitored.

The MNES provides a callback capability. The user can go online with a computer and command the MNES Bridge to call him/her back on the provided phone number. This feature is only available by specialized callback centers.

The MNES is also a voice mail system and the user can send or receive voice messages. Since MNES is always online, the received voice messages can be transmitted via the Internet as e-mail. This feature is only provided by some business-oriented servers.

The MNES is fax capable. This means that there is only one telephone number to be given out for voice and fax. The user can retrieve faxes from MNES and also command MNES to send faxes from his/her PC.

In summary, it can be seen that MNES offers a complete telephony and Internet solution. The user, by installing MNES Bridge and subscribing to the service, will have a unified solution to his/her telephony needs. The "address" of MNES on the PSTN and Internet is the same familiar telephone number. In other words, switching from PSTN to VoIP is automatic and is transparent to the user.

While this invention has been particularly shown and described with reference to the preferred embodiments thereof, it will be understood by those skilled in the art that various changes in form and details may be made without departing from the spirit and scope of the invention.

The invention claimed is:

1. A multi-network exchange bridge apparatus in communication with a first type network and at least one second type network for facilitating transfer of electronic information signals to an access device in communication with a remote node of one of at least one second type network from said first network, said multi-network exchange bridge comprising:
- a first portal in communication with said first type network;
- at least one second portal in communication with said second type network;
- a protocol control device in communication with said first portal, and second portal, for interpretation and formatting of said electronic information signals between protocols and command structures of the first type network and protocols and command structures of the second type network for transfer of said electronic information signals between said first type network and said second type network;
- a fixed address translation device in communication with the protocol control device for conversion of a first address describing a node of said first type network through which said multi-network exchange bridge apparatus communicates to said first network to a second address describing a node of said second type network through which said second portal communicates with said second network; and
- at least one multi-network instantiation device in communication with the protocol control device to transfer said electronic information signals to the remote node in communication with the second type network connected to a portable access device on said second type network;
- wherein said first address is fixedly defined for said first type network and said translation is virtually defined for said second address;
- wherein the fixed address translation device virtually defines a third address equivalent to said second address with an extension indicating that said portable access device communicating through said multi-network instantiation device is associated with said multi-network exchange bridge apparatus and may communicate directly with said multi-network exchange bridge apparatus from the remote node of the second address.

2. The multi-network exchange bridge apparatus of claim 1 wherein said access device is selected from a group of devices in communication with the remote node of said second type network consisting of other multi-network exchange bridge apparatuses, computing devices, personal digital assistants, internet protocol telephones, and electronic devices capable of communicating with said second type network.

3. The multi-network exchange bridge apparatus of claim 1 further comprising:
- an information retention device in communication with said first portal and said second portal to retain said electronic information signals, to transfer said electronic information signals between said first type network and said portable access device in communication with a node of said second type network.

4. The multi-network exchange bridge apparatus of claim 1 wherein said portable access device communicating with said multi-network instantiation device transfers electronic information signals between said portable access device and said first type network through said multi-network exchange bridge apparatus as though said portable access device were in direct communication with said first type network.

5. The multi-network exchange bridge apparatus of claim 1 wherein the first type network is a public switched telephone network and said protocols and command structures of said first type network provide calling features and voice signals of a telephone call.

6. The multi-network exchange bridge apparatus of claim 1 wherein the second type network is a global digital communications network and said protocols and command structures provide packet formatted digital data for transferring said electronic information signals between said second type network and said first type network.

7. The multi-network exchange bridge apparatus of claim 6 wherein the packet formatted digital data is a voice-over-internet protocol for the transfer of a telephone call on said global digital communications network.

8. The multi-network exchange bridge apparatus of claim 1 wherein the second type network includes a global multi-network exchange server in communication with said multi-network exchange bridge apparatus to provide a repository for the first, second, and third addresses and access information to facilitate transfer of said electronic information signals between the remote node and the multi-network instantiation devices.

9. The multi-network exchange bridge apparatus of claim 8 wherein said global multi-network exchange server facilitates routing for transfer of said electronic information signals from said multi-network exchange bridge apparatus and a gateway that permits communication between said first type network and said second type network remotely from said multi-network exchange bridge apparatus.

10. The multi-network exchange bridge apparatus of claim 8 wherein the portable access device in communication with the second type network comprises:
- a portable access control device in communication with said global multi-network exchange server to acquire the first, second, and third addresses and the access information to facilitate transfer of said electronic information signals between said second type network and said multi-network exchange bridge apparatus and in communication with said multi-network exchange bridge apparatus to acquire said electronic information signals from said multi-network exchange bridge apparatus; and
- a microphone and speaker in communication with said portable access control device, wherein said portable access control device converts said electronic information signals to voice signals for reproduction on said speaker and converts voice signals to said electronic information signals for transfer to said multi-network exchange bridge apparatus.

11. The multi-network exchange bridge apparatus of claim 1 further comprising at least one third portal in communication with one of a group of communication devices consisting of a computing system, a telephone handset, a facsimile machine and in communication with said protocol control device, wherein said protocol control device provides interpretation and formatting of said electronic information signals between protocols and command structures of the first type network and protocols and command structures of the second type network for transfer of said electronic information signals between said first type network, said second type network and said communication devices.

12. A multi-network exchange system for the transfer of electronic information signals comprising:
- a first type network;
- at least one second type network;
- a multi-network exchange bridge apparatus in communication with said first type network and said second type network for facilitating transfer of electronic information signals to an access device in communication with a node of one of at least one second type network from said first network, said multi-network exchange bridge comprising:
  - a first portal in communication with said first type network;

at least one second portal in communication with said second type network;

a protocol control device in communication with said first portal, and second portal, for interpretation and formatting of said electronic information signals between protocols and command structures of the first type network and protocols and command structures of the second type network for transfer of said electronic information signals between said first type network and said second type network;

a fixed address translation device in communication with the protocol control device for conversion of a first address describing a node of said first type network through which said multi-network exchange bridge apparatus communicates to said first network to a second address describing a node of said second type network through which said second portal communicates with said second network; and at least one multi-network instantiation device in communication with the protocol control device to transfer said electronic information signals to the remote node in communication with the second type network connected to a portable access device on said second type network;

wherein said first address is fixedly defined for said first type network and said translation is virtually defined for said second address;

wherein the fixed address translation device virtually defines a third address equivalent to said second address with an extension indicating that said portable access device communicating through said multi-network instantiation device is associated with said multi-network exchange bridge apparatus and may communicate directly with said multi-network exchange bridge apparatus from the remote node of the second address.

13. The multi-network exchange system of claim 12 wherein said access device is selected from a group of devices in communication with said second type network consisting of other multi-network exchange bridge apparatuses within said multi-network exchange system, computing devices, personal digital assistants, internet protocol telephones, and electronic devices capable of communicating with said second type network.

14. The multi-network exchange system of claim 12 wherein said multi-network exchange bridge apparatus further comprises:

an information retention device in communication with said first portal and said second portal to retain said electronic information signals, to transfer said electronic information signals between said first type network and said portable access device in communication with a node of said second type network.

15. The multi-network exchange system of claim 12 wherein the first type network is a public switched telephone network and said protocols and command structures of said first type network provide calling features and voice signals of a telephone call.

16. The multi-network exchange system of claim 12 wherein the second type network is a global digital communications network and said protocols and command structures provide packet formatted digital data for transferring said electronic information signals between said second type network and said first type network.

17. The multi-network exchange system of claim 16 wherein the packet formatted digital data is a voice-over-internet protocol for the transfer of a telephone call on said global digital communications network.

18. The multi-network exchange system of claim 12 wherein the second type network includes a global multi-network exchange server in communication with said multi-network exchange bridge apparatus to provide a repository for the first, second, and third addresses and access information to facilitate transfer of said electronic information signals between said portable access device.

19. The multi-network exchange system of claim 18 wherein the portable access device is in communication with said multi-network instantiation device and transfers electronic information signals between said portable access device and said first type network through said multi-network exchange bridge apparatus as though said portable access device were in direct communication with said first type network, the portable access device comprising:

a portable access control device in communication with said global multi-network exchange server to acquire access information to facilitate transfer of said electronic information signals between said second type network and said multi-network exchange bridge apparatus and in communication with said multi-network exchange bridge apparatus to acquire said electronic information signals from said multi-network exchange bridge apparatus; and a microphone and speaker in communication with said portable access control device, wherein said portable access control device converts said electronic information signals to voice signals for reproduction on said speaker and converts voice signals to said electronic information signals for transfer to said multi-network exchange bridge apparatus.

20. The multi-network exchange system of claim 19 wherein said multi-network exchange bridge apparatus further comprises at least one third portal in communication with one of a group of communication devices consisting of a computing system, a telephone handset, a facsimile machine and in communication with said protocol control device, wherein said protocol control device provides interpretation and formatting of said electronic information signals between protocols and command structures of the first type network and protocols and command structures of the second type network for transfer of said electronic information signals between said first type network, said second type network and said communication devices.

21. A method for facilitating transfer of electronic information signals between a first type network and a fixed access device in communication with a remote node of one of at least one second type network for facilitating transfer of electronic information signals comprising the steps of:

providing first portal with communication access to said first type network;

fixedly defining a first address for the fixed access device for said first type network;

providing a second portal with communication access to at least one of said second type networks;

virtually defining for a second address for the fixed access device;

interpretating and formatting of said electronic information signals between protocols and command structures of the first type network and protocols and command structures of the second type network;

creating an instantiation of the remote node of said second type network;

assigning the virtually defined second address to transfer said electronic information signals addressed to the first address of said fixed access device on said second type network;

translating the first address describing a node of said first type network to the second address describing the remote node of said second type network through which said second portal communicates with said second type network;

interpreting and formatting of said electronic information signals between protocols and command structures of the first type network and protocols and command structures of the second type network; and transferring of said electronic information signals between said first type network through the first portal addressed by the first address and said fixed access device in communication with the remote node through the second portal of said second type network;

virtually defining a third address;

creating an instantiation of a portable access device having the third address to provide access to the second network;

associating the virtually defined third address with the second address such that the third address is equivalent to said second address with an extension indicating that said portable access device is a remote extension of the fixed access device; and communicating through the second type network from the portable access device to the fixed access device and then to the first type network.

22. The method for facilitating transfer of electronic information signals of claim 21 wherein the instantiation of the remote node is selected from a group of devices in communication with said second type network consisting of multi-network exchange bridge apparatuses, computing devices, personal digital assistants, internet protocol telephones, and electronic devices capable of communicating with said second type network.

23. The method for facilitating transfer of electronic information signals of claim 21 further comprising the step of:
retaining said electronic information signals received from said first type network and from second type network.

24. The method for facilitating transfer of electronic information signals of claim 21 wherein the first type network is a public switched telephone network and said protocols and command structures of said first type network provide calling features and voice signals of a telephone call.

25. The method for facilitating transfer of electronic information signals of claim 21 wherein the second type network is a global digital communications network and said protocols and command structures provide packet formatted digital data for transferring said electronic information signals between said second type network and said first type network.

26. The method for facilitating transfer of electronic information signals of claim 25 wherein the packet formatted digital data is a voice-over-internet protocol for the transfer of a telephone call on said global digital communications network.

27. The method for facilitating transfer of electronic information signals of claim 21 further comprising the step of providing a repository for the first, second, and third addresses and access information on a global multi-network exchange server on the second type network to facilitate transfer of said electronic information signals between said portable access device.

28. The method for facilitating transfer of electronic information signals of claim 27 wherein the portable access device in communication with the second type network comprises:
a portable access control device in communication with said global multi-network exchange server to acquire access information to facilitate transfer of said electronic information signals between said second type network and the first type network; and a microphone and speaker in communication with said portable access control device, wherein said portable access control device converts said electronic information signals to voice signals for reproduction on said speaker and converts voice signals to said electronic information signals for transfer.

29. The method for facilitating transfer of electronic information signals of claim 28 further comprising the steps of:
providing communication access with one of a group of communication devices consisting of a computing system, a telephone handset, a facsimile machine and in communication with said protocol control device;

interpreting and formatting of said electronic information signals between protocols and command structures of the first type network and protocols and command structures of the second type network; and transferring said electronic information signals between said first type network, said second type network and said communication devices.

30. An apparatus for facilitating transfer of electronic information signals between a first type network and a fixed access device in communication with a remote node of one of at least one second type network for facilitating transfer of electronic information signals comprising:
means for providing a first portal with communication access to said first type network;

means for fixedly defining a first address for the fixed access device for said first type network;

means for providing a second portal with communication access to at least one of said second type networks;

means for virtually defining for a second address for the fixed access device;

means for interpretating and formatting of said electronic information signals between protocols and command structures of the first type network and protocols and command structures of the second type network;

means for creating an instantiation of the remote node of said second type network;

means for assigning the virtually defined second address to transfer said electronic information signals addressed to the first address of said fixed access device on said second type network;

means for translating the first address describing a node of said first type network through which said multi-network exchange bridge apparatus communicates to said first network to the second address describing the remote node of said second type network through which said second portal communicates with said second type network;

means for interpreting and formatting of said electronic information signals between protocols and command structures of the first type network and protocols and command structures of the second type network; and means for transferring of said electronic information signals between said first type network addressed by the first address through the first portal and said fixed access device in communication with the second portal of the remote node said second type network;

means for virtually defining a third address;

means for creating an instantiation of a portable access device having the third address to provide access to the second network;

means for associating the virtually defined third address with the second address such that the third is equivalent to said second address with an extension indicating that said portable access device is a remote extension of the fixed access device; and means for communicating through the second type network from the portable access device to the fixed access device and then to the first type network.

31. The apparatus for facilitating transfer of electronic information signals of claim 30 wherein the instantiation of the remote node is selected from a group of devices in communication with said second type network consisting of other multi-network exchange bridge apparatuses, computing devices, personal digital assistants, Internet protocol telephones, and electronic devices capable of communicating with said second type network.

32. The apparatus for facilitating transfer of electronic information signals of claim 30 further comprising the step of:

means for retaining said electronic information signals received from said first type network and from second type network.

33. The apparatus for facilitating transfer of electronic information signals of claim 30 wherein the first type network is a public switched telephone network and said protocols and command structures of said first type network provide calling features and voice signals of a telephone call.

34. The apparatus for facilitating transfer of electronic information signals of claim 30 wherein the second type network is a global digital communications network and said protocols and command structures provide packet formatted digital data for transferring said electronic information signals between said second type network and said first type network.

35. The apparatus for facilitating transfer of electronic information signals of claim 34 wherein the packet formatted digital data is a voice-over-internet protocol for the transfer of a telephone call on said global digital communications network.

36. The apparatus for facilitating transfer of electronic information signals of claim 30 further comprising means for providing a repository for the first, second, and third addresses and access information on a global multi-network exchange server on the second type network to facilitate transfer of said electronic information signals between said portable access device.

37. The apparatus for facilitating transfer of electronic information signals of claim 36 wherein the portable access device in communication with the second type network comprises:

a portable access control device in communication with said global multi-network exchange server to acquire access information to facilitate transfer of said electronic information signals between said second type network; and a microphone and speaker in communication with said portable access control device, wherein said portable access control device converts said electronic information signals to voice signals for reproduction on said speaker and converts voice signals to said electronic information signals for transfer.

38. The apparatus for facilitating transfer of electronic information signals of claim 37 further comprising:

means for providing communication access with one of a group of communication devices consisting of a computing system, a telephone handset, a facsimile machine and in communication with said protocol control device; and means for interpreting and formatting of said electronic information signals between protocols and command structures of the first type network and protocols and command structures of the second type network; and means for transferring said electronic information signals between said first type network, said second type network and said communication devices.

39. A method for facilitating transfer of electronic information signals comprising the steps of:

providing a first type network;

fixedly defining a first address for a local node for said first type network;

providing at least one second type network;

virtually defining a second address for at least the local node for the second type network and a third address for a remote node of the second type network;

providing a portable access device in communication with the remote node of the second type network;

establishing communication for said portable access device with a remote node of the second type network;

providing communication access for a local access device to the local node of said first type network;

providing communication access for the local access device to the local node of at least one of said second type networks;

bridging between the first type network and the second type network for exchange of electronic information signals;

creating an instantiation of the portable access device within the local node to transfer said electronic information signals from the local node to said portable access device on said second type network;

translating the first address describing the local node of said first type network to a second address describing the local node of said second type network;

translating the third address describing the remote node of said second type network such that the third address allows the portable access device to communicate to the first network through the local node;

transferring said electronic information signals to and from said first type network;

interpreting and formatting of said electronic information signals between protocols and command structures of the first type network and protocols and command structures of the second type network; and transferring of said electronic information signals to and from said second type network by the portable access device;

requesting by said portable access device to create the instantiation of the portable access device within the local node;

associating the portable access device with the local node such that the third address is equivalent to said second address with an extension indicating that said portable access device is an extension of the local node; and communicating from the portable access device to first type network through the local node.

40. The method for facilitating transfer of electronic information signals of claim 39 wherein the portable access device is selected from a group of devices in communication with said second type network consisting of computing devices, personal digital assistants, internet protocol telephones, and electronic devices capable of communicating with said second type network.

41. The method for facilitating transfer of electronic information signals of claim 39 further comprising the step of:

retaining said electronic information signals received from said first type network and from second type network.

42. The method for facilitating transfer of electronic information signals of claim 39 wherein the first type network is a public switched telephone network and said protocols and command structures of said first type network provide calling features and voice signals of a telephone call.

43. The method for facilitating transfer of electronic information signals of claim 39 wherein the second type network is a global digital communications network and said protocols and command structures provide packet formatted digital data for transferring said electronic information signals between said second type network and said first type network.

44. The method for facilitating transfer of electronic information signals of claim 43 wherein the packet formatted digital data is a voice-over-internet protocol for the transfer of a telephone call on said global digital communications network.

45. The method for facilitating transfer of electronic information signals of claim 39 further comprising the step of providing a repository for the first, second, and third addresses and access information on a global multi-network exchange server on the second type network to facilitate transfer of said electronic information signals between said portable access device.

46. The method for facilitating transfer of electronic information signals of claim 45 wherein the portable access device comprises:
  a portable access control device in communication with said global multi-network exchange server to acquire the first, second, and third addresses and access information to facilitate transfer of said electronic information signals to and from said second type network; and
  a microphone and speaker in communication with said portable access control device, wherein said portable access control device converts said electronic information signals to voice signals for reproduction on said speaker and converts voice signals to said electronic information signals for transfer.

47. The method for facilitating transfer of electronic information signals of claim 39 further comprising the steps of:
  providing communication access with one of a group of communication devices consisting of a computing system, a telephone handset, a facsimile machine;
  interpreting and formatting of said electronic information signals between protocols and command structures of the first type network and protocols and command structures of the second type network; and
  transferring said electronic information signals between said first type network, said second type network and said communication devices.

48. An apparatus for facilitating transfer of electronic information signals comprising the steps of:
  means for providing a first type network;
  means for fixedly defining a first address for a local node for said first type network;
  means for providing at least one second type network;
  means for virtually defining a second address for at least the local node for the second type network and a third address for a remote node of the second type network;
  means for providing a portable access device in communication with the remote node of the second type network;
  means for establishing communication for said portable access device with a remote node of the second type network;
  means for providing communication access for a local access device to the local node said first type network;
  means for bridging between the first type network and the second type network for exchange of electronic information signals;
  means for providing communication access to at least one of said second type networks;
  means for creating an instantiation of the portable access device within the local node to transfer said electronic information signals from the local node to said portable access device on said second type network;
  means for translating the first address describing the local node of said first type network to a second address describing the local node of said second type network;
  translating the third address describing a remote node of said second type network such that the third address allows the portable access device to communicate to the first network through the local node;
  means for transferring said electronic information signals to and from said first type network;
  means for interpreting and formatting of said electronic information signals between protocols and command structures of the first type network and protocols and command structures of the second type network; and
  means for transferring of said electronic information signals to and from said second type network by the portable access device;
  means for requesting by said portable access device to create the instantiation of the portable access device within the local node; and
  means for associating the portable access device with the local node such that the third address equivalent to said second address with an extension indicating that said portable access device is an extension of the local node;
  means for communicating from the portable access device to first type network through the local node.

49. The apparatus for facilitating transfer of electronic information signals of claim 48 wherein the portable access device is selected from a group of devices in communication with said second type network consisting of computing devices, personal digital assistants, internet protocol telephones, and electronic devices capable of communicating with said second type network.

50. The multi-network exchange bridge apparatus of claim 48 further comprising the step of:
  means for retaining said electronic information signals received from said first type network and from second type network.

51. The apparatus for facilitating transfer of electronic information signals of claim 50 wherein the packet formatted digital data is a voice-over-internet protocol for the transfer of a telephone call on said global digital communications network.

52. The apparatus for facilitating transfer of electronic information signals of claim 48 wherein the first type network is a public switched telephone network and said protocols and command structures of said first type network provide calling features and voice signals of a telephone call.

53. The apparatus for facilitating transfer of electronic information signals of claim 52 wherein the portable access device comprises:
  a portable access control device in communication with said global multi-network exchange server to acquire first, second, and third addresses and access information to facilitate transfer of said electronic information signals to and from said second type network to acquire said electronic information signals; and
  a microphone and speaker in communication with said portable access control device, wherein said portable access control device converts said electronic information signals to voice signals for reproduction on said speaker and converts voice signals to said electronic information signals for transfer to said multi-network exchange bridge apparatus.

54. The apparatus for facilitating transfer of electronic information signals of claim 48 wherein the second type network is a global digital communications network and said protocols and command structures provide packet formatted digital data for transferring said electronic information signals between said second type network and said first type network.

55. The apparatus for facilitating transfer of electronic information signals of claim 48 further comprising the step of providing a repository for the first, second, and third addresses and access information on a global multi-network exchange server on the second type network to facilitate transfer of said electronic information signals between said portable access device.

56. The apparatus for facilitating transfer of electronic information signals of claim 48 further comprising the steps of:
  means for providing communication access with one of a group of communication devices consisting of a computing system, a telephone handset, a facsimile machine;
  means for interpreting and formatting of said electronic information signals between protocols and command structures of the first type network and protocols and command structures of the second type network; and
  means for transferring said electronic information signals between said first type network, said second type network and said communication devices.

57. A multi-network exchange bridge apparatus for facilitating transfer of electronic information signals between a first type network and a portable access device through a second type network to a portable access device, said multi-network exchange bridge apparatus comprising:
  a first portal in communication with said first type network;
  a second portal in communication with said second type network;
  a protocol control device in communication with said first portal and said second portal, for interpretation and formatting of said electronic information signals between protocols and command structures of the first type network and protocols and command structures of the second type network for transfer of said electronic information signals between said first type network and said second type network;
  a multi-network instantiation device in communication with said protocol control device through the second type network and in communication the portable access device to transfer said electronic information signals to and from the first type network to said portable access device on said second type network; and
  a fixed address translation device in communication with the protocol control device for conversion of a first address describing said first portal to said first type network to a second address describing said second portal to said second network, and defining a third address as a third portal to said second network in communication with the portable access device;
  wherein said first address is fixedly defined for said first type network and said translation is virtually defined for said second address and said third address;
  wherein if said portable access device transmits through said multi-network instantiation device a request to communicate with said multi-network exchange bridge apparatus and the third address is equivalent to said second address with an extension indicating that said portable access device communicating through said multi-network instantiation device is associated with said multi-network exchange bridge apparatus and may communicate directly with said multi-network exchange bridge apparatus.

58. The multi-network exchange bridge apparatus of claim 57 wherein portable access device is selected from a group of devices in communication with said second type network consisting of computing devices, personal digital assistants, internet protocol telephones, and electronic devices capable of communicating with said second type network.

59. The multi-network exchange bridge apparatus of claim 57 further comprising:
  an information retention device in communication with said first portal and said second portal to retain said electronic information signals, to transfer said electronic information signals between said first type network and said portable access device in communication with a node of said second type network.

60. The multi-network exchange bridge apparatus of claim 57 wherein said portable access device communicating with said multi-network instantiation device transfers electronic information signals between said portable access device and said first type network through said multi-network exchange bridge apparatus as though said portable access device were in direct communication with said first type network.

61. The multi-network exchange bridge apparatus of claim 57 wherein the first type network is a public switched telephone network and said protocols and command structures of said first type network provide calling features and voice signals of a telephone call.

62. The multi-network exchange bridge apparatus of claim 57 wherein the second type network is a global digital communications network and said protocols and command structures provide packet formatted digital data for transferring said electronic information signals between said second type network and said first type network.

63. The multi-network exchange bridge apparatus of claim 62 wherein the packet formatted digital data is a voice-over-internet protocol for the transfer of a telephone call on said global digital communications network.

64. The multi-network exchange bridge apparatus of claim 57 wherein the second type network includes a global multi-network exchange server in communication with said multi-network exchange bridge apparatus to provide a repository for the first, second, and third addresses and access information to facilitate transfer of said electronic information signals between and said multi-network instantiation devices.

65. The multi-network exchange bridge apparatus of claim 64 wherein said global multi-network exchange server facilitates routing for transfer of said electronic information signals from said multi-network exchange bridge apparatus and a gateway that permits communication between said first type network and said second type network remotely from said multi-network exchange bridge apparatus.

66. The multi-network exchange bridge apparatus of claim 64 wherein the portable access device is in communication with said multi-network instantiation device and transfers electronic information signals between said portable access device and said first type network through said multi-network exchange bridge apparatus as though said portable access device were in direct communication with said first type network, the portable access device comprising:
  a portable access control device in communication with said global multi-network exchange server to acquire access information to facilitate transfer of said electronic information signals between said second type network and said multi-network exchange bridge apparatus and in communication with said multi-network exchange bridge apparatus to acquire said electronic information signals from said multi-network exchange bridge apparatus; and
  a microphone and speaker in communication with said portable access control device, wherein said portable access control device converts said electronic information signals to voice signals for reproduction on said speaker and converts voice signals to said electronic information signals for transfer to said multi-network exchange bridge apparatus.

67. The multi-network exchange bridge apparatus of claim 57 further comprising at least one third portal in communication with one of a group of communication devices consisting of a computing system, a telephone handset, a facsimile machine and in communication with said protocol control device, wherein said protocol control device provides interpretation and formatting of said electronic information signals between protocols and command structures of the first type network and protocols and command structures of the second type network for transfer of said electronic information signals between said first type network, said second type network and said communication devices.

68. A multi-network exchange system for the transfer of electronic information signals comprising:
  a first type network;
  at least one second type network;
  a multi-network exchange bridge apparatus for facilitating transfer of electronic information signals between a first type network and a portable access device through a second type network to a portable access device, said multi-network exchange bridge apparatus comprising:
    a first portal in communication with said first type network;
    a second portal in communication with said second type network;
    a protocol control device in communication with said first portal and said second portal, for interpretation and formatting of said electronic information signals between protocols and command structures of the first type network and protocols and command structures of the second type network for transfer of said electronic information signals between said first type network and said second type network;
    a multi-network instantiation device in communication with said protocol control device through the second type network and in communication the portable access device to transfer said electronic information signals to and from the first type network to said portable access device on said second type network; and
  a fixed address translation device in communication with the protocol control device for conversion of a first address describing said first portal to said first type network to a second address describing said second portal to said second network, and defining a third address as a third portal to said second network in communication with the portable access device;
  wherein said first address is fixedly defined for said first type network and said translation is virtually defined for said second address and said third address;
  wherein if said portable access device through said multi-network instantiation device a request to communicate with said multi-network exchange bridge apparatus and the third address is equivalent to said second address with an extension indicating that said portable access device communicating through said multi-network instantiation device is associated with said multi-network exchange bridge apparatus and may communicate directly with said multi-network exchange bridge apparatus.

69. The multi-network exchange system of claim 68 wherein portable access device is selected from a group of devices in communication with said second type network consisting of computing devices, personal digital assistants, internet protocol telephones, and electronic devices capable of communicating with said second type network.

70. The multi-network exchange system of claim 68 wherein said multi-network exchange bridge apparatus further comprises:
  an information retention device in communication with said first portal and said second portal to retain said electronic information signals, to transfer said electronic information signals between said first type network and said portable access device in communication with a node of said second type network.

71. The multi-network exchange system of claim 68 wherein the first type network is a public switched telephone network and said protocols and command structures of said first type network provide calling features and voice signals of a telephone call.

72. The multi-network exchange system of claim 68 wherein the second type network is a global digital communications network and said protocols and command structures provide packet formatted digital data for transferring said electronic information signals between said second type network and said first type network.

73. The multi-network exchange system of claim 72 wherein the packet formatted digital data is a voice-over-internet protocol for the transfer of a telephone call on said global digital communications network.

74. The multi-network exchange system of claim 68 wherein the second type network includes a global multi-network exchange server in communication with said multi-network exchange bridge apparatus to provide a repository for the first, second, and third addresses and access information to facilitate transfer of said electronic information signals between said portable access device.

75. The multi-network exchange system of claim 74 wherein the portable access is in communication with said multi-network instantiation device and transfers electronic information signals between said portable access device and said first type network through said multi-network exchange bridge apparatus as though said portable access device were in direct communication with said first type network, the portable access device comprising:
  a portable access control device in communication with said global multi-network exchange server to acquire access information to facilitate transfer of said electronic information signals between said second type network and said multi-network exchange bridge apparatus and in communication with said multi-network exchange bridge apparatus to acquire said electronic information signals from said multi-network exchange bridge apparatus; and
  a microphone and speaker in communication with said portable access control device, wherein said portable access control device converts said electronic information signals to voice signals for reproduction on said speaker and converts voice signals to said electronic information signals for transfer to said multi-network exchange bridge apparatus.

76. The multi-network exchange system of claim 75 wherein said multi-network exchange bridge apparatus further comprises at least one third portal in communication with one of a group of communication devices consisting of a computing system, a telephone handset, a facsimile machine and in communication with said protocol control device, wherein said protocol control device provides interpretation and formatting of said electronic information signals between protocols and command structures of the first type network and protocols and command structures of the second type network for transfer of said electronic information signals between said first type network, said second type network and said communication devices.

* * * * *